Figure 1:
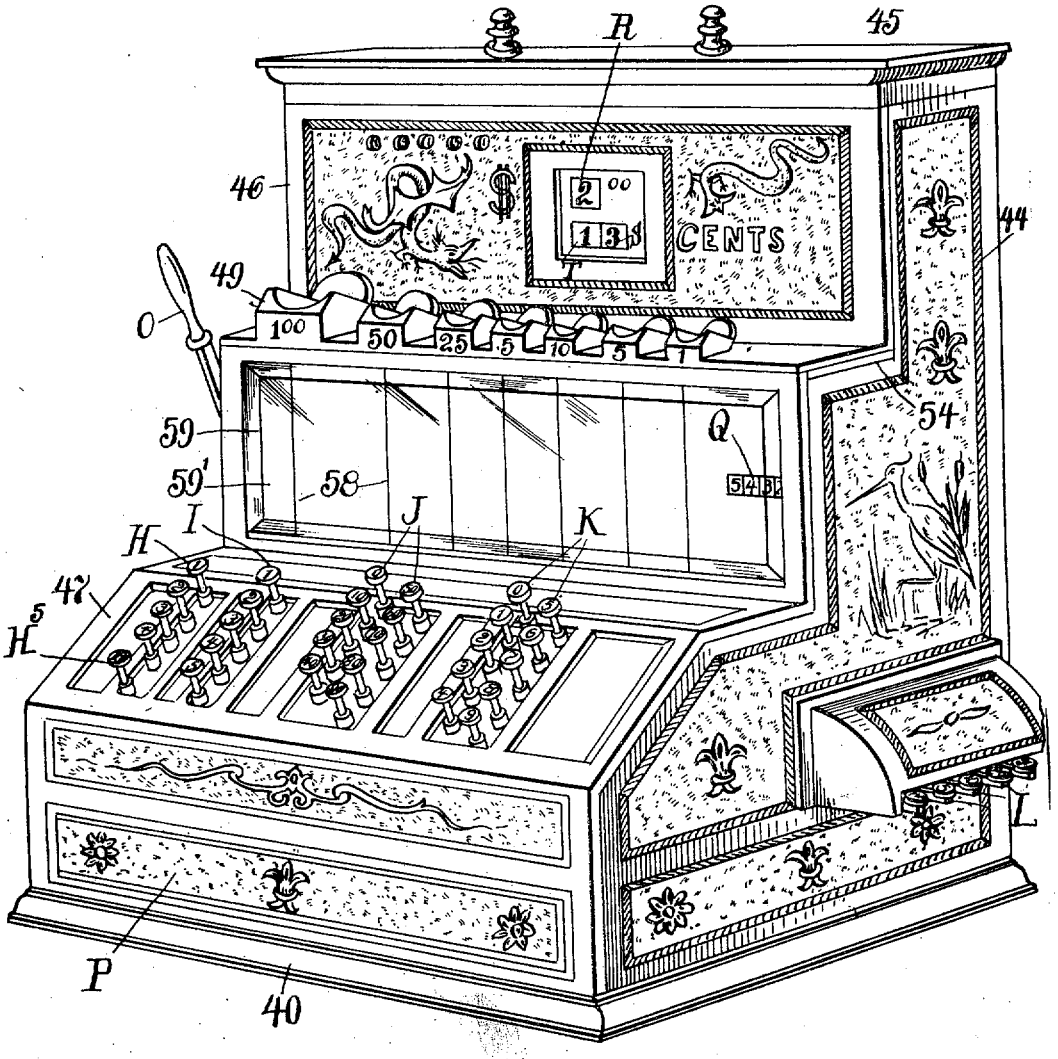

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 1.

Witnesses
C. Kerstenmann
H. W. Lindsey Jr.

Inventor
Edmund S. Church
by R. C. Glass
Chester H. Brasetton
Attorneys

BEST AVAILABLE COPY

E. S. CHURCH.

MECHANICAL CASHIER.

APPLICATION FILED MAY 1, 1913

Reissued Oct. 21, 1913.

13,629.

25 SHEETS—SHEET 2.

Witnesses

C. Klostermann.

H. W. Lindsey Jr.

Inventor

Edmund S. Church

R. C. Sloan

Chester H. Braselton

Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 3.

Witnesses
C. Klostermann
H. W. Lindsey Jr.

Inventor
Edmund S. Church.
by R. Ashley
Chester H. Brasselton
Attorneys

BEST AVAILABLE COPY

E. S. CHURCH.

MECHANICAL CASHIER.

APPLICATION FILED MAY 1, 1913.

Reissued Oct. 21, 1913. 13,629.

25 SHEETS—SHEET 4.

Witnesses
C. Klostermann
H. W. Lindsey Jr.

Inventor
Edmund S. Church
by R. Ulsler
Chester H. Braselton
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 5.

Witnesses
C. Klwetermann.
H W Lindsey Jr.

Inventor
Edmund S. Church
by R. Ashton
Chester W. Brasilton
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 6.

Witnesses
C. Klostermann
H. W. Lindsey Jr.

Inventor
Edmund S. Church.
by R. Chase
Chester & Bracelton
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 7.

Witnesses
C. Klostermann.
H. W. Lindsley Jr.

Inventor
Edmund S. Church
by R. Sylvester
Chester H. Brandon
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 8.

Witnesses
C. Westermann.
H. W. Lindsey Jr.

Inventor
Edmund S. Church.
by Rolston
Chester H. Brasellton
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 9.

Witnesses
C. Klostermann
H. H. Lindsey Jr.

Inventor
Edmund S. Church.
by R. C. Dorr
Chester H. Bracelton
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 10.

Witnesses
C. Kleinternann
H. W. Lindsley Jr.

Inventor
Edmund S. Church.
by R. Ashton
Chester W. Brasselton
Attorneys

BEST AVAILABLE COPY
E. S. CHURCH.
MECHANICAL CASHIER.
APPLICATION FILED MAY 1, 1913.
Reissued Oct. 21, 1913.
13,629.
25 SHEETS—SHEET 11.
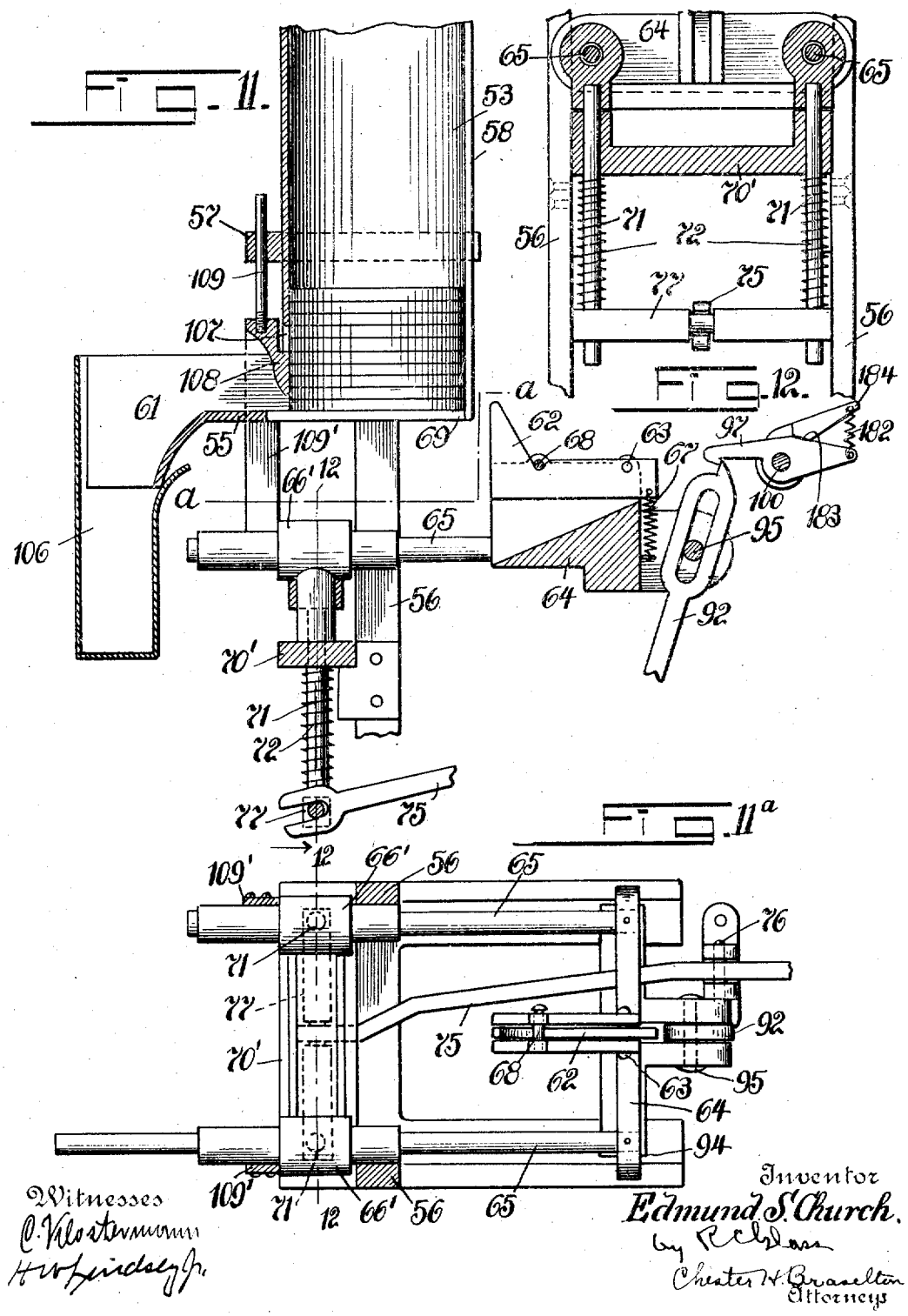
Witnesses
C. Klostermann
H. W. Bindley Jr.
Inventor
Edmund S. Church.
by R. C. Dorsey
Chester H. Brandlen
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 12.

Witnesses
C. Klostermann
H. W. Lindsey Jr.

Inventor
Edmund S. Church
by R. Clyde
Chester H. Bressler
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 13.

Witnesses
C. Kloeterman.
H. W. Lindsey Jr.

Inventor
Edmund S. Church
by R. C. Olson
Chester N. Brandon
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 14.

Witnesses
C. Klostermann
H. W. Bindsey Jr.

Inventor
Edmund S. Church
by R. Ashton
Chester W. Brasellton
Attorneys

BEST AVAILABLE COPY
E. S. CHURCH.
MECHANICAL CASHIER.
APPLICATION FILED MAY 1, 1913.
Reissued Oct. 21, 1913.
13,629.
25 SHEETS—SHEET 15.
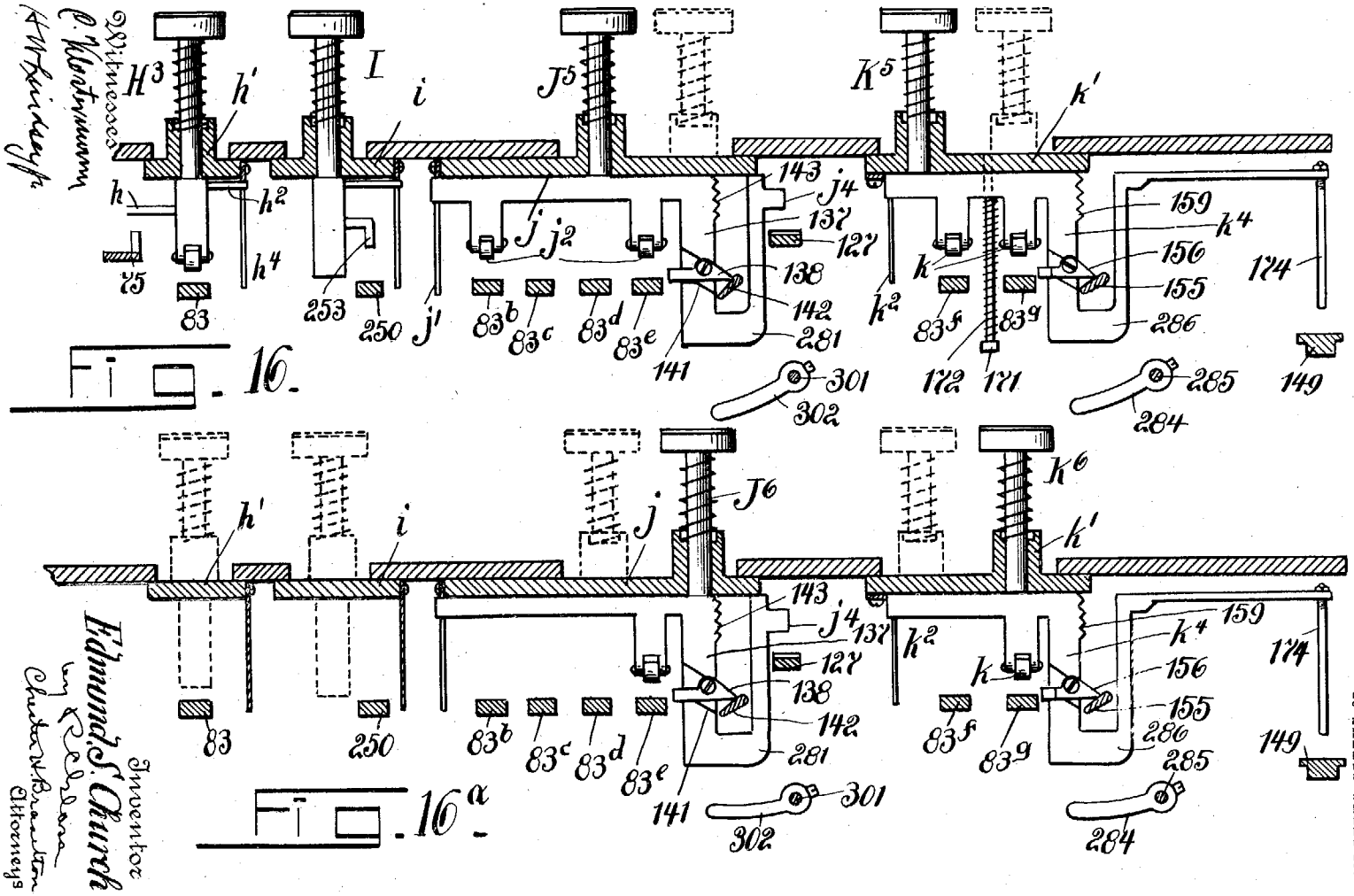
Witnesses
C. Klostermann
H. W. Lindsay Jr.
Inventor
Edmund S. Church
by R. Chlosa
Chester W. Brownlow
Attorneys BEST AVAILABLE COPY
E. S. CHURCH.
MECHANICAL CASHIER.
APPLICATION FILED MAY 1, 1913.
Reissued Oct. 21, 1913.
13,629.
25 SHEETS—SHEET 16.
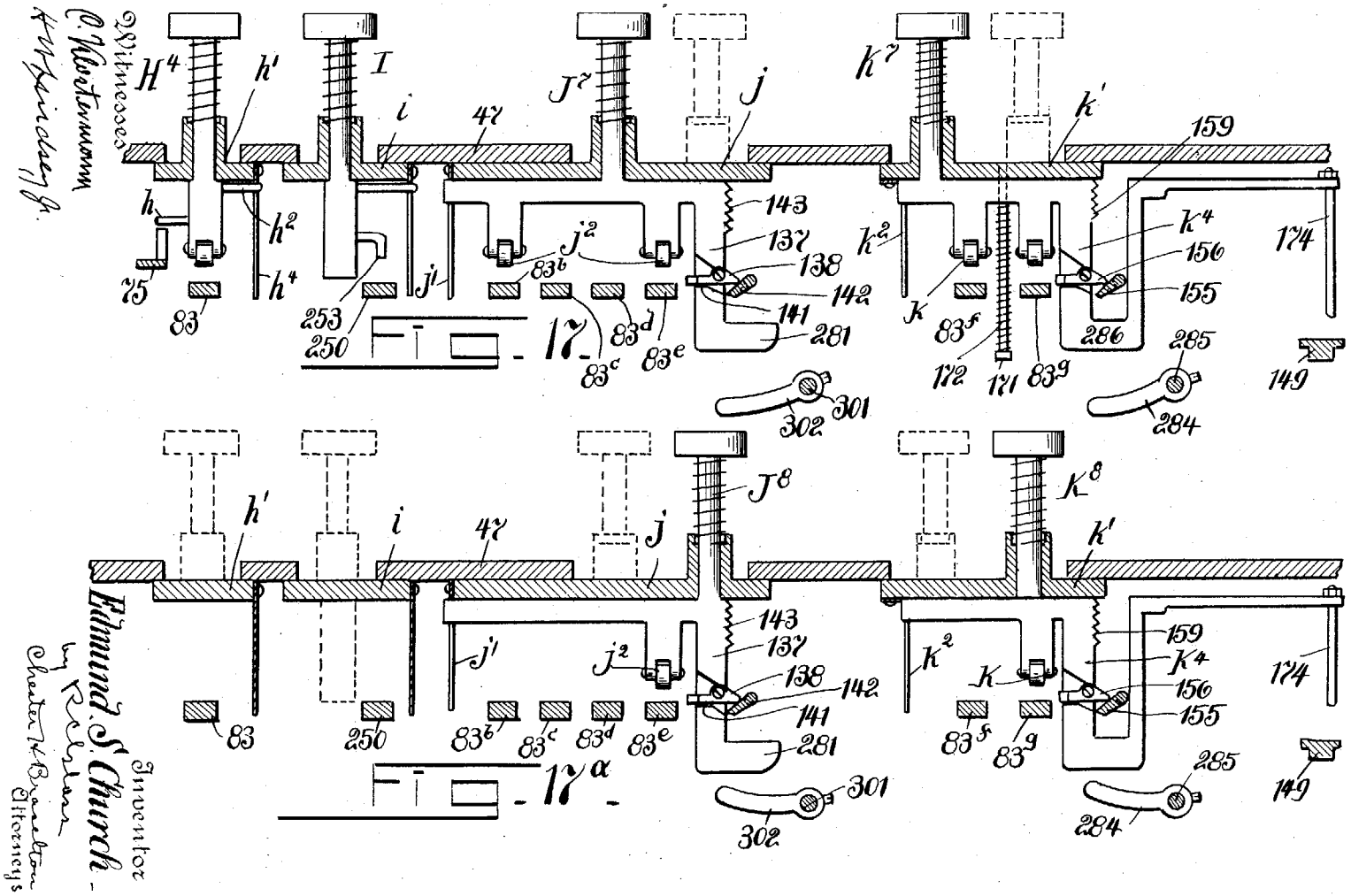
Witnesses
C. Klostermann
H. W. Lindsey Jr.
Inventor
Edmund S. Church
by R. C. Slade
Chester H. Braselton
Attorneys BEST AVAILABLE COPY
E. S. CHURCH.
MECHANICAL CASHIER.
APPLICATION FILED MAY 1, 1913.
Reissued Oct. 21, 1913.
13,629.
25 SHEETS—SHEET 17.
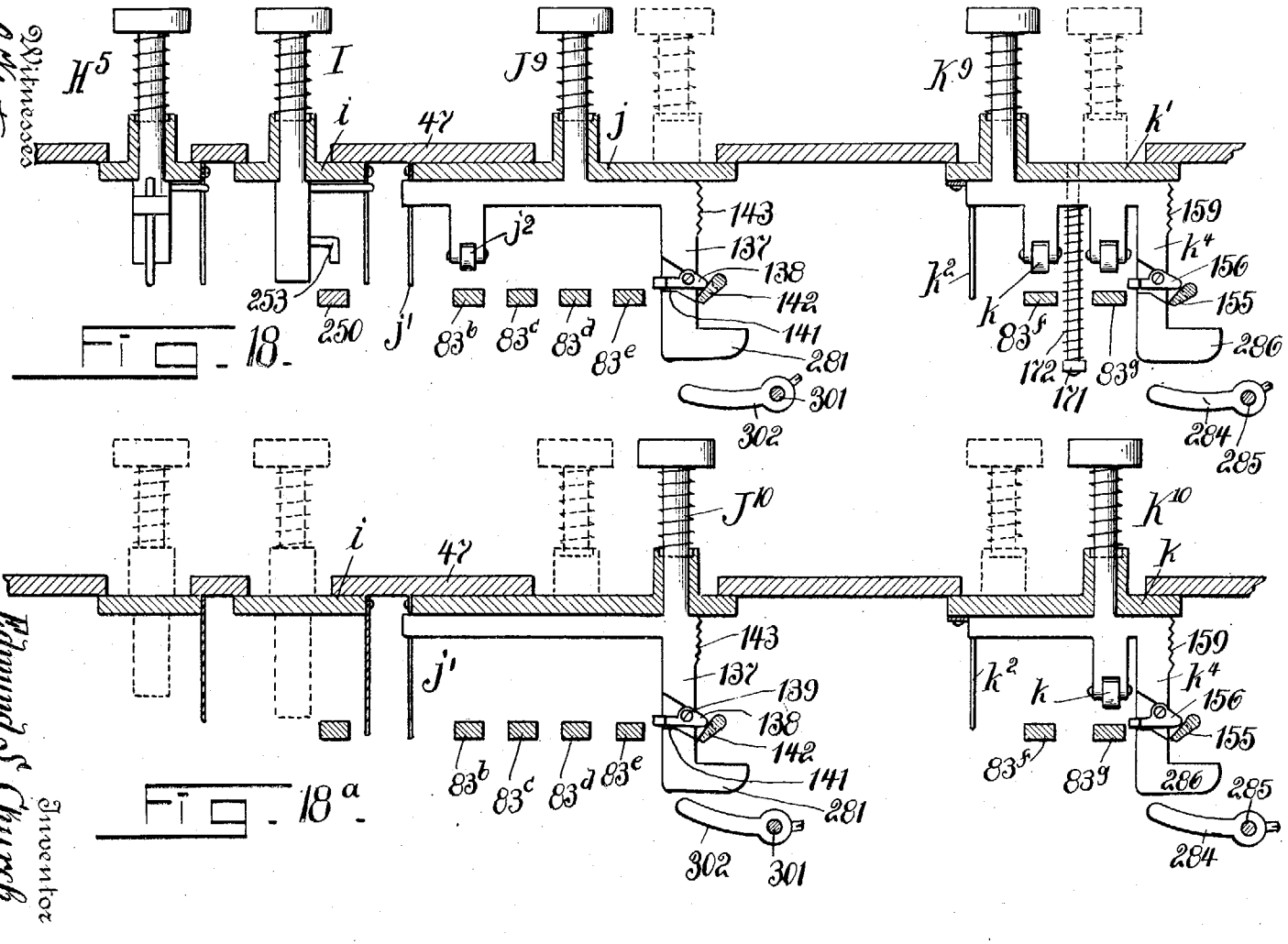
Witnesses
C. Klostermann.
H. H. Lindsey Jr.
Inventor
Edmund S. Church.
by R. C. Sloan
Chester H. Bracelton
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 18.

Witnesses
C. Klostermann
H. W. Lindsey Jr.

Inventor
Edmund S. Church,
by R. H. Loss
Chester & Brasilton
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS-SHEET 19.

Witnesses
C. Klostermann
H. H. Lindsey Jr.

Inventor
Edmund S. Church
by R. C. Sloan
Chester W. Brasellon
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 20.

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 21.

Witnesses
C. Klostermann
H. M. Lindsey Jr.

Inventor
Edmund S. Church,
by R. C. Haas
Chester H. Brandon
Attorneys

BEST AVAILABLE COPY

E. S. CHURCH.

MECHANICAL CASHIER.

APPLICATION FILED MAY 1, 1913.

Reissued Oct. 21, 1913.

13,629.

25 SHEETS—SHEET 22.

Witnesses
C. Klostermann
H. W. Lindsey Jr.

Inventor
Edmund S. Church.
by R. C. Glass
Chester W. Brighton
Attorneys

BEST AVAILABLE COPY
E. S. CHURCH.
MECHANICAL CASHIER.
APPLICATION FILED MAY 1, 1913.
Reissued Oct. 21, 1913.
13,629.
25 SHEETS—SHEET 23.
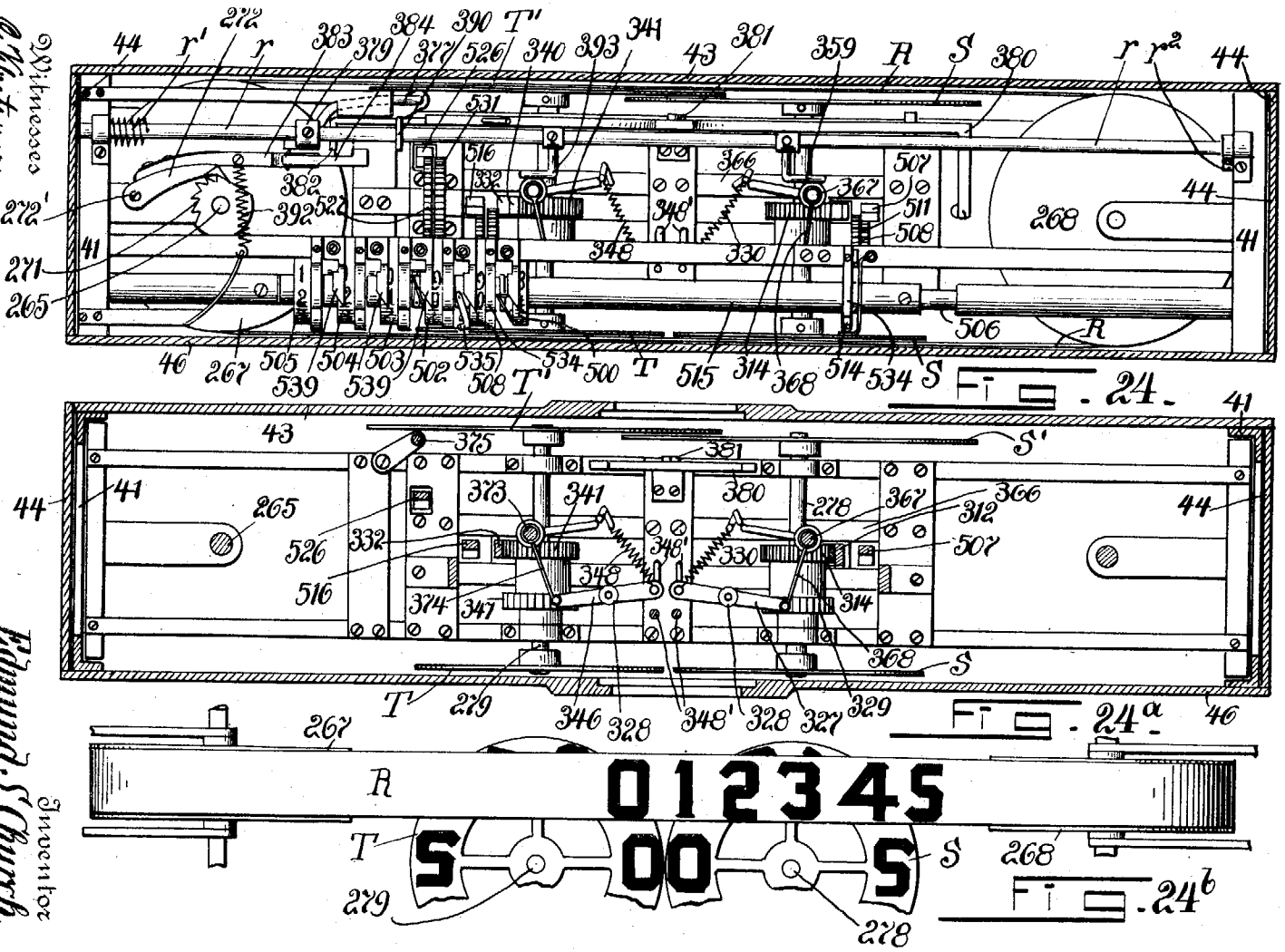
Witnesses
C. Westermann.
H. W. Lindsey Jr.
Inventor
Edmund S. Church.
by R. C. Dorsey
Chester W. Brooks
Attorneys BEST AVAILABLE COPY
E. S. CHURCH.
MECHANICAL CASHIER.
APPLICATION FILED MAY 1, 1913.
Reissued Oct. 21, 1913.
13,629.
25 SHEETS—SHEET 24.
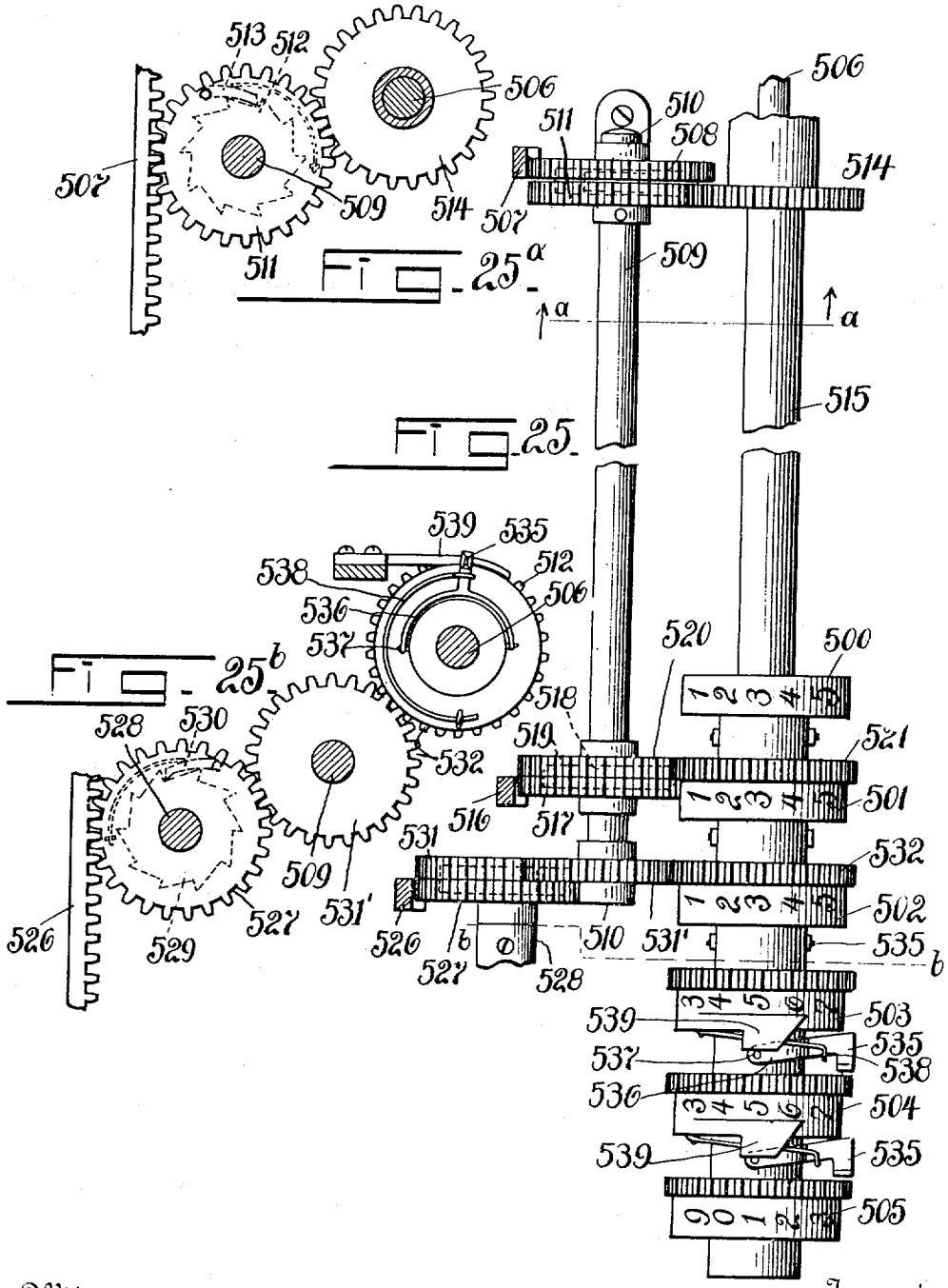
Witnesses
C. Klostermann.
H. W. Lindsey Jr.
Inventor
Edmund S. Church.
by R. C. Sluss
Chester H. Graselton
Attorneys BEST AVAILABLE COPY
E. S. CHURCH.
MECHANICAL CASHIER.
APPLICATION FILED MAY 1, 1913.
Reissued Oct. 21, 1913.
13,629.
25 SHEETS—SHEET 25.
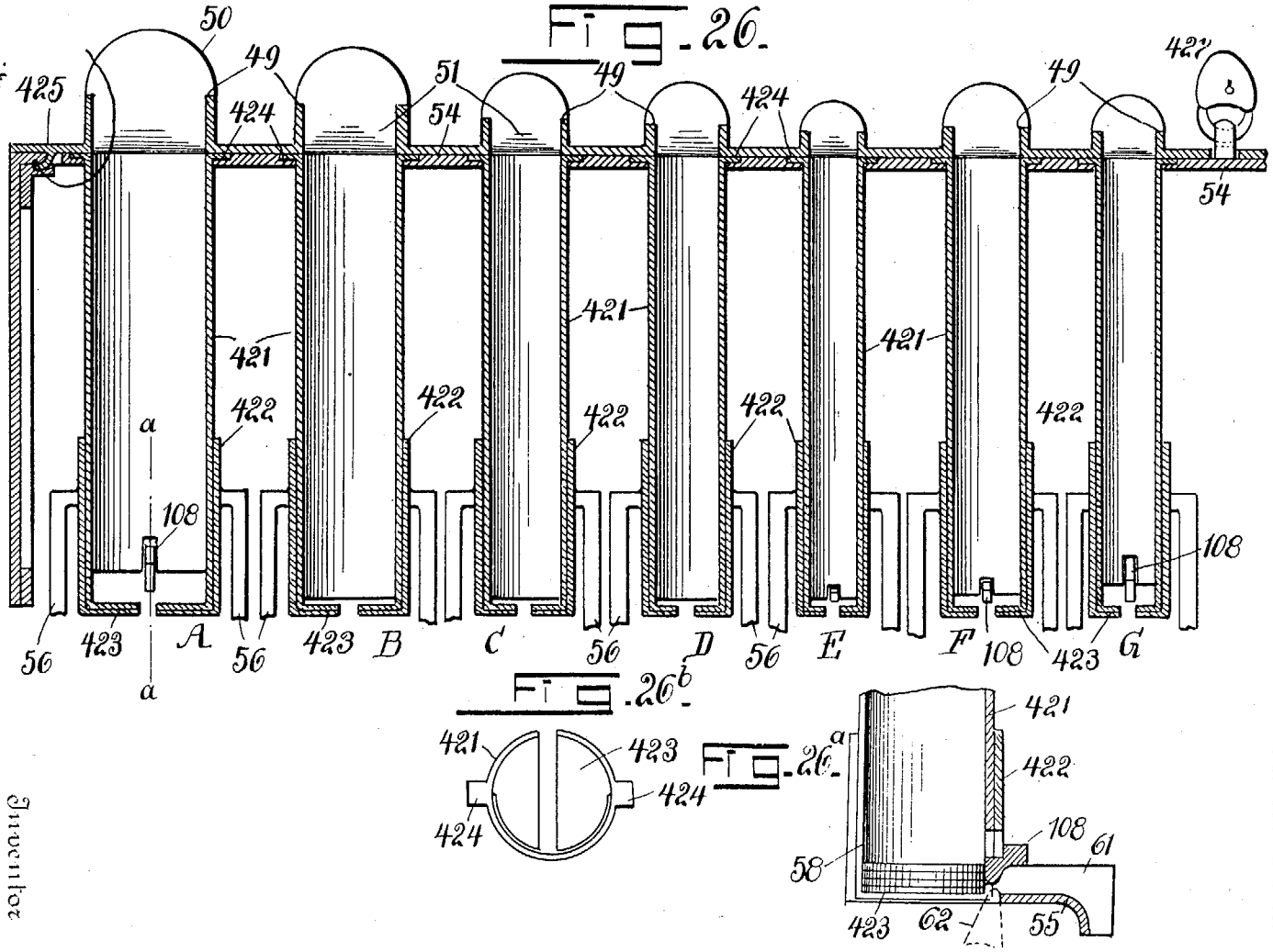
Witnesses
Westermann
Lindsey Jr.
Inventor
Edmund S. Church
by R. C. Dorsey
Chester H. Braselton
Attorneys

BEST AVAILABLE COPY

UNITED STATES PATENT OFFICE.

EDMUND S. CHURCH, OF CHICAGO, ILLINOIS, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

MECHANICAL CASHIER.

13,629. Specification of Reissued Letters Patent. Reissued Oct. 21, 1913.

Original No. 985,145, dated February 28, 1911, Serial No. 228,924. Application for reissue filed May 1, 1913. Serial No. 764,958.

*To all whom it may concern:*

Be it known that I, EDMUND S. CHURCH, a citizen of the United States, residing at Chicago, in the county of Cook and State of Illinois, have invented certain new and useful Improvements in Mechanical Cashiers, of which I declare the following to be a full, clear, and exact description.

The present invention relates to mechanical cashiers.

The invention designs to provide a machine in which the purchase-keys which control the operation of the delivery-devices are first operated, and in which mechanism for controlling, determining, and discharging the amount of change and in accordance with the money received, is last operated. An important resultant advantage of such operation and mechanism is, the clerk upon making a sale can immediately operate the purchase-keys regardless of the sum of money to be received and after the purchase-money has been received and counted, can operate the discharge-controlling-mechanism when ready to receive the change. This feature of the invention is also of importance in the operation of a machine which is not dependent upon or controlled by the deposit of the purchase-money, because the clerk can operate the machine which controls the operation of the money-delivery-devices as soon as the purchase-price is known and without waiting until the purchaser has handed the money to the clerk. The discharge-controlling-mechanism, however, which must be differentially operated, according to the amount of money received, will cause delivery of the proper amount of change as soon as operated. Furthermore, the clerk does not need to delay the purchaser while depositing the purchase-money into the machine but can do this at leisure, the registering-device serving to account for the sales, when accounting is desired.

The invention also provides a mechanical cashier, having a variable or correctible keyboard. That is to say, a machine in which the keys are held in operated position so the clerk can verify the entry by examination of the operated keys and can reset the keys when operating the discharge-controlling-mechanism or recorder. Therefore, all likelihood of error is avoided because the clerk can always see the amount of the purchase which has been entered and is about to be registered, before taking the change from the machine. The key-operated mechanism is constructed so the clerk can, by depression of another key of a series, restore a previously operated key and reset the controlling-mechanism for the key last operated. If the clerk should find that a key has been erroneously operated, the error can be rectified until either the discharge-controlling-mechanism, a register or indicator is operated. This feature also facilitates operation of the machine because the clerk can immediately, upon being advised of the amount of the purchase, operate the purchase-keys to set the money-delivery-devices and if for any reason the purchase is canceled or another clerk is desirous of using the machine at once, the latter can operate the machine for a sale without making incorrect registration or affecting proper discharge of change for each purchase.

Further, the invention employs valves for controlling the discharge of money from the delivery-devices. These valves prevent engagement of the money-ejector with the money while the ejectors are being set into operated position and the ejector with the money when the valves are closed to prevent delivery upon operation of the discharge-controlling-mechanism.

The invention also provides a mechanical cashier, in which certain of the money-delivery-devices are adjustable for single or multiple delivery under selective control of the purchase-keys. This makes it possible to avoid employment of a large number of money-holders, some of which are used for single delivery and others for multiple delivery. A delivery-device is provided which comprises an adjustable stop coöperating with an adjustable ejector, so that the number of coin delivered can be regulated to a nicety despite the variation of the thickness of the coin, improved constructions for adjustable money-delivery-devices especially adapted for the particular coins which are to be handled are also provided.

BEST AVAILABLE COPY

Further, the invention designs to improve the construction of money-delivery-devices and the controlling-means therefor.

The invention provides for use in a machine wherein coins of different denominations are handled, run-ways or coin ducts which deliver the several coins of different denominations at the coin exit approximately at the same time, so that the clerk will not be misled and withdraw his hand before all of the change is received.

The invention further provides a series of levers for controlling or operating the delivery-devices, which are differentially operable about either end as a fulcrum, so a single lever can be operated by a plurality of keys without necessarily employing a lever of considerable length. The space occupied by these levers will be very small thus resulting in compactness.

Another object of the invention is to provide a device for operating one of the delivery-devices independently of the purchase-keys when that is necessary to make the proper change. For example, if the machine is provided with series of keys for units, and tens, respectively, and the amount of purchase-money received does not aggregate a multiple of ten, it is sometimes necessary to deliver a five cent coin from a device not controlled by the purchase-keys operated to make the proper change. Thus, if a sale amounts to twenty-eight cents and the amount of money received is thirty-five cents the unit-series of keys which are adapted to cause delivery of the difference between the unit-key depressed and ten, will not operate the five-cent delivery-device. One of the discharge-controlling mechanisms is adapted in such instances to operate the five-cent delivery-device independently of the purchase-keys. With such mechanism it becomes possible to deliver correct change under control of the discharge-controlling mechanism regardless of the aggregate value of the purchase-money.

The invention further designs to provide an improved machine in which the keys are arranged in series and so a key of one series is adapted to coöperate with either key of another series, thus avoiding the employment of a separate key for each amount.

Further, the invention designs to provide a combined mechanical cashier, and register, comprising a device which prevents discharge of change until the register or indicator has been operated. This feature is of importance because it makes possible employment of a correctible key-board which permits variation or correction of the amount to be registered until the discharge-controlling-mechanism is operated to deliver change.

The invention also provides an indicator or register which is controlled by the purchase-keys and restored to normal position as soon as a key is operated in commencement of another operation, thereby destroying the indication upon commencement of another operation.

The invention further provides an improved indicator-mechanism for a cashier, in which the indicator is securely locked against shift until the indicator operating means is operated; an indicator or registering-device which can be used in connection with a correctible key-board and in which the indicator-controller is reset when one key is operated after another to make correction; a combined mechanical cashier and register having mechanism for advancing the register when the indicator is restored to normal position. An important advantage of said feature is, a simple counting-device can be used because the advance of the register for each series of keys occurs at different times.

The invention also designs to improve the construction and operation of the several parts and mechanisms of a mechanical cashier and of an indicator and register operated in conjunction therewith.

The invention consists in the several novel features hereinafter set forth and more particularly defined by claims at the conclusion hereof.

Figure 2:
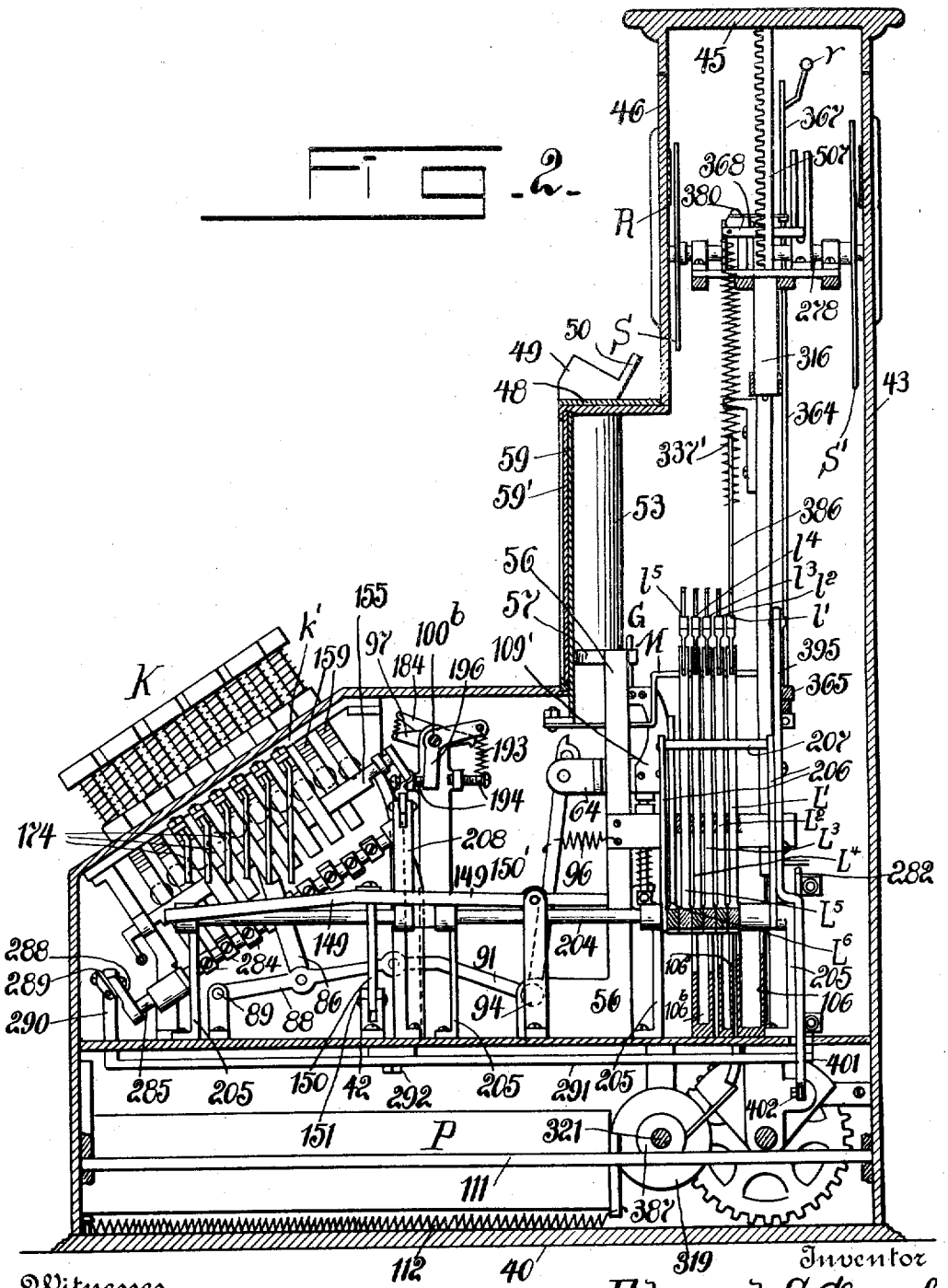
Figure 3:
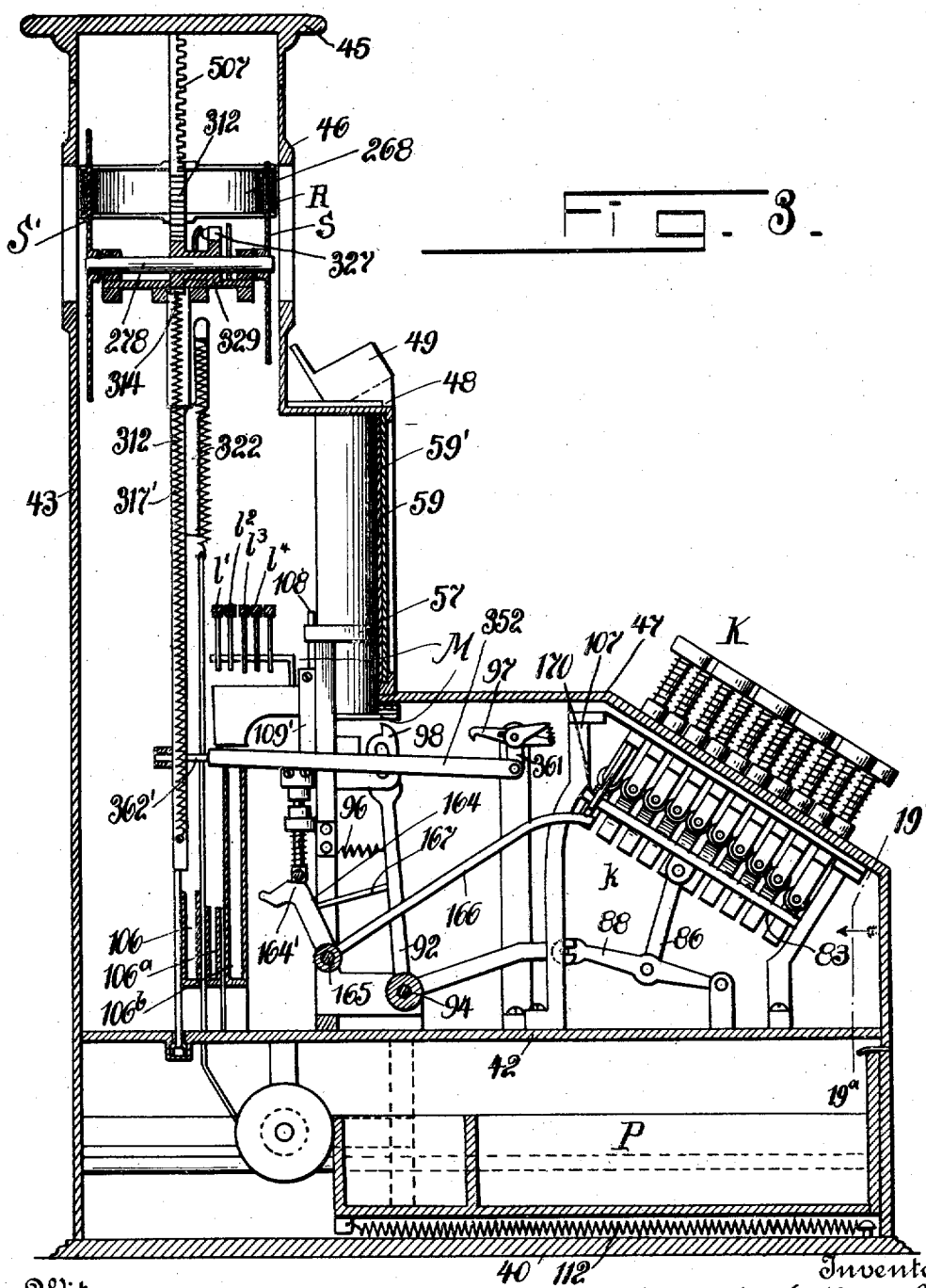
Figure 4:
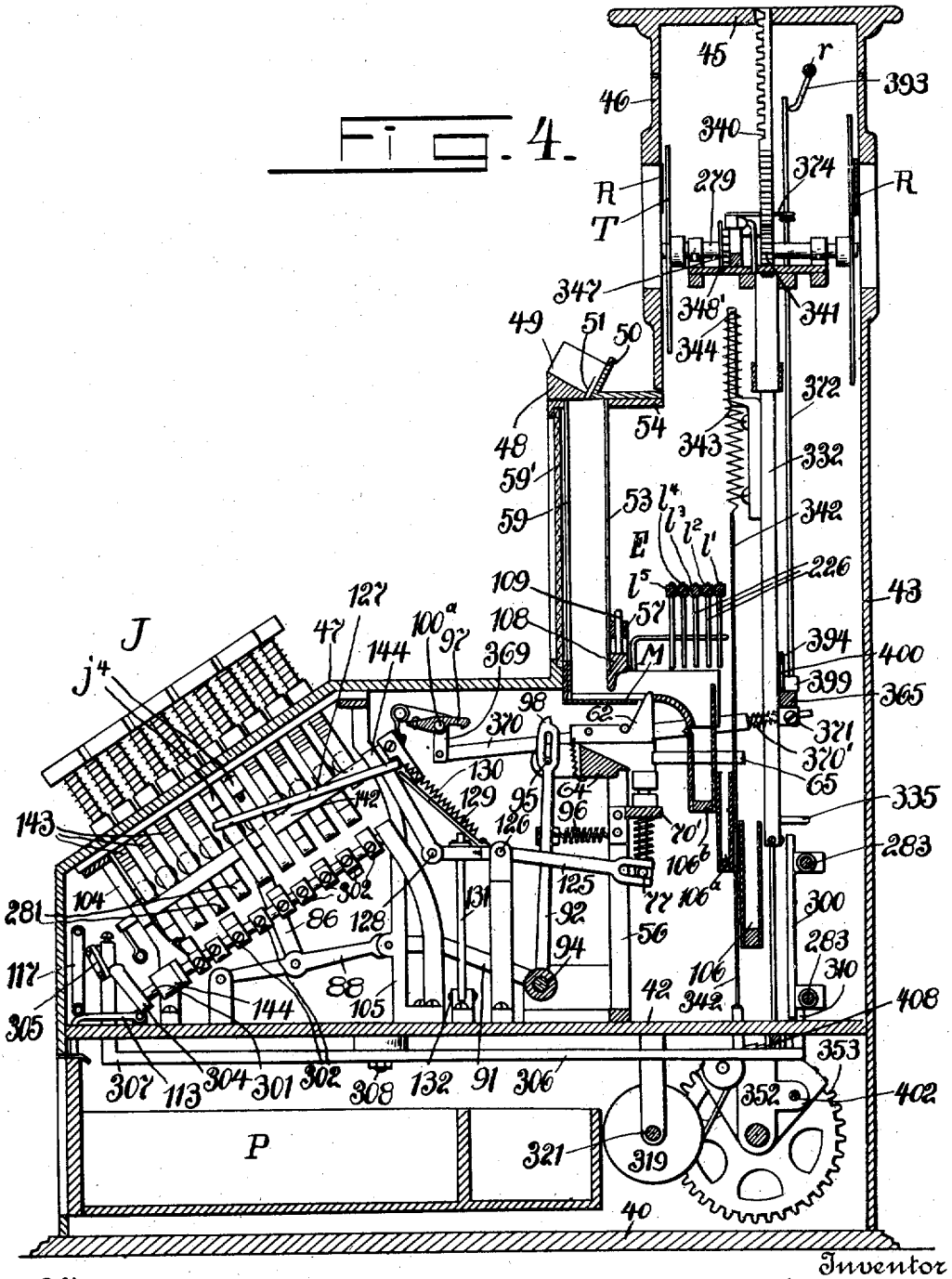
Figure 5:
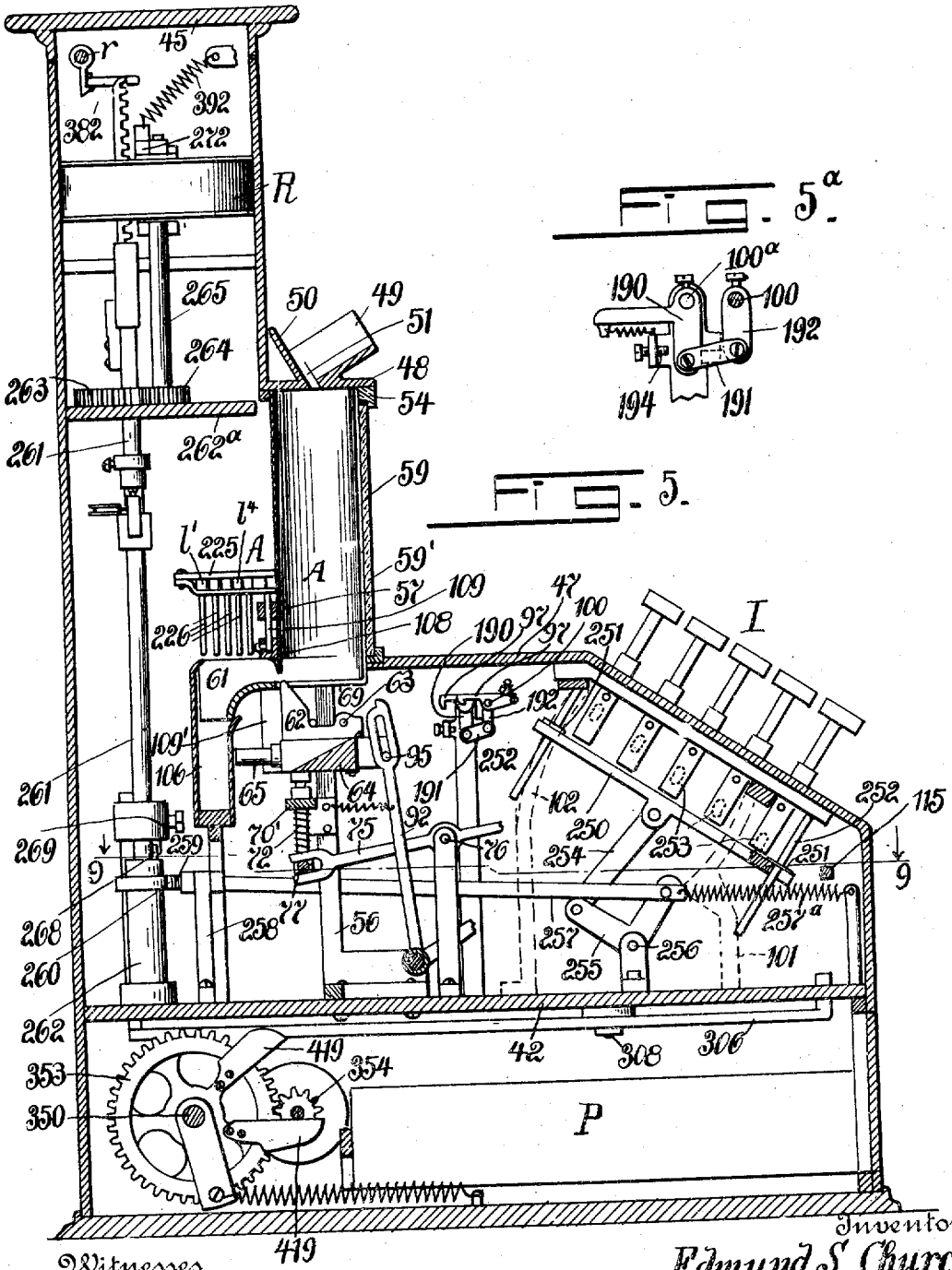
Figure 6:
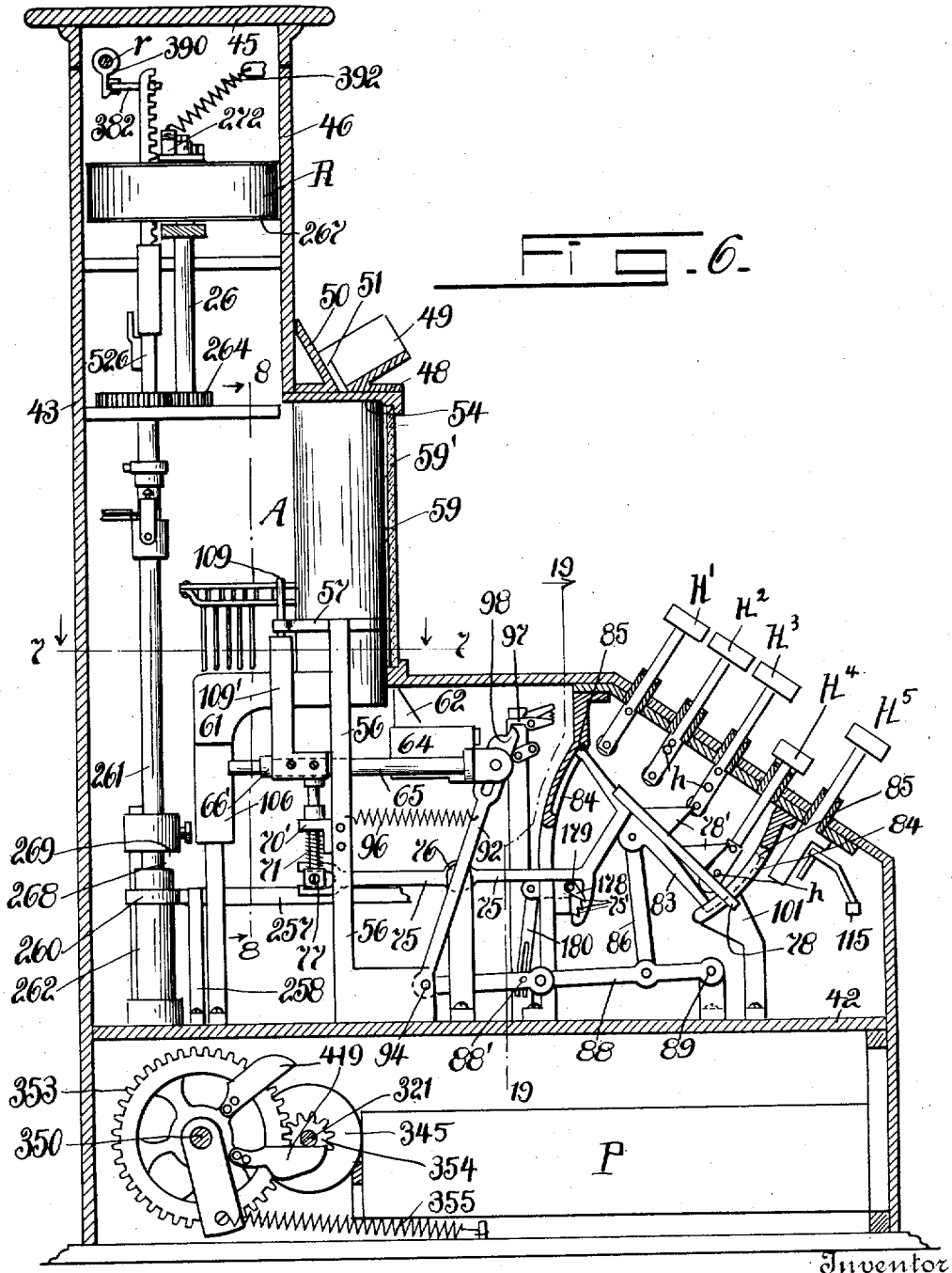
Figure 7:
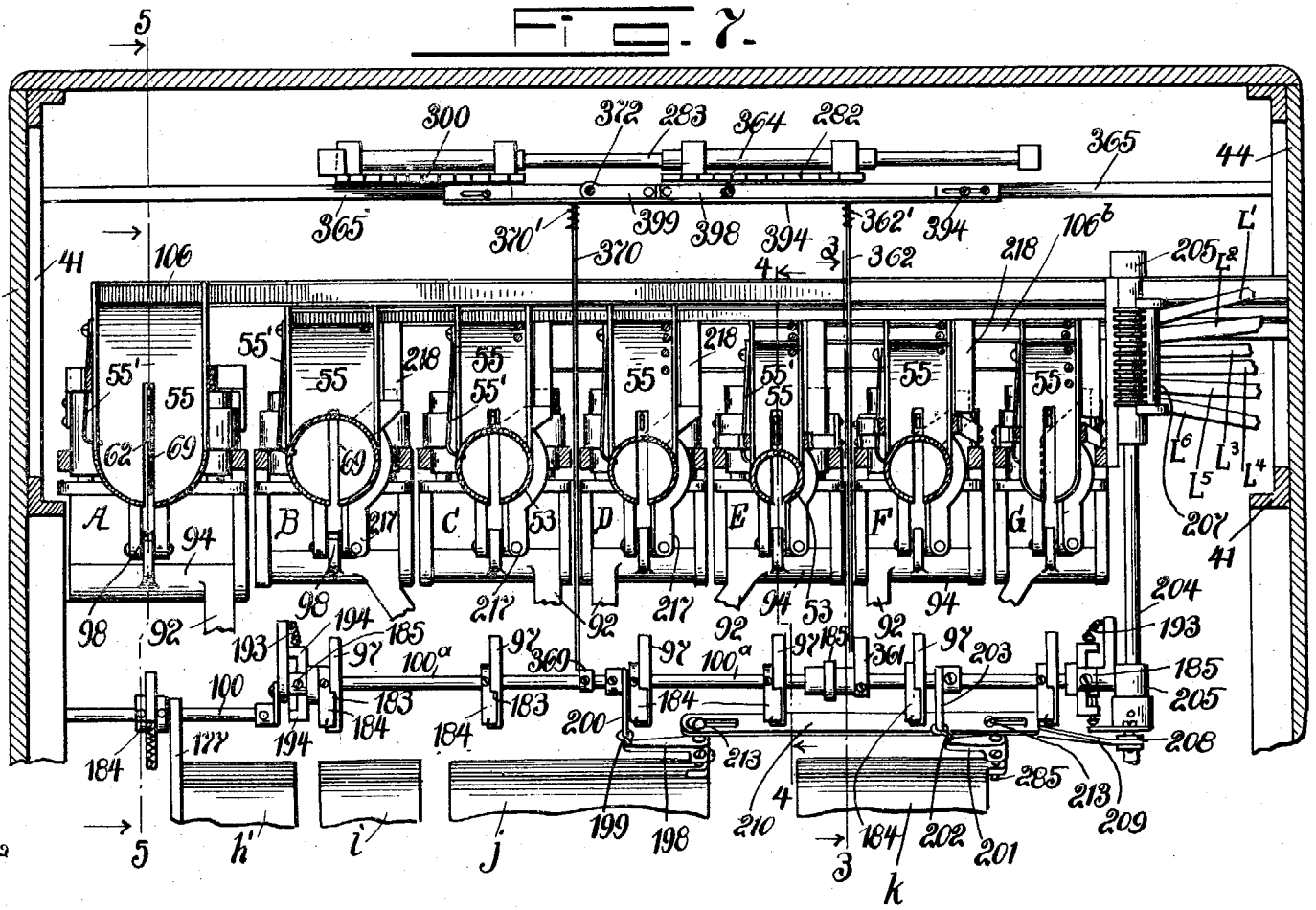
Figure 8:
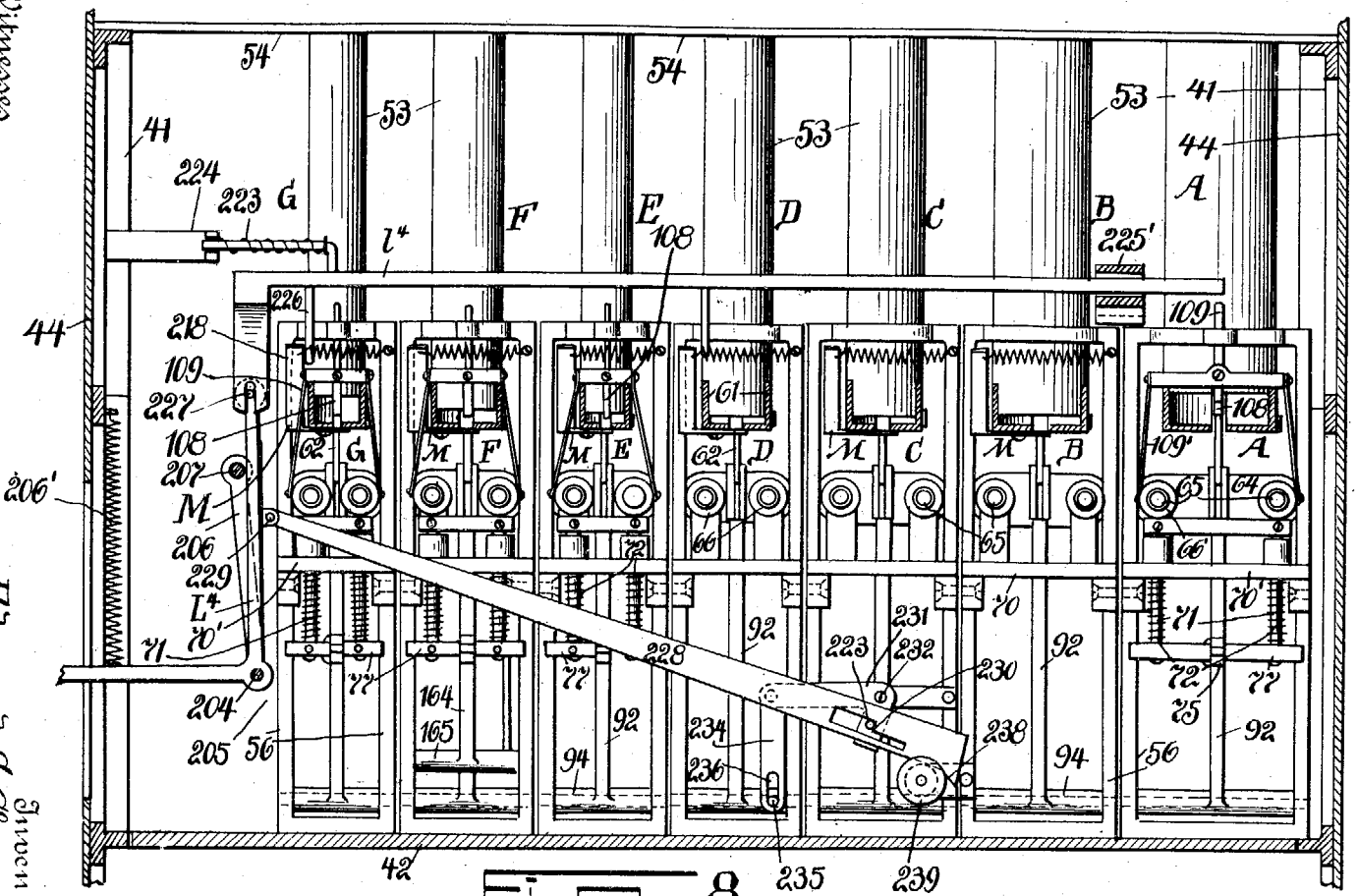
Figure 9:
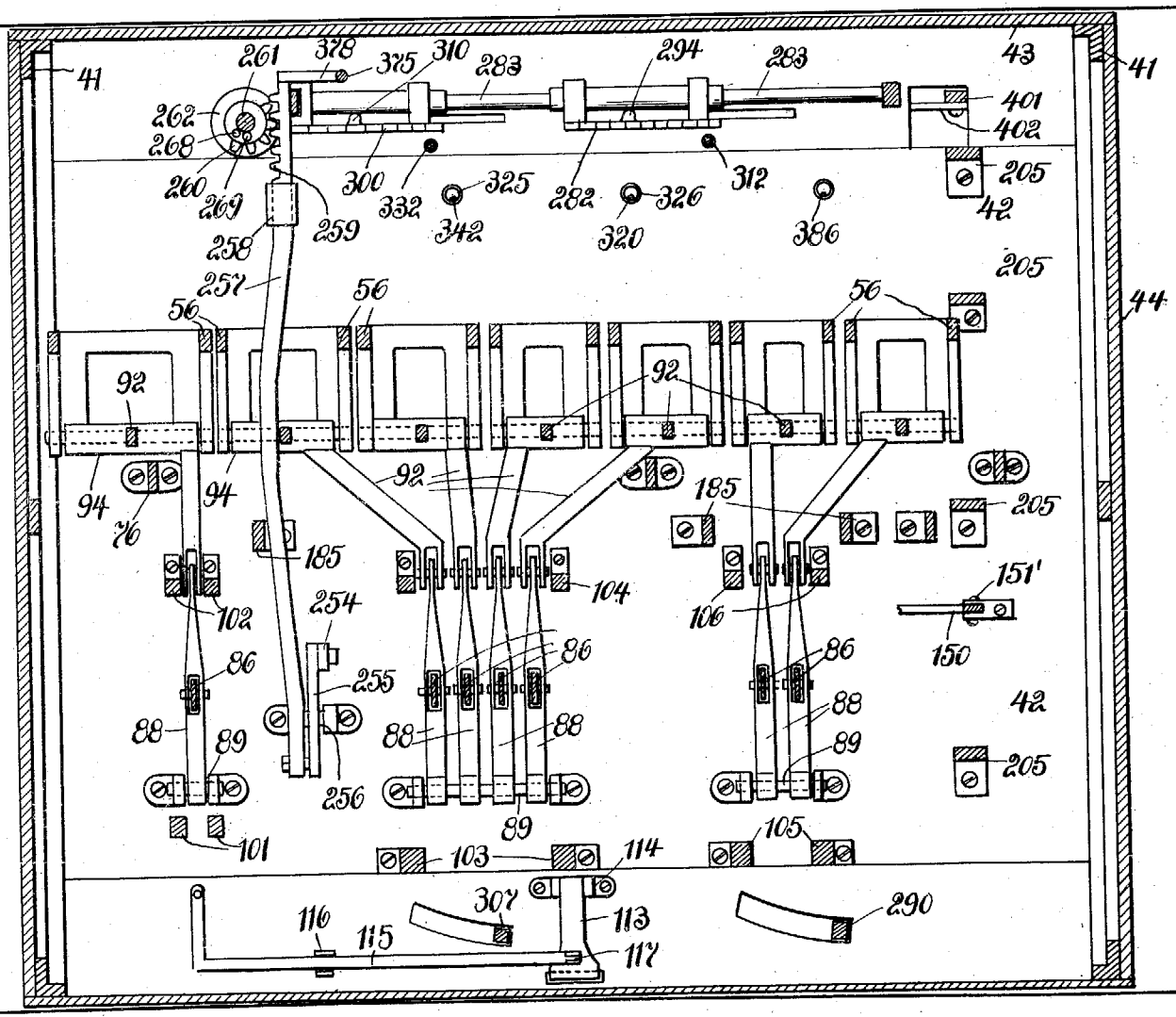
Figure 10:
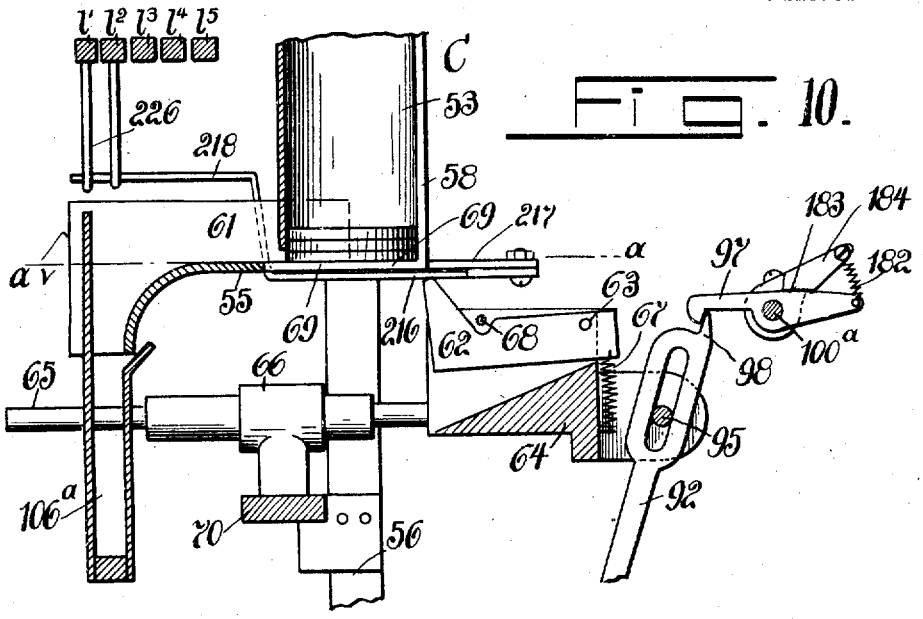
Figure 10A:
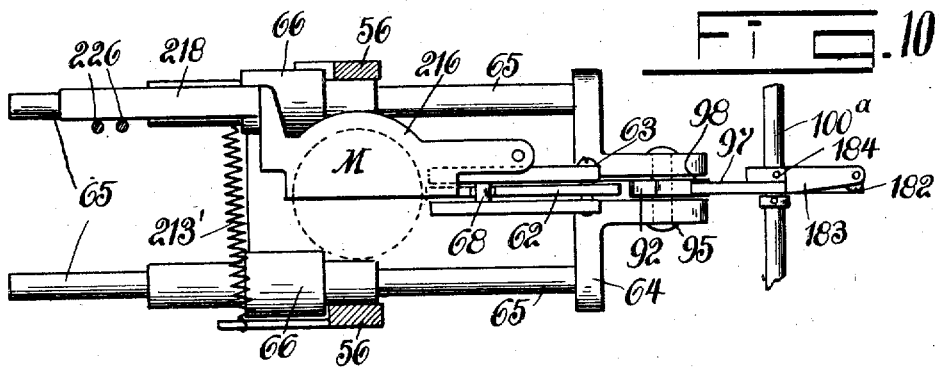
Figure 10B:
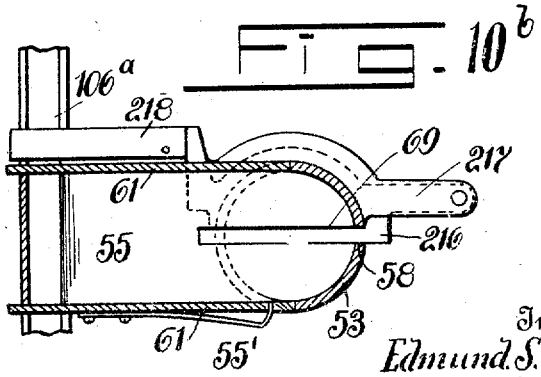
Figure 13:
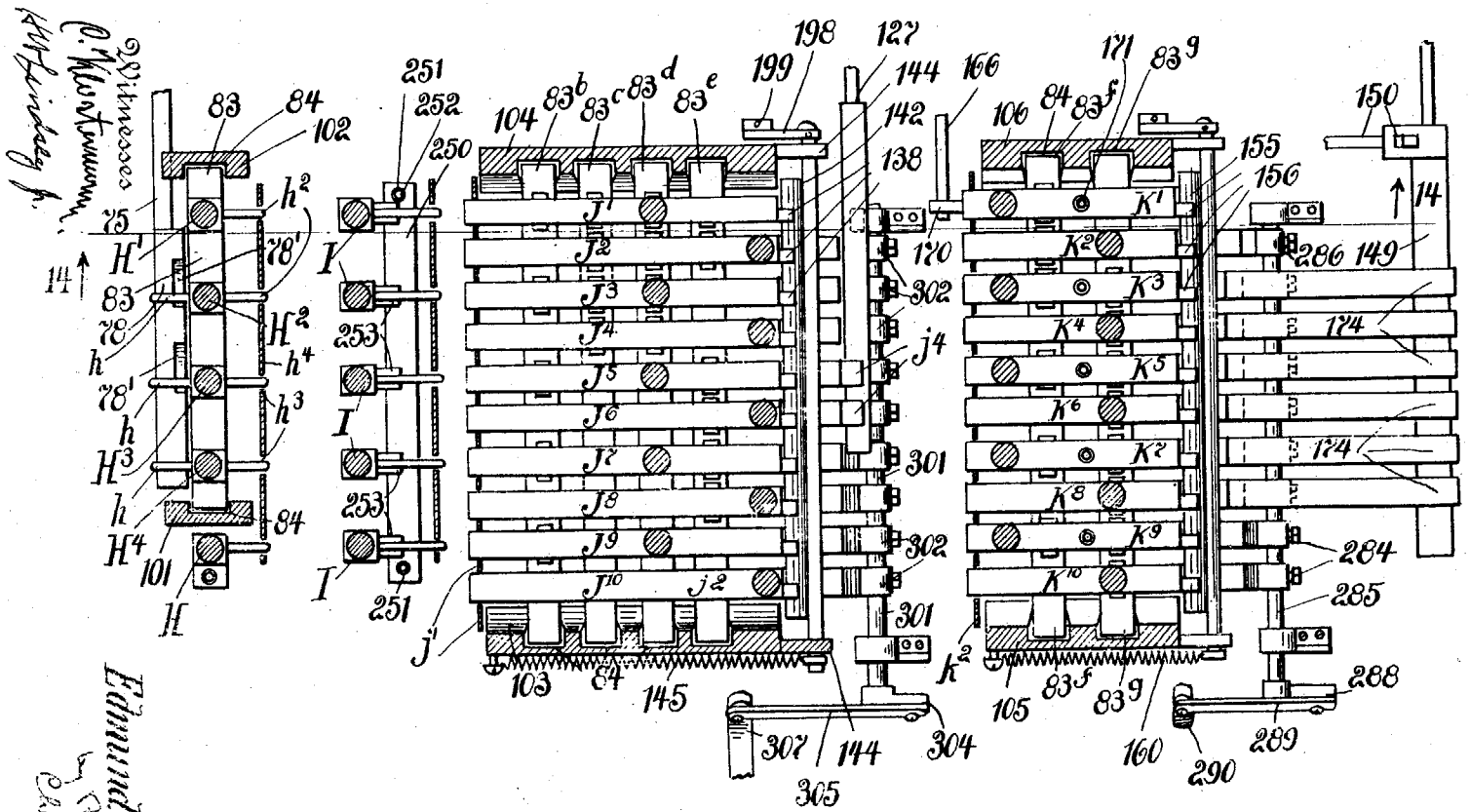
Figure 14:
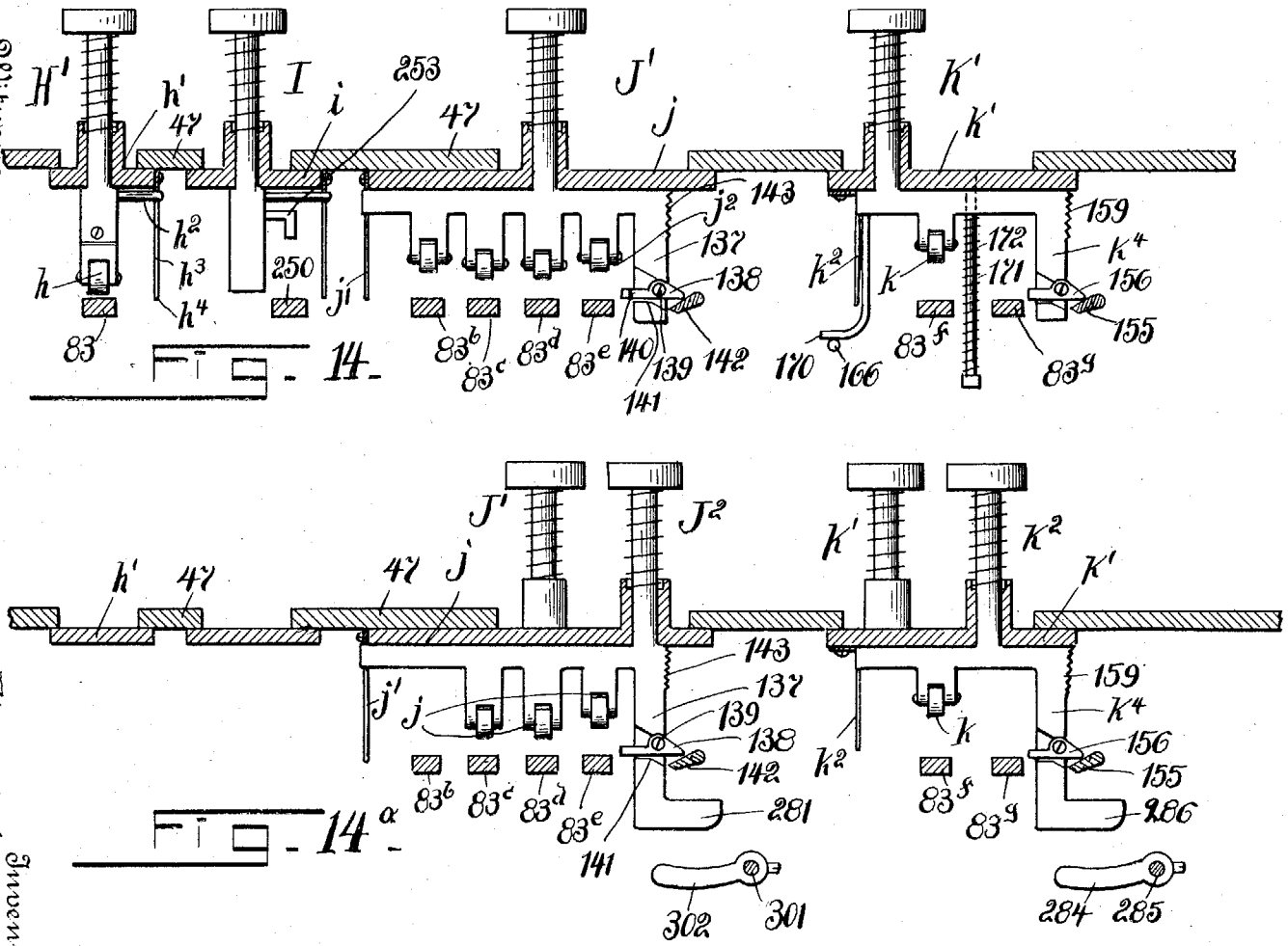

In the drawings: Figure 1 is a perspective of a machine embodying the invention. Fig. 2 is a side elevation viewed from the right side of the machine, the inclosing case and discharge-keys being shown in section. Fig. 3 is a vertical section taken on line 3—3 of Fig. 7. Fig. 4 is a similar view taken on line 4—4 of Fig. 7. Fig. 5 is a similar view taken on line 5—5 of Fig. 7. Fig. $5^a$ is a detail view of the connection between two of the latch-shafts. Fig. 6 is a side elevation viewed from the left side of the machine, the inclosing case and parts being shown in section. Fig. 7 is a view in horizontal section taken on line 7—7 of Fig. 6. Fig. 8 is a vertical longitudinal section taken on line 8—8 of Fig. 6. Fig. 9 is a view of a horizontal section on line 9—9 of Fig. 5. Fig. 10 is a detail central vertical section through one of the coin-delivery-devices, the ejector being shown in set or operated position. Fig. $10^a$ is a plan view of the parts shown in Fig. 10, the coin-holder and table being removed. Fig. $10^b$ is a section on line *a*—*a* of Fig. 10. Fig. 11 is a detail in central vertical section of one of the adjustable delivery-devices, the ejector being shown in set or operated position. Fig. $11^a$ is a horizontal section on line *a*—*a* of Fig. 11. Fig. 12 is a section on line 12—12 of Fig. 11. Fig. 13 is a plan view of the purchase-keys and parts associated therewith, the guides for the key-levers being shown in section. Fig. 14 is a section

Figures 19, 19A:
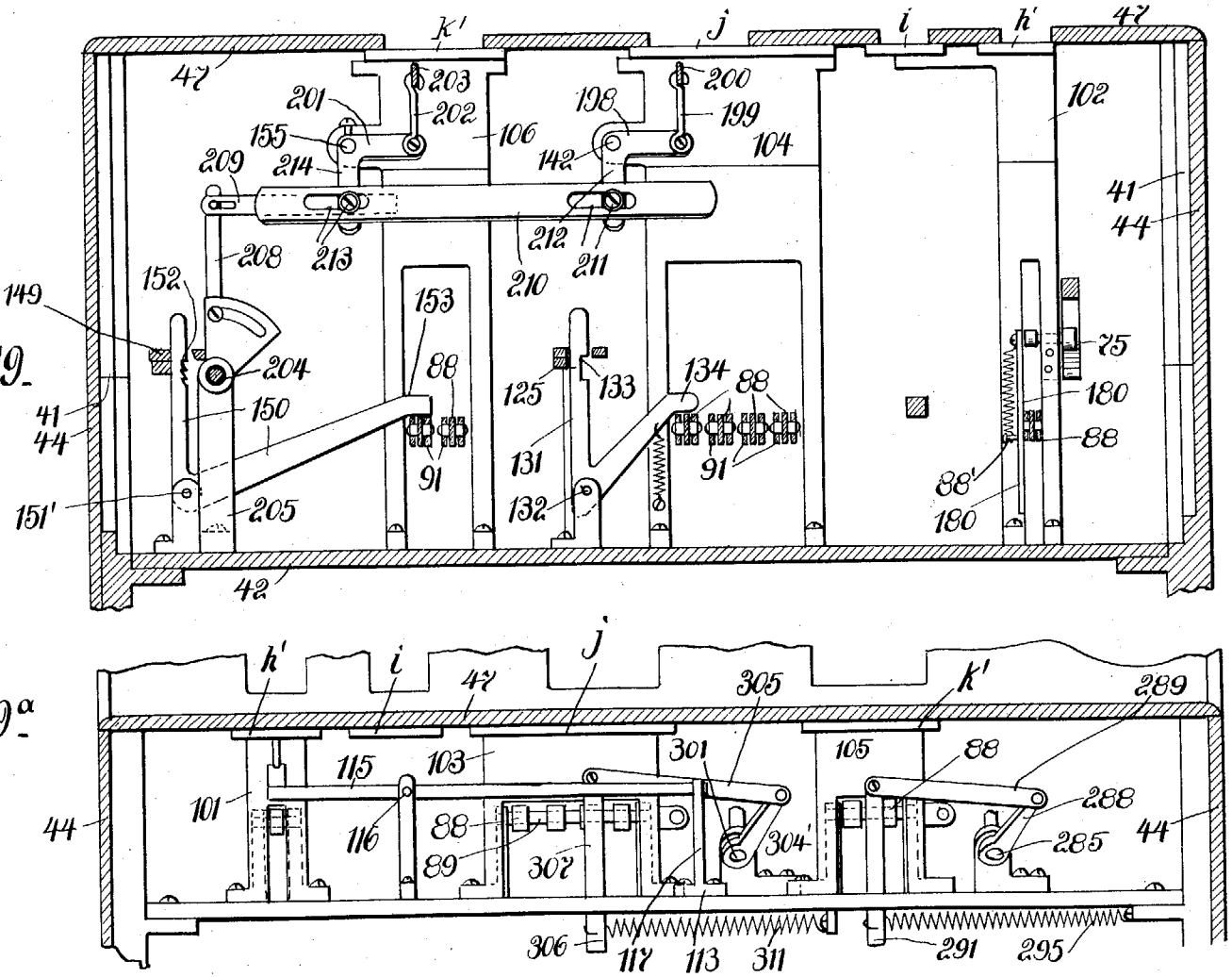
Figure 20:
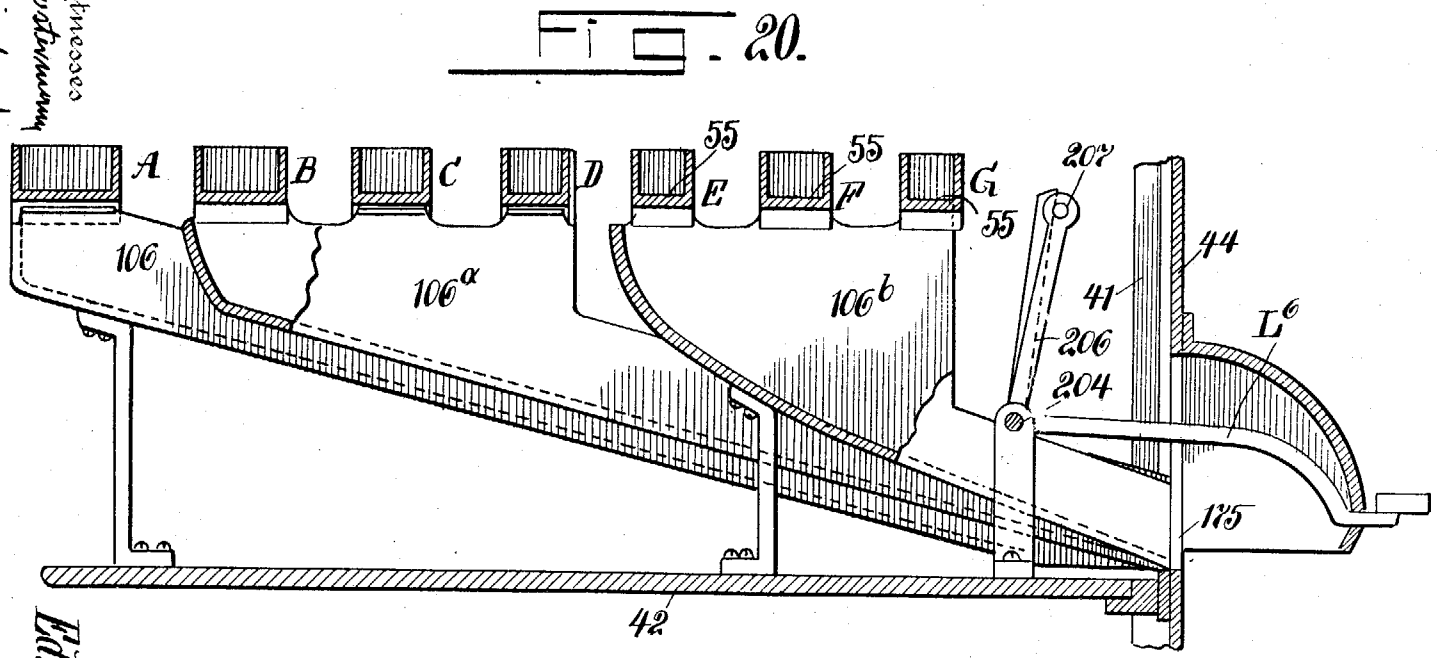
Figure 20A:
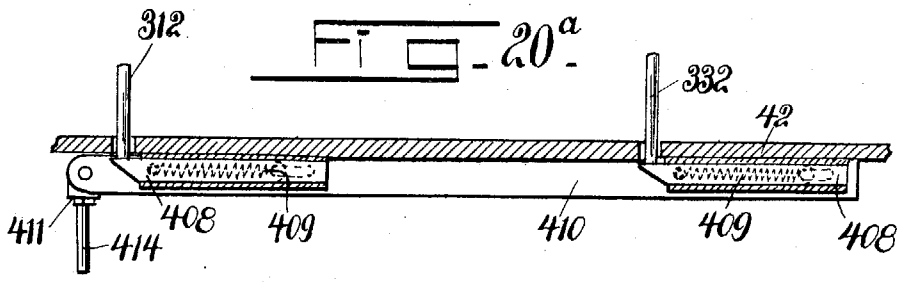
Figures 21, 21A:
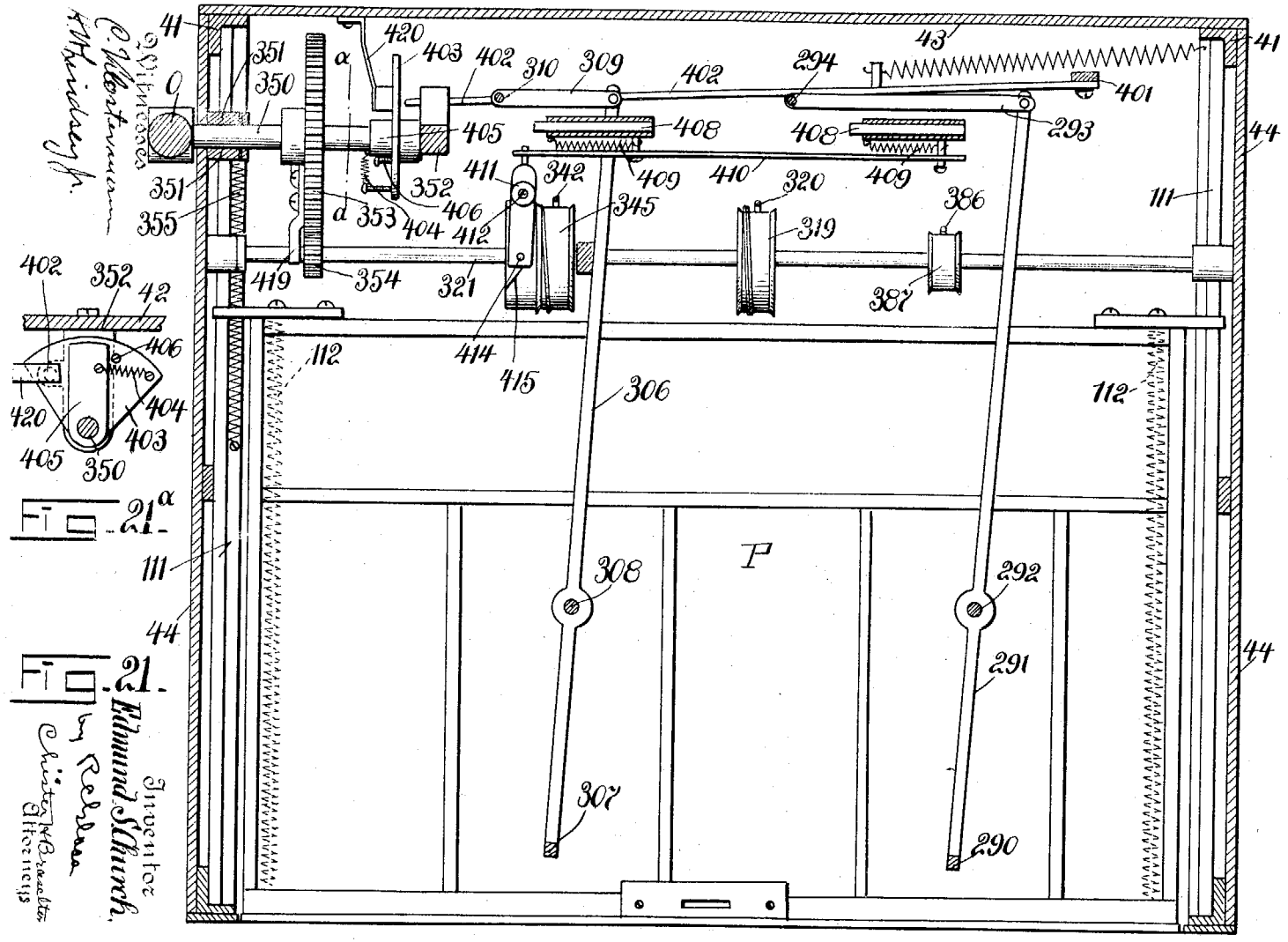
Figure 22:
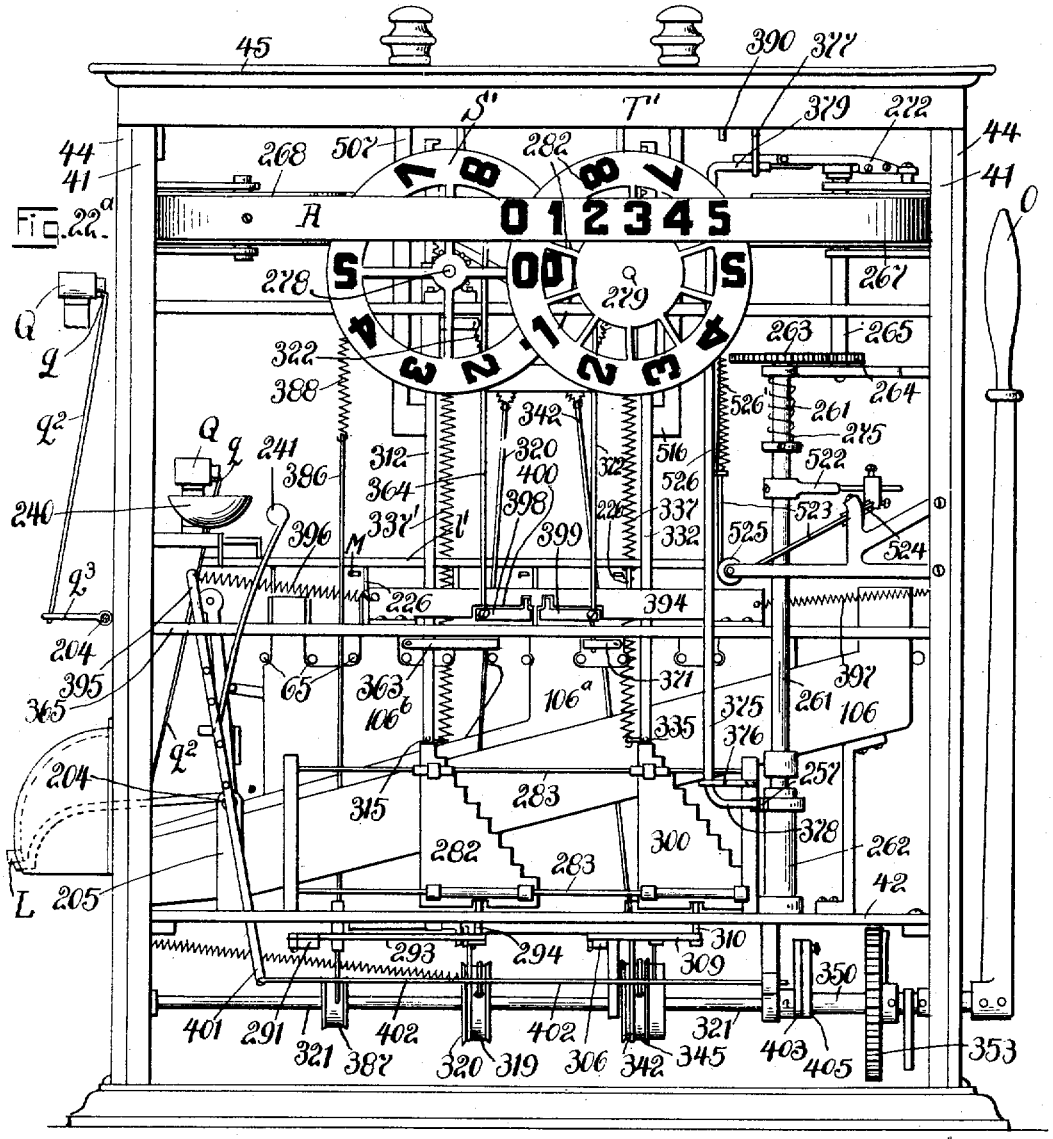
Figure 23:
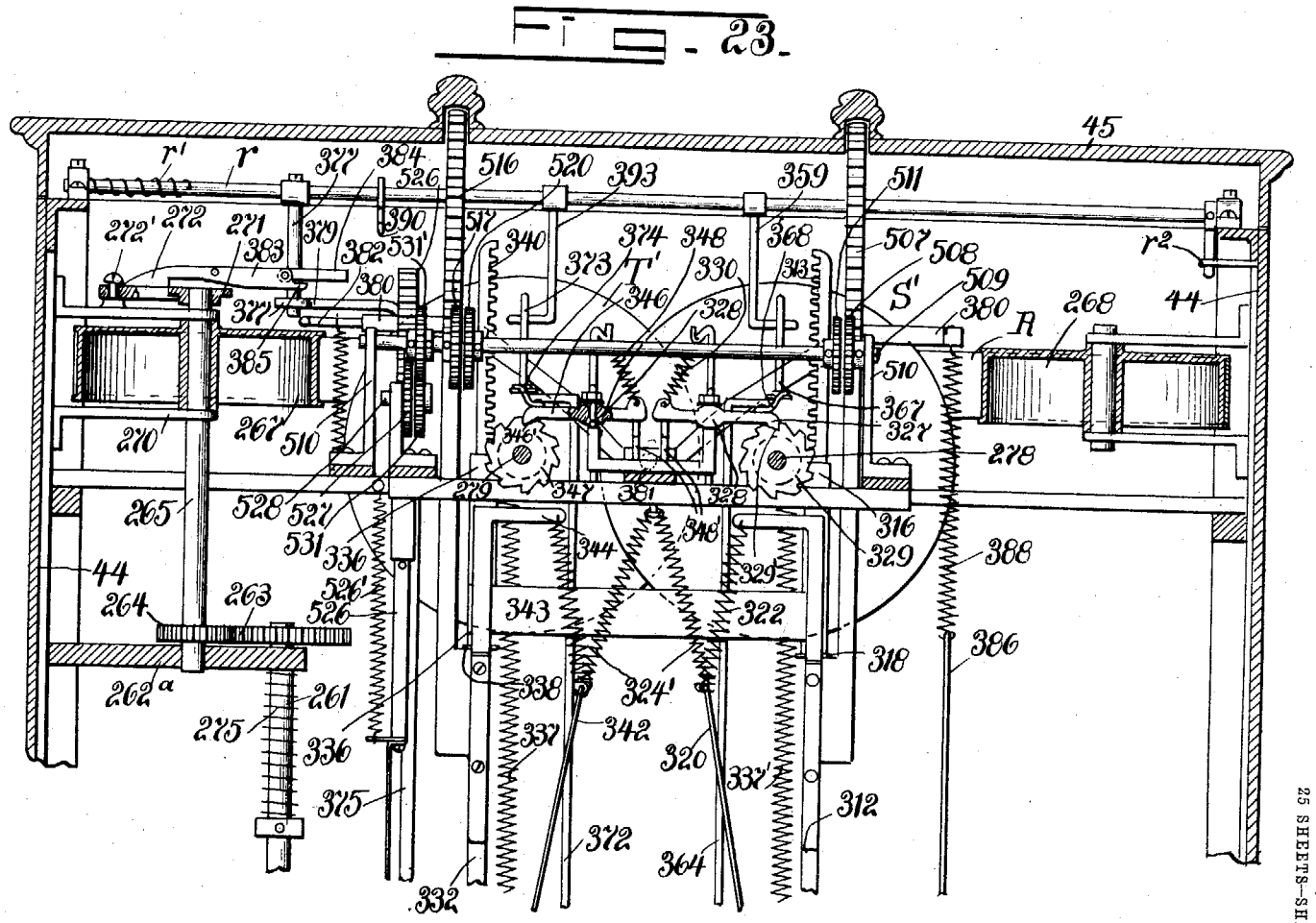

BEST AVAILABLE COPY on line 14—14 of Fig. 13. Figs. 14ª, 15, 15ª, 16, 16ª, 17, 17ª, 18, and 18ª, are similar views respectively and successively showing the purchase-keys. Fig. 19 is a view in vertical section on line 19—19 of Fig. 6. Fig. 19ª is a vertical section on line 19ª—19ª of Fig. 3. Fig. 20 is a detail rear view partly in section of the coin-run-ways. Fig. 20ª is a detail section of the indicator-locks. Fig. 21 is a plan view of the parts located in the drawer-compartment, the case being shown in section. Fig. 21ª is a detail view of the discharge-key-lock, being a section on line *a—a* of Fig. 21. Fig. 22 is a rear view, the back plate being removed. Fig. 22ª is a detail view of the operating-mechanism for the sales counter. Fig. 23 is a front view of the indicating and recorder-mechanism, the front indicator disks being removed, parts being shown in section. Fig. 24 is a plan of the register and indicating-mechanism the case being shown in section. Fig. 24ª is a horizontal section on line 24ª—24ª of Fig. 23. Fig. 24ᵇ is a detail front view of the indicator. Fig. 25 is a detail plan of the registering-mechanism. Fig. 25ª is a section on line *a—a* of Fig. 25. Fig. 25ᵇ is a section taken on line *b—b* of Fig. 25. Fig. 26 is a vertical transverse section through the coin-holders, and illustrating a modified construction thereof. Fig. 26ª is a vertical section on line *a—a* of Fig. 26. Fig. 26ᵇ is a detail plan of one of said coin-holders.

*The frame.*

The frame of the machine comprises a base 40, side-frames 41 (Figs. 5, 19 and 22) and a horizontal supporting-plate 42 (Figs. 2 and 9). The case which is supported by the frame comprises a back 43, sides 44, a top 45, an upper front-plate 46, and a keyboard plate 47.

*Coin receivers.*

A series of coin-receivers, one of each of the delivery-devices hereinafter set forth, is sustained in position to direct the coin into the coin-holders. Each receiver comprises a base 48 which forms a section of the cover for the holders, a rearwardly and downwardly inclined guide 49, a back or stop 50 and an inclined slot 51, of proper width to admit a coin of proper size, and which directs the coin angularly with respect to the holder, to facilitate passage of the coin to the bottom of the holder, where the coins will be superposed.

*Money-delivery devices.*

A series of delivery-devices (Figs. 7 and 8) for coins of different denominations to be handled by the machine, comprises; a device A for dollars; a device B for half-dollars; a device C for twenty-five cent pieces; a device D for nickels; a device E for dimes; another device F for nickels; and a device G for pennies.

Each delivery-device comprises a coin-holder for retaining a number of coins, which consists preferably of a tube 53, having an internal diameter corresponding approximately to the diameter of the coins. Each coin-holder (sheets 10 and 11), is sustained by a plate 54 extending between the frame-sides 41 and beneath the coin-receivers and is also secured in a delivery-device-frame comprising a table 55 which forms the holder-bottom whereon the coins rest. Said frame also comprises a pair of standards 56 and an annular extension 57, and is secured to plate 42. Each coin-tube has a vertical slot 58 through which the coins can be seen. A front-plate 59 and a plate of glass 59′ (Figs. 1, 2 and 3) extend across the front of the machine in front of the coin-holders and plate 59 has slots registering with tube-slots 58. Coin-table 55 is provided with rearwardly extending sides 61 between which coins discharged from the coin-holders are directed into runways for delivering the coins.

Each delivery-device (Figs. 10 and 11) comprises an ejector 62 pivotally sustained at 63 in a slidable frame 64 which is secured to a pair of rods 65, each of which is held in manner free to slide in a guide 66. Ejector 62 is pressed normally into position to engage the lowermost coin held in one of the coin-tubes, by a spring 67. Ejector 62 is pivotally sustained to permit the ejector to clear the coin during retraction. The ejectors are reciprocated longitudinally to effect removal of coins from the coin-holder. A stop 68 limits the pivotal play by the ejector. Coin-table 55 is formed with a slot 69, in which the upper end of the ejector 62 can travel to engage a coin in the holder. The ejectors of the delivery-devices adapted for single delivery are always held in proper elevation so the ejector, when operated, will engage the edge of the lowermost coin in the holder. In said devices ejector-guides 66 are rigidly secured to a cross-bar 70. A resilient strip 55′ (Fig. 10ᵇ) engages the lowermost coin to prevent accidental displacement.

The ejectors of delivery-devices A, E, F, and G are adapted to discharge either one or more coins and are vertically adjustable into proper elevation to engage more than one coin. Normally the ejectors are arranged to discharge a single coin, (Fig. 11). In each of said devices the ejector-rods 65 are held in vertically adjustable guides 66′, which are secured to rods 71 guided vertically in a cross bar 70′, secured to frame-standards 56. Springs 72 yieldingly hold the ejector-guides in lowermost position. A vertical slot 107 is formed in the back of

BEST AVAILABLE COPY the lower portion of the holder-tube 53 of each adjustable delivery-device, and therein a vertically adjustable gage or stop 108 is raised and lowered with the ejector, so that only the proper number of coins will be released for ejection from the tube. Gage 108 is secured to a guide 109 which is extended through frame-annulus 57 and is movable therein. Standards 109′ secured to vertically adjustable ejector guides 66 and to gage 108, raise and lower the gage correspondingly to the adjustment of the ejector. As a result the ejector is raised when more than one coin is to be delivered and gage 108 is correspondingly elevated to permit passage of only the desired number of coins from the tube. This construction avoids delivery of more than the proper number of coins, by one of the keys which control the operation of the delivery-devices. Gage 108 is adjusted so as to allow passage of the thickest coin while ejector 62 is adjusted to engage only one thin coin. Therefore the operation of the delivery mechanism is always positive and accurate in response to the keys.

The mechanism for shifting the ejector of each of the delivery-devices into operative position (Figs. 2 to 9) comprises, an actuating-lever 92 pivotally sustained at 94 in the delivery-device supporting-frame and comprises a vertical arm the upper end of which is connected by pin and slot 95 to the ejector-frame 64 and a horizontally extending arm 91. Each actuating-lever and ejector operated thereby is actuated, that is, its operative stroke is imparted thereto, by a spring 96. Each actuating-lever is provided at its upper end with a terminal 98 adapted to be engaged by a spring-pressed latch 97 loosely mounted on a shaft. Each latch holds the ejector in operated position, and when said lever is released the ejector is free for actuation by spring 96 to effect delivery of coin. Each actuating-lever is connected to and operated by a differentially swinging controller 83. A link 86 and a lever 88 pivotally sustained at 89 and pivotally connected to arm 91 of actuating-lever 92, form an operative connection between controller 83 and actuating-lever 92. Controllers 83, are each selectively controlled and operated by a series of keys, as hereinafter described. Each controller or key-lever 83 has each of its ends guided in curved groove 84 (Fig. 6) and both ends are normally seated against shoulders 85, which serve alternately as lever-fulcrums. The different keys of a series operate the controllers differentially, that is, some of said keys swing the levers about one of its ends and other keys swing the lever about its other end. Such construction of key-levers is advantageous, because it avoids use of long-levers.

The key-controlled and operated lever 83 (see Fig. 13) for delivery-device A, is guided in standards 101 and 102. The key-levers for delivery devices B, C, D, and E are guided in standards 103 and 104 and are respectively marked $83^b$, $83^c$, $83^d$, and $83^e$. The controller-levers for delivery-devices F and G are guided in standards 105, 106 and are respectively marked $83^f$ and $83^g$.

The mechanism for adjusting ejector 62 of device A for multiple delivery (Fig. 6) consists of a lever 75 pivotally sustained at 76, having its rear end slotted and connected to cross-bar 77 of the vertically movable ejector-guides 66′. Lever 75 has an inclined extension 78 at its front and has provided abutments 78′ which are arranged to be differentially operated by the keys of the series which control the delivery of dollars. Normally the ejector for coin holder A is guided in elevation to deliver a single coin, and therefore when one coin is to be delivered operating of lever 75 is not necessary. The several keys of said series are adapted to shift lever-arm 78 differentially to adjust the ejector into position, so the ejector will deliver either two, three or four coins.

When a plurality of coins is to be delivered by device A and lever 75 has been operated by a key the ejector will be held in adjusted position by a spring-pressed dog 178 (Fig. 6) which is pivotally sustained at 179 and is connected to a releasing-bar 180. Dog 178 is held normally out of the path of ratchet-teeth 75′ on lever 75 by a stud 88′ on ejector-actuating lever 88. When said mechanism is out of normal position releasing-bar 180 will permit dog 178 to be pressed into engagement with teeth 75′ of lever 75, and therefore, when lever 75 is operated it will first release dog 178 for engagement with teeth 75′ on lever 75. Said dog holds lever 75 and the ejector in assigned elevation and when the ejector operating-mechanism is restored to normal position, a pin 88′ on lever 88 will release dog 178. Springs 72 which yielding hold the ejector-guides 66 in normal position, restore lever 75 to normal position as soon as dog 178 is released. which occurs after the ejector has discharged the coin from the holder.

The mechanism for adjusting the ejector of delivery-device E, for multiple delivery (Fig. 4) consists of a lever 125 pivotally sustained at 126, and an arm 127 pivotally connected at 128 to the front end of lever 125. Arm 127 is extended into the path of abutments on the keys which control delivery-device E, as hereinafter described. The vertical shift necessary to effect proper adjustment to discharge two dimes is very slight. A lost-motion connection consisting of a spring 129 respectively connected to lever 125 and arm 127, forces lever 127 against

BEST AVAILABLE COPY a stop 130 which limits upward play of said arm and permits extended shift of arm 127 by a key. A dogging-lever 131 (Fig. 19) pivotally sustained at 132 and having a tooth 133, is adapted to engage lever 125, to hold said lever and the ejector carried thereby in position to deliver two coins. Spring 129 has sufficient tension to cause lever 127 to rock lever 125 about its pivot 126 and permits lever 125 to be snugly seated against tooth 133, to accurately position the ejector so but the desired number, that is two coins, will be delivered. This construction insures accurate adjustment of the ejector and the delivery of two coins despite slight variation of shift of key-shifted arm 127. Dogging-lever 131 is provided with a releasing-arm 134 extended into position to be engaged by the lever 88, of the ejector operating-mechanism for device E.

Coin delivery-device F is adjusted to deliver two nickels in one operation. The adjusting-mechanism (Fig. 3) comprises, a lever 164 pivotally sustained at 165, having an arm 166 extended forwardly into position to be depressed by one of the keys which control the operation of device F. The upper end of lever 164 is formed with a cam-surface 164′ adapted to engage and lift cross pin 77 of coin-delivery-device F, and a release pin 167, secured to the ejector actuating-lever 92 of delivery-device F. When lever 164 is operated to cause multiple delivery, cam 164′ will lift the ejector into and hold the ejector in adjusted position, and upon actuation of the ejector, release-pin 167 will restore the lever 164.

The mechanism for adjusting the delivery-device G for multiple delivery of pennies (Fig. 2) consists of a lever 149, pivotally sustained at 150′ and having its forward end extended into position to be shifted by the keys which control the operation of said device. The rear end of lever 149 is connected to cross-pin 77 of the ejector-guide for device F. Said lever is differentially shifted by the keys to cause delivery of two, three or four pennies, is held in depressed position by a dogging-lever 150 (Fig. 19), pivotally sustained at 151′, and having a series of teeth or steps 152 extending through lever 149 and adapted to engage said lever to hold the same in assigned position. Said lever is provided with an arm or extension 153 which is adapted to be engaged by lever 88 of delivery-device G. When said lever 88 is in normal position, logging-lever 150 will be released from adjusting-lever 149, but when said lever-arm 91 is out of normal position, locking-lever 150 will fall into position to latch lever 149 in either of its assigned positions and after delivery of the coin, lever 88 engages arm 150 to release lever 149.

The actuator-latch for delivery-device A is loosely mounted on a shaft 100. The actuator-latches for delivery-devices B, C, D, and E, respectively, are, loosely mounted on a shaft 100ᵃ and the latches for delivery-devices F and G are mounted on a shaft 100ᵇ. Shafts 100 and 100ᵃ are conjointly operated to effect simultaneous release of the actuating-latches held thereon, (Figs. 5, 6, and 7) by an arm 190, a link 191 and an arm 192. Each of the latches is normally held in position by a spring, and a stop 194, which is secured to the shaft whereon the latch is mounted. The latches are held normally in position to engage and hold the actuator-levers and when either of the latch-shafts is operated, so stops 184 will lift the latches thereon to release the actuator-levers. Shaft 100 is journaled in a lug 177 (Fig. 7) and one of the side-frames. Shafts 100ᵃ and 100ᵇ are journaled in standards 185. A spring 193 holds each of the shafts 100ᵃ and 100ᵇ normally in proper position to hold the latches carried thereby in operative position. Adjustable stops 194 (Fig. 2) encountered by arms 190, 196 limit the swing of each of said shafts respectively. Said shafts are operated separately and conjointly by mechanisms hereinafter described. The latches constitute the holding-means whereby the ejectors are held in set or operative position and by their operation control the actuation of the ejectors.

*Key-board.*

The key-board (Figs. 1 and 13) includes a series of keys H for operating coin-delivery-device A to deliver dollars in desired number; a key-series I for registering purchases amounting to one dollar or over; a series J for registering purchases in denominations of tens and multiples thereof and for selectively controlling coin delivery-devices B, C, D and E; and a series K for registering units and selectively controlling the operation of coin-delivery-devices F and G. The machine illustrated is designed to automatically deliver change amounting to one dollar and less, under control of the purchase-keys K and J, and to register amounts less than five dollars. When necessary, in making change for purchases of greater denominations, the additional currency can be provided by operation of delivery-device A or taken from the currency drawer. Key series H includes a drawer-controlling-key H⁵. Each key of the key-board is mounted in manner free to slide in a plate, is spring pressed into its normal position, and is provided with means for controlling or operating certain mechanism or mechanisms, as hereinafter more fully set forth.

*Dollar-keys.*

Key-series H (Figs. 13 and 8) comprises: a key H′ which is marked "1," has a roller

BEST AVAILABLE COPY at its lower end which is adapted to operate controller-lever 83 for delivery-device A, and set said device in operative position to deliver a dollar; a key $H^2$ which is marked "2," adapted to operate controller-lever 83 and is provided with an abutment $h$ adapted to shift and set adjusting-lever 75 into position to cause delivery of two dollar-coins; a key $H^3$ which is marked "3," adapted to operate controller-lever 83, and provided with an abutment $h$ adapted to shift and set adjusting-lever 75 into position to cause delivery of three dollar-coins; and a key $H^4$ which is marked "4," is adapted to operate controller-lever 83, and is provided with an abutment $h$ adapted to shift and set adjusting-lever 75 into position to cause delivery of four dollar-coins. Said keys are guided in a plate $h'$ mounted on standards 101 and 102, and each has a pin $h^2$ which travels in a slot $h^3$ formed in a plate $h^4$ to hold the keys against turning. The keys of series H are employed to deliver dollar-coins corresponding in numbers to the denominations marked thereon.

*Tens-keys.*

Key-series J comprises ten keys each of which is adapted to control a tens indicator or register, and to control the operation of the delivery-devices B, C, D, and E, to deliver coins corresponding in value to the difference between the amount respectively indicated thereon, and one dollar, less ten cents, which is accounted for by the unit-keys. The keys of said series are sustained in a plate $j$, which is mounted on standards 103 and 104, and are projected into slots formed in a plate $j'$ whereby the keys are held against lateral swing.

Key $J'$ of the series J is marked "0" and controls the delivery-devices necessary when the amount of the purchase is less than ten cents, (Figs. 13 and 14). Said key is provided with rollers $j^2$ adapted to engage and shift each of the controller-levers for delivery-devices B, C, D, and E. As a result said key controls and sets into position for actuation delivery-device B to deliver a fifty-cent coin; delivery-device C to deliver a twenty-five cent coin; delivery-device D to deliver a nickel; and the delivery-device E to deliver a dime. The total value of the money which may be delivered by operation of said key will be ninety cents.

The next key, $J^2$ of series J (Figs. 13 and $14^a$) is marked "50" and is provided with rollers $j^2$ adapted to operate each of the controller-levers for delivery-device C to deliver a twenty-five cent coin; delivery-device D to deliver a nickel, and delivery-device E to deliver a dime. The total value of the coins which may be delivered by operation of key $J^2$ is forty cents and the remainder of the change will be accounted for by the unit-keys.

Figures 15, 15A:
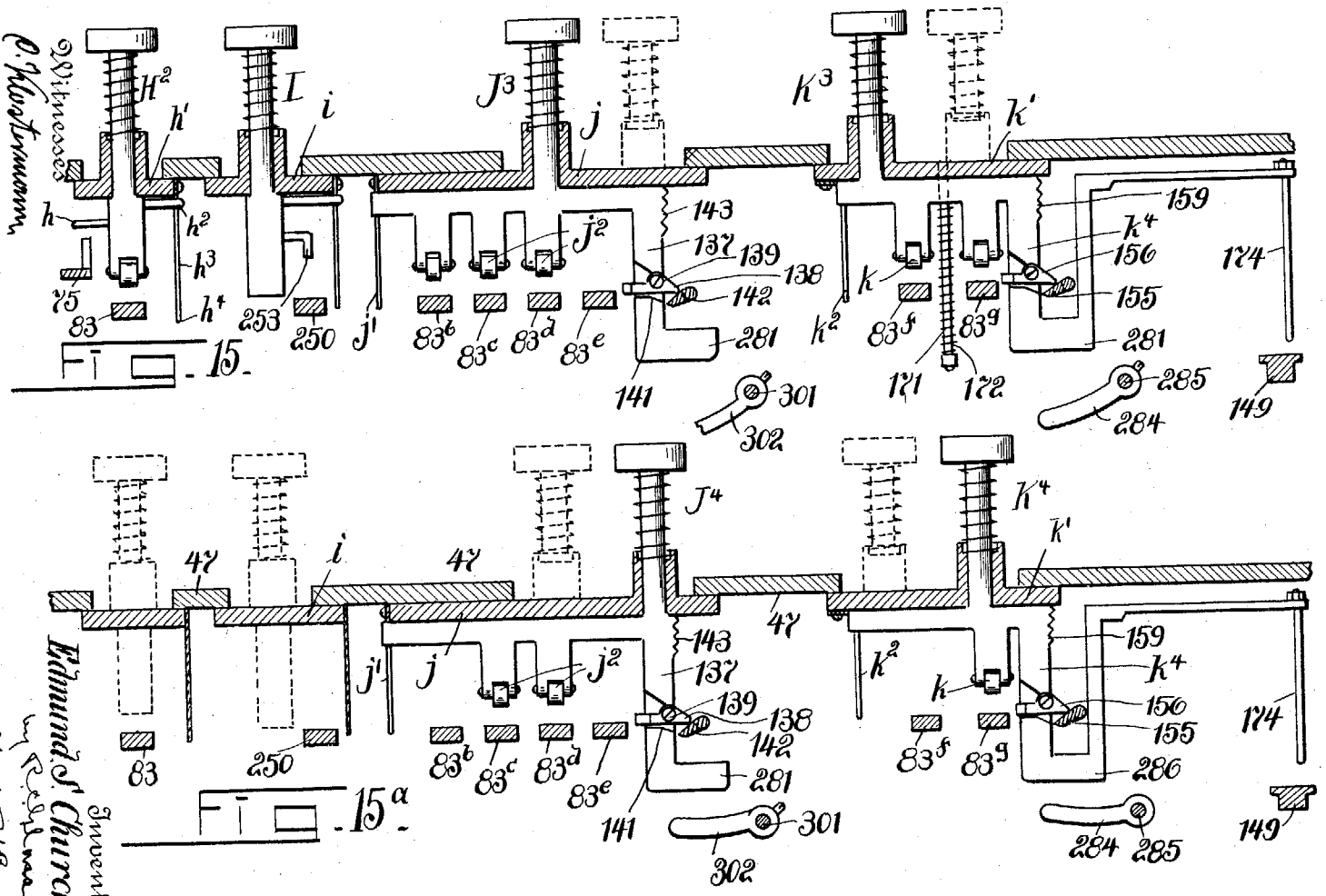

The next key $J^3$ of the series J (Figs. 13 and 15) is marked "10" and is provided with a roller $j^2$ adapted to operate the controller-levers for devices B, C, and D to deliver a half-dollar, a quarter-dollar and a nickel.

The next key $J^4$ (Figs. 13 and $15^a$) of the series J, is marked "60" and is provided with rollers $j^2$ adapted to operate controller-levers for devices C and B to deliver a quarter and a nickel.

The next key $J^5$ (Figs. 13 and 16) of series J is marked "20" and is provided with rollers $j^2$ for operating the controller-levers for delivery-devices B and E to deliver a half-dollar and two dimes. This key is provided with an abutment $j^4$ adapted to operate adjusting-lever 127 (Fig. 4) of delivery-device E into position to cause delivery of two dimes.

The next key $J^6$ (Fig. $16^a$) is marked "70" and is provided with a roller $j^2$ for operating the controller-lever of delivery-device E to deliver a dime. Said key is also provided with an abutment $j^4$ for operating adjusting-lever 127 to cause delivery of two dimes. As a result of the operation of said key, two dimes may be delivered.

The next key $J^7$ (Fig. 17) of the series J, is marked "30" and is provided with rollers $j^2$ adapted to operate the controller-levers for delivery-device B to deliver a half-dollar, and for delivery-device E to deliver a dime. Said key will thus control delivery of 60¢.

The next key, $J^8$ (Figs. 13 and $17^a$) of the series J is marked "80" and is provided with a roller $j^2$ for operating the controlling-lever of delivery-device E to deliver a dime.

The next key $J^9$ (Figs. 13 and 18) of the series J, is marked "40" and is provided with a roller $j^2$ for operating the controller-lever of delivery-device B into position to deliver a half-dollar.

The next key $J^{10}$ of series J is marked "90" (Figs. 13 and $18^a$). Said key does not operate either of the controller-levers for the delivery-devices because the corresponding change, that is 10¢, will be accounted for by the unit-keys.

Each key of series J is provided with an extension 137 having teeth 143 near its upper end which are adapted to engage a spring-pressed detent 142, whereby either of the keys will be held or locked in depressed condition after sufficient downward movement has been imparted to a key to operate the controller levers. Said detent is pivotally sustained at 144 in standards 103 and 104 and is yieldingly held in the path of teeth 143 by a spring 145, (Figs. 13 and

BEST AVAILABLE COPY

14). This device serves as a locking-device for holding the keys in operated position and whereby the controller-levers and delivery-devices will be held in operative position. Detent 142 extends into the path of movement of the teeth 143 of all of the keys of series J so that all of the teeth will be respectively locked thereby.

The detent is operated to release the keys, when the money-delivery-devices are actuated to deliver coin, by mechanism hereinafter set forth. An operated key, held by the locking-device is also released when another key of the same series is depressed to permit correction of the entry in event of error or when that is desired for other reasons. The key-operated means for operating the locking-device to release a previously depressed key, comprises releasing-dogs 138 (Figs. 13 and 14) one of which is pivoted to each of the keys at 139 and each dog has a tail 140 coöperating with an abutment 141 on each key during the initial part of the downward movement of the key to release detent 142 from engagement with teeth 143 of a locked key before the teeth 143 of the last operated key pass into engagement with the detent. During retraction of the key, dog 138 will move about its pivot to clear detent 142. These releasing-dogs thus serve as key-operated means for operating the key-lock to release a previously depressed key when another key is depressed.

To reset and restore the delivery-devices set into operative position by a previously depressed key it is necessary to operate the actuator-latches 97 which are mounted on shafts 100 and $100^a$. This operation is effected (Figs. 7, 13 and 19) by an arm 198 secured to oscillate with detent 142. Set arm is connected by a link 199 to an arm 200 which is secured to latch-shaft $100^a$. Release of the actuator-latches for delivery-devices A, B, C, D, and E is effected by said mechanism independently of the unit-keys so only the delivery-devices controlled by the keys of series J will be released during a resetting operation. Operation of arm 200, when the locking-device is operated by one of the keys of series J will oscillate shafts $100^a$ and 100 sufficiently to cause arms 184 to lift the actuator-latches from engagement with any actuating-lever held thereby. Resultantly when the key-lock for series J is operated by a key, the delivery-devices will be first released and restored to normal position and then reset in accordance with the key last operated.

*Unit-keys.*

A series of keys, K, each marked with one of the coin-units is adapted to control the operation of delivery-devices F and G. The unit-keys and devices controlled thereby can be operated in conjunction with either of the keys of series J, and therefore, by selection of one of the unit-keys and one of the series J, any amount less than $1.00 can be registered and coins of the value of the difference between the purchase and one dollar can be delivered.

The unit-keys operate controller-levers $83^f$ and $83^g$ which control delivery-devices F and G and cause delivery of nickels and pennies. Said keys are guided in a plate $k'$, mounted on standards 105 and 106, and in slots formed in a plate $K^2$. Certain keys of said series are also guided by a rod 171 and presse upwardly by a spring 172.

Key K′ (Figs. 13 and 14) of series K, is marked "0" and is provided with an abutment 170 adapted to engage arm 166 of the adjusting-lever 164 for the ejector of delivery-device F to deliver two nickels, and with an abutment or roller for operating controller-lever $83^f$ to set said delivery-device into operative position. Operation of said key causes delivery of two nickels, which account for the difference between 90¢, accounted for by the tens-keys and one dollar.

The next key, $K^2$, of the unit series (Figs. 13 and $14^a$), is marked "5" and is provided with an abutment $k$ for setting delivery-device F into operative position to deliver one nickel.

The next key, $K^3$, (Figs. 13 and 15) is marked "1" and is provided with abutments $k^2$ for setting each of the delivery-devices F and G, and with an adjustable abutment 174 for shifting adjusting-lever 149 into position to cause the delivery of four coins. As a result, depression of key $k^3$ will set the delivery-devices F and G to deliver one nickel and four pennies.

The next key, $K^4$, (Figs. 13 and $15^a$) is marked "6" and is provided with an adjustable abutment 174 whereby adjusting-lever 149 will be set to cause device G to deliver four pennies, and with an abutment $k$ for setting delivery-device G into operative position.

The next key, $K^5$, (Figs. 13 and 16) is marked "2" and is provided with an abutment 174 for setting adjusting-lever 149 to cause delivery of three pennies, and abutments $k$ for setting delivery-device F to deliver one nickel and delivery-device G to deliver three pennies.

The next key, $K^6$, (Figs. 13 and $16^a$) is marked "7" and is provided with an abutment 174 for setting adjusting-lever 149 into position to cause device G to deliver three pennies and an abutment $k$ for setting delivery-device G into operative position.

The next key, $K^7$, (Figs. 13 and 17) is marked "3" and is provided with an adjustable abutment 174 for setting adjusting-lever 149 into position to cause delivery-device G to deliver two pennies, and abutments

BEST AVAILABLE COP'

*k* for setting the delivery devices F and G. Depression of said key sets said devices to deliver one nickel and two pennies; the difference between 3¢ and 10¢.

The next key, $K^8$, (Figs. 13 and $17^a$) is marked "8" and is provided with an adjustable abutment 174 for setting adjusting-lever 149 to cause delivery-device G to deliver two coins and an abutment *k* for setting said device into operative position.

The next key, $K^9$, (Figs. 13 and 18), is marked "4" and is provided with abutments *k* for setting delivery-devices F and G into operative position and to deliver one nickel and one penny respectively; the total, 6¢, being the difference between 4¢ and 10¢.

The next key, $K^{10}$, (Figs. 13 and $18^a$), is marked "9" and is provided with an abutment *k* adapted to set delivery-device G into operative position to deliver one penny; the difference between 9¢ and 10¢.

Each key of series K is provided with an extension $K^4$ (Figs. 13 and 14) having teeth 159 which coöperate with a detent 155, to lock said keys in operated position after the controller-levers have been operated. Said detent is common to all of the keys of said series, is pivotally sustained by standards 105 and 106 and is pressed into the path of teeth 159 (Fig. 13) by a spring 160 (Fig. 13). Each key is provided with a releasing-dog 156, which shifts the detent during initial downward movement of a key K and swings clear of the detent during retraction of the key. An arm 201 (Fig. 19) is secured to oscillate with detent 155 and is operatively connected to actuator shaft $100^b$ by a link 202 and an arm 203 which is secured to said shaft. Such mechanism serves as key-operated releasing-means for the actuating-levers for delivery-devices F and G and causes restoration of said key held in operated position and said devices to normal position, when a key of series K is operated, while another key is held in operated position. Resultantly upon depression of a key to correct an entry, said delivery-devices will be reset to correspond to the key last operated. Such releasing operation affects only the actuator-latches on shaft $100^b$ which control devices F and G, which are operated in response to the keys of series K, and therefore the keys of series J and the devices controlled thereby are not disturbed when correction is made in key-series K.

*Discharge-controlling devices.*

The discharge-controlling-means comprises a series of keys L (Fig. 1) arranged at the right-hand side of the machine in close proximity or immediately above the coin exit. Such arrangement makes it possible to depress one of the keys with the thumb and to receive the change in the palm of the same hand. Key-series L comprises keys, L′, $L^2$, $L^3$, $L^4$, $L^5$, $L^6$, each of which is loosely pivoted upon a shaft 204, (Figs. 2, 7, and 8), journaled in bearings 205. Said shaft has rigidly secured thereto bars or arms 206, at the distant end of which is secured a universal-bar 207, which extends across a vertical arm 1 of each of the levers of series L. When either of the levers of said series is operated, universal-bar 207 will be shifted and rock shaft 204. An arm 208 is adjustably secured to shaft 204 and said arm has an operative connection whereby all of the actuator-latches are operated to cause the actuation of all of delivery-devices which have been set into operative position by the purchase-keys. Said connection consists (Fig. 19) of a link 209, pivoted to a connecting-bar 210, which is connected by pin and slot 211 with an arm 212, secured to rock with detent 142 and by a pin and slot 213 to an arm 214, which is secured to detent 155. This connection operates all of the actuator-latches to release the delivery-devices when any key of series L is depressed. Slots 211 and 213 permit independent shift of the latches on shaft 100 by one of the key-detents and of the latches on shaft $100^a$ by another of the detents and which independent operation is necessary in making correction to correspond with a sale.

Operation of either of the discharge-keys will operate universal-bar 207, arms 206, rock-shaft 204, and arm 208 to shift link 209 and bar 210. Said bar will shift arms 212, 198, link 199 and arm 200 to rock shafts $100^a$ and 100 to release the latches carried by said shafts, and will operate key-detent 142 to release the keys of series J, and will operate arms 214, 201, link 202 and arm 203 to release the latches carried by shaft $100^b$, and detent 155 to release the keys of series K. Such operation of the latches will cause the actuating-springs 96 to operate the ejectors of the delivery-devices which have been set into operative position by the keys which have been operated. The discharge-keys thus control the operation of the delivery-devices to deliver change, after the devices have been controlled or operated in response to the purchase-keys, and cause restoration of the purchase-keys and controllers and delivery-devices into normal position. In the operation of the machine, the purchase-keys are operated in like manner, regardless of the amount deposited in the holders. If, therefore, the amount of the deposit is less than one dollar the operation of the delivery-devices is controlled by the keys of series L, which are respectively differentially connected with the delivery-devices, to control the delivery of the coin in accordance with the amount received. Since operation of the purchase-keys control and render operative the delivery-device to cause

BEST AVAILABLE COPY delivery of change for the coin of maximum value ($1.00), the change-delivery to correspond to receipts of lesser amounts is controlled by the operation of valves M. Each of the devices B, C, D, E, F and G is provided with a valve M (Figs. 7, 8, 10 and 10[a]). Said valve consists of a plate 216 pivoted to an ear 217, projecting forwardly from the coin-table 55 of said devices. Each valve is arranged to extend normally beneath slot 69 of said table, in which ejector 62 travels while discharging a coin, and has an arm 218 extending rearwardly whereby the valve is shifted about its pivot into and out of closed position. When the valve is operated by means hereinafter described, plate 216 will be shifted laterally so ejector 62 will be pressed into elevation to engage the lowermost coin in the holder. These valves are held normally in closed position by springs 213′ so when the ejector is shifted from normal to operative position, (Figs. 8 and 11) it travels beneath the valve and is held away from the coin by the valve. When the valve is opened the ejector is pressed by its spring 67 into position to engage the lowermost coin. The valves control the delivery of change by their ejectors and protect the coin from contact with the ejectors.

The mechanism for differentially operating the valves to control the discharge of change comprises a series of bars $l'$, $l^2$, $l^3$, $l^4$, $l^5$, respectively connected to discharge-keys L′, $L^2$, $L^3$, $L^4$, $L^5$. Springs 223 restore each of said bars to normal position. Each of said bars (Fig. 8) is mounted in manner free to slide in guides 224 and 225′, is provided with a stud 226 for each of the valves to be shifted thereby, and is connected by a pin and slot 227 to the discharge-key.

Key L′ is marked "$1.00" and controls the delivery of change for a dollar, or when the value of the money received amounts to one dollar, or when change to be delivered aggregates one dollar. Bar $l'$ which is connected to key L′ is provided with a pin 226 for opening the valves of all of delivery-devices excepting device A, which is controlled entirely by keys H.

Controller key $L^2$ is marked "50" and bar $l^2$ operated thereby is provided with a pin 226 for the valves of each of the delivery-devices except A and B. Therefore, when said key is operated to cause delivery of the coins, delivery-device B will remain closed and will move to normal position without delivering a coin therefrom. Said lever is operated when the amount deposited aggregates 50¢ in value and the change to be delivered is to be the difference between the amount indicated on the purchase-keys depressed and 50¢. By preventing the delivery of a half-dollar from holder B, the value of the delivered coins will be equal to the difference between the amount deposited and the amount indicated on the depressed keys.

Key $L^3$ is marked "25" and controls the delivery of the coins, when the aggregate value of the purchase-money exceeds the amount indicated on the depressed keys more than 15¢ and less than 25¢. Said key is connected to bar $l^2$ which has studs for opening the valves of delivery-devices D, E, F and G.

Key $L^4$ is marked "10," controls the operation of the valves to deliver change when the purchase-money exceeds the purchase-price less than 10¢ and is connected to bar $l^4$ which is provided with studs for operating the valves of delivery-devices D and G. It frequently occurs that the aggregate value of the amount deposited is not a multiple of ten so it is necessary to provide supplemental operating-means, (Fig. 8), for delivery-device D, to operate said device to deliver a nickel every time lever $L^4$ is operated. Delivery of the pennies is controlled by a stud 226 on bar $l^4$, adapted to operate the valve for delivery-device D. Should the purchase-money aggregate in value a multiple of ten, delivery-device F will be set into operation only when a unit-key lower than six, is operated, and not when either of the other unit-keys is operated. To make correct change when the amount received is not a multiple of ten, *e. g.*, when the purchase-price is 28¢ and the purchase-money is 35¢, at which time delivery-device F would not be set into operative position by the "8" key of unit-series, discharge-key $L^4$ is adapted to operate delivery-device D to provide the deficit, *i. e.*, five-cents. The supplemental device operating delivery-device D to deliver a nickel, comprises a bar 228 (Fig. 8) pivoted at 229 to discharge-key $L^4$ and provided with a shoulder 230. A pin 233 secured to a lever 231, which is pivoted at 232 and connected by a link 234 to an arm 235, which is secured to the actuating-lever 92 of delivery-device D. A slot 236 permits operation of said actuating-lever and device independently of the supplemental operating means. The lower end of bar 228 is provided with a cam 238, adapted to ride on a roller 239 whereby bar 228 will be raised to disengage shoulder from pin 233, after the delivery-device has been shifted into operative position. During operation of key $L^4$ the delivery-device D will be shifted into operative position and operated to deliver a coin by its actuating-spring. When said actuating-lever 92 is operated by the supplemental operating-means the actuator-latch will be held out of the path of lever 92 by key $L^4$, and delivery-device D will not be held by its latch 97. Cam 238 will disengage shoulder 230 from pin 233 to immediately free the delivery-device D, so a coin will be

BEST AVAILABLE COPY delivered, simultaneously with delivery of coins from delivery-device G. When bar 228 passes to normal position upon release of discharge-key $L^4$, shoulder 230 will again pass into operative relation with pin 233. This device last described serves as means for operating a delivery-device not rendered operative by the purchase-keys when operation thereof is necessary to deliver correct change.

A discharge-key $L^5$, marked "5" is connected to bar $l^5$ which has a stud for opening the valve for delivery-device G. Said key is employed when the difference between the purchase-price and purchase-money is less than five-cents.

A key $L^6$, marked "Even," is employed to release the actuating-levers without opening either of the valves, when the purchase-price equals the purchase-money or when no coin is to be withdrawn. This key is extended to engage universal bar 207 to operate the actuator-latches and restore the delivery-devices to normal position.

The discharge-keys thus differentially control the delivery of change by selectively operating the valves. The operator by selection of a discharge-key regulates delivery of change according to the purchase-money. These keys, also cause simultaneous actuation of the delivery-devices to deliver proper change after the devices have been selectively set into operative position by the purchase-keys.

*Coin-runways.*

Coins from delivery-devices A are discharged into an inclined run-way 106 (Fig. 20). Coins from holders B, C and D are discharged into a run-way $106^a$, and the coins from holders E, F and G are discharged into a run-way $106^b$. Each of said run-ways conducts the coins to an exit 175, in the side of the case at the right hand of the machine. Each of the run-ways is narrow to cause the coins to roll on their edges to deliver the coins into the right hand of the operator. The several run-ways are graduated in length and differently inclined, so that coins, which are of different denominations, when simultaneously discharged into their respective ducts, will reach the exit at substantially the same time or at least in rapid succession. This makes it possible to dispense with a receiver from which the coin must be removed manually, and avoids likelihood of the operator missing a coin by withdrawal of his hand before all the change has been delivered.

*Money-drawer.*

The foremost key $H^5$, of series H, is used to release a money-drawer (Figs. 4, 9 and 19). A compartment conveniently located below plate 42 contains a drawer P, mounted in manner free to slide on rods 111 (Fig 2), one of which is secured in each of the side-frames 41. A spring 112, having one of its ends secured to base 40 and its other end connected to the drawer, is arranged at each side to shift the drawer outwardly. A latch 113 normally holds the drawer against spring-shift. Said latch is pivoted at 114 and is operated to release the drawer by key $H^5$. A lever 115 (Fig. $19^a$), having an arm extended into the path of the lower end of key $H^5$, is pivoted at 116, and is connected to latch 113 by a link 117. The operation of the drawer key will be as follows: Depression of key $H^5$ will operate lever 115 to withdraw latch 113 from engagement with the drawer. Upon such withdrawal the drawer will be shifted outwardly by spring 112. When access to the drawer containing paper currency is desired, it is only necessary to depress the key $H^5$.

*Sales counter.*

A counter, Q, is provided to record the number of purchases or the number of times the machine is operated for making change. Said counter (Figs. 1, 22, $22^a$) may be of any suitable construction, that shown being one commonly known as the "Veeder", which is adapted to be operated by oscillation of an arm $q$, which is connected by a link $q^2$ to an arm $q^3$, rigidly secured to shaft 204 of the releasing-mechanism for the delivery-devices. Every time one of the discharge-keys is operated, arm $q^3$ will oscillate arm $q$ of the counter-arm and advance the counter one step. The counter is provided with a series of counter-wheels which will indicate the number of times the machine has been operated to make change, or the number of sales.

*Operation of cashier.*

The operation of the mechanism thus far described will be as follows: When a sale is made the clerk will depress a tens-key and a units-key corresponding to the amount of the sale. The keys will be held in operated position by their locking-devices. The delivery-devices necessary to deliver coins aggregating in value the difference between the sale and the sum of one dollar, will be set into operative position to deliver such coins when the delivery-devices are actuated. The actuator-latches will hold the delivery-devices in operative position. If, inadvertently, the wrong key of either series is depressed, the entry can be corrected by depression of the proper key which will then first release the previously operated key of the same series and release the controlling-devices, so the controllers will be restored to normal position by the actuating-springs 95, and then reset the delivery-devices to correspond with the key last operated. It will be

BEST AVAILABLE COPY observed that the delivery-device-controllers for each series of purchase-keys are independent of those controlled by the other series. Therefore, correction in one key-series will not disturb the delivery-devices controlled by the keys of other series. The actuation of the delivery-devices to discharge change, according to the purchase-money received, is controlled by the discharge-keys which differentially operate the valves for the delivery-devices as hereinbefore described. Operation of any of the discharge-keys releases all of the delivery-devices which have been set into operative position by the purchase-keys, so the actuating-springs will shift the delivery-devices into normal position, and also release the purchase-keys which have been operated, and thus again put the machine into condition for another operation. The dollar-keys in the machine illustrated are for optional use, when dollar coins are desired in making change, and when one of said keys is operated, to set its delivery-device into operative position, the coins will be delivered when a discharge-key is operated, and then also the device will be restored to normal position. The money delivered by the machine will pass into the operator's hand, immediately after a discharge-key is operated by the thumb of the same hand. Every time the discharge-key is operated, counter Q will be advanced, and thus a record of the number of sales will be kept.

An audible signal is produced when the machine is operated to deliver change. The signal-device consists of a sounder 240 (Fig. 22) and a hammer 241 secured to one of the arms 206 of the universal bar operated by the discharge-keys. When one of said keys is operated the sounder will be actuated.

*Indicator mechanism.*

An indicator-mechanism is combined with the cashier to indicate to the purchaser the amount of the sale and comprises a dollar-indicator, a tens-indicator and a units-indicator, respectively controlled by the keys of series I, J and K.

*Dollar-indicator.*—A series of keys I (Figs. 1, 5 and 13) is provided for operating the dollar-indicator. Each of the keys is adapted to differentially operate a key-lever 250, which is guided by rods 252, is free to pivot about either of its ends and is normally seated against shoulder 251 on each guide 252. Each key I is provided with an abutment 253, differentially located whereby key-lever 250 will be operated. Said keys are mounted to slide in a plate *i*, secured to standards 101 and 102. A link 254 is pivoted to key-lever 250 and to a lever 255 which is pivoted at 256. One arm of lever 255 is pivotally connected to an operating-bar 257 for the dollar-indicator and counting-mechanism. The rear end of operating-bar 257 (Fig. 9) is suitably guided in a bracket 258 and provided with a rack 259, meshing with a curved rack or pinion 260, secured to a vertical shaft 261, which is mounted in bearings 262 and 262ª and has loose on its upper end a gear-wheel 263. A connection for one-way operation is established between the shaft 261 and pinion 260 by pins 268 and 269 (Figs. 5 and 9), respectively secured to pinion 260 and said shaft. Said connection will turn shaft 261 to operate the dollar-indicator in response to keys I and permit the indicator to be held in shifted position while key-lever 250 and the keys will be free to return to normal position after each operation of a key. A spring 257ª, (Fig. 5), restores said key-lever, and its operative connection to normal position when an operated key is released. A shaft 265 is journaled in bearings 262ª and 270 and has secured to its upper end a ratchet 271 (Figs. 23 and 24), with which a dog 272 coöperates, to hold the dollar-indicator in shifted position in response to the operation of one of the keys of series I. Gear-wheel 263 on shaft 261 meshes with a pinion 264, secured to the lower end of shaft 265. A band or tape R having numerals for dollar indication marked thereon extends across the upper portion of the machine. Said tape is secured to and shifted by a drum 267 located at one side of the machine and secured to revolve with shaft 265. At the other side of the machine the tape is secured to an idler-drum 268. The tape is preferably endless and has the numerals indicated thereon both at its front and at its rear, so the indication is visible both from the front and rear of the machine. A spring 275 restores the dollar-indicator when dog 272 is operated.

*Tens and units indication.*—An indicator comprising wheels S and S′ is employed to indicate the units, and disks T and T′ for indicating tens. The tens-indicator is operated by the keys of series J, so that when the cashier is operated to control delivery of change by the delivery-devices corresponding amount will be indicated. In like manner the keys of series K operate the units-indicator. Indicator disks S and T at the front and the indicator-wheels T′ and S′ at the rear of the machine are arranged side by side so the numerals on adjacent portions of the indicator-wheels are exposed through the case, so the indications are visible both at the front and at the rear of the machine. Indicator-disks S and S′ are respectively mounted on a shaft 278 and disks T and T′ are mounted on a shaft 279. Indicator-disks S′ and T′ are arranged to overlap each other (Fig. 22) and by reason thereof the figures are reversed so the units

BEST AVAILABLE COPY are indicated at the right hand side in proper relation with respect to the tens-indicator. Indicator-disk T′ is cut away as at 282 to expose numerals on wheel S′.

*Tens-indicator control.*—The controller for the tens-indicator (Fig. 22), consists of a stepped-stop 300, mounted in manner free to slide horizontally on rods 283. A shaft 301, arranged in parallel relation with respect to keys J has secured thereto an arm 302 for each of said keys excepting the "0" key. An abutment 281 is formed on each of said keys for differentially shifting stepped-stop 300. The connection between shaft 301 and stepped-stop 300 comprises (Figs. 4, 13, 19ᵃ and 21) an arm 304, a link 305, a lever 306, pivotally sustained at 308, to the upturned end 307 of which said link is connected, a link 309 connected to the rear end of lever 306 and a stud 310 secured to and depending from stepped-stop 300. A spring 311 (Fig. 19ᵃ) holds shaft 301, stepped-stop 300 and the connection there-between in normal position and restores said parts to normal position when a key is released. Controller 300 is operated by keys J and is held in shifted position by the keys. Therefore, correction, in event of error in operation of either of the keys, can be made because the key depressed in error will be released by depression of another key of the same series, so shaft 301 will always be reset in accordance with the key held in depressed position. So long as correction is possible at the keys, correction of the stepped-cam can be made and said cam will always be in position corresponding to a depressed key of series J. In operation, depression of one of said keys will rock shaft 301, which through its operative connection will set and hold controller 300 in position to limit the movement of the indicator controlled thereby, so said indicator will display a numeral corresponding to the numeral on the purchase-key operated.

*Units-indicator control.*—The controller for differentially operating the units-indicator in response to the operation of the keys of series K, consists of a stop 282, slidably mounted on rods 283 (Figs. 2 and 22). Said stop is provided with steps for differentially limiting travel of the indicator T. The controller is shifted laterally in response to the keys of series K by a series of arms 284, each of which is adjustably secured to the shaft 285, (Figs. 13, 14 and 2), which extends in parallel relation to the keys K. Each key of the unit-series, excepting the "0" key is provided with an abutment 286, adapted to engage one of the arms 284 to rock shaft 285. Arms 284 are secured to shaft 285 in such relation that each key will impart differential movement to said shaft, necessary to differentially operate controller-stop 282. An operative connection between shaft 285 and controller 282 comprises (Figs. 2, 13, 19 and 21), on arm 288 secured to shaft 285, a link 289 connected to said arm and to an upwardly extending end 290 of a lever 291, which is pivotally connected at 292 to plate 42 and a link 293 connected to the rear end of said lever and to a stud 294 which is secured to and projecting downwardly from controller 282. The operation of the unit-controller is controlled by the keys K, which can reset the controller for a corrected sale. In its different positions into which the controller is operated by the keys, the controller limits the movement of the units-indicator so a numeral on the indicator will be displayed to correspond to the numeral on the purchase-key operated. A spring 295 (Fig. 19ᵃ) holds the controller 282, shaft 285 and the operative connection between the said parts in normal position.

*Indicator operating-mechanism.*

A crank O is employed to shift the indicator into position to display numerals corresponding to those on the keys depressed, (Figs. 1, 21, and 22). Crank O is secured to a short shaft 350 which is journaled in bearings 351 and 352. A gear-wheel 353 which is secured to shaft 350 meshes with a pinion 354, secured to an operating-shaft 321, for the indicators. A spring 355 (Fig. 5) is connected to shaft 350 and holds the crank O and its connected parts yieldingly in normal position and restores said parts to normal position. A stop 338, (Fig. 23) engages guide 336 to normally position indicators T, T′ at "0". Bar 332 is shifted downwardly until arrested by one of the steps of controller 300, by a yielding connection comprising a cable 342, which extends through a guide 325 and is connected by a spring 343 to an extension of rod 332 as at 344. The lower end of cable 342 is connected to a drum 345 secured to operating-shaft 321.

Bar 332 of the operating connection for the tens-indicator (S, S′), (Figs. 22, 23 and 24) is slidably held in guide 336 and supporting-plate 42, and has a rack 340 which meshes with a gear-wheel 341, secured to indicator-shaft 279. Vertical shift of bar 332 rotates the indicator-disks T, and T′ into operative position. Indicator-operating bar 332 is provided with a stud 335 (Fig. 22) which engages the stepped-indicator controller 300 to limit the operative stroke of said bar.

The units-indicator is operated by a vertically slidable bar 312, provided at its upper end with a series of teeth 313 (Fig. 23) which mesh with the teeth of a gear 314, which is secured to indicator-shaft 278. A stud 315 is adapted to engage either of the steps of controller 282 to limit the operative stroke of bar 312 (Fig. 22), so the move-

BEST AVAILABLE COPY ment imparted to the indicator disks S and S′ will result in indication corresponding to the number on the unit-key depressed. Rod 312 is held in a guide 316 and in plate 42. A stop 318 (Fig. 23) secured to bar 312 engages guide 316 to normally position the indicator at "0." Rod 312 is operated downwardly to engage one of the steps of controller 282 by a yielding connection comprising a spring 322 and a cable 320, which is directed through plate 42 by a guide 326 to a drum 319 mounted on operating-shaft 321.

Each of the indicator-operating-bars 312 and 332 is normally locked, or secured against operation (Figs. 21 and 20[a]) by a sliding block 408 which extends beneath plate 42, and is pressed into said position to block the path of said bars by a spring 409. These blocks are shifted to release the rods by connector 410 connected to each of the blocks, and to a lever 411 which is pivoted at 412 and is provided with a stud 414 adapted to be shifted by a cam 415 on drum 345. Springs 409 hold blocks 408 normally in position, to block descent of the indicator-operating-rods. When the indicator-operating-rods are held in operative position, blocks 408 are pressed against a side of the lower ends of each of the rods. When crank O is operated cam 415 is rotated, said blocks are withdrawn from the path of the indicator-operating-bars by cam 415, lever 412 and connector 410, (Fig. 21). Upon restoration of the indicators, the indicator-bars will pass into normal position and prevent rebound of the indicators, resulting from spring-shift to normal position. Thus the indicators are locked in normal position and against operation until the indicator-operating handle is operated and after the purchase-keys have been operated for a sale.

Cables 320 and 342 for operating the indicator-operating-bars, are normally slack to permit operation of lock-blocks 408, before power is applied to said bars and springs 324′ take up the slack of the cables (Fig. 23).

Indicators S, S′ and T, T′ will be set into position to indicate when crank O is operated in the following manner, viz: Assuming the indicator-controllers 300 and 282 have been shifted by the keys of the tens and units series respectively, the operator will draw the end of crank O forwardly and rotate shaft 350, gear-wheel 353, pinion 354, operating shaft 321, cam 415 and drums 345 and 319, (Figs. 21 and 22). The cam 415 will first operate lock-blocks 408 to release the indicators and drums 345 and 319 will respectively wind up cables 342 and 320, which will pull bars 332 and 312 downwardly until said bars are arrested by the indicator-controllers. Said rods, by their rack and pinion connections will rotate the indicator-disks to display numerals corresponding to those on the keys which have been depressed. The yielding spring-connections between drums 345 and 319 and indicator-operating-bars 332 and 312 permit arrest of one of the indicators before the other, by the indicator-controllers.

The indicator-controllers 300 and 282 are held in operative position by the purchase-keys and are restored to normal position when the keys are restored. The indicators S, S′ and T, T′, are not set into operative position until the handle O is operated, and resultantly the purchase-keys and indicator-controllers can be corrected at will until said handle is operated. Since the indicator-controllers are restored with the keys when the change is delivered, a holding-device is provided for holding each of the units and tens-indicators in operative position. The holding-means for indicator-disks T, T′, consists of a dog 346 which is pressed by a spring 348 into engagement with a ratchet-wheel 347, which is secured to indicator-shaft 279 (Figs. 23 and 24[a]). The holding-means for indicator-disks S and S′, consists of a dog 327 pressed by a spring 330 into engagement with a ratchet-wheel 329.

*Indicator restoring-mechanism.*

The units-indicator is restored to normal position upon operation of a purchase-key of the unit-series K and the tens-indicator is restored upon operation of a purchase-key of the tens-series J. Such operation is possible because a key of each of said devices is operated for said sale; the "0" key of series J being operated when the sale amounts to less than ten, and the "0"-unit-key being operated when the sale equals a multiple of ten. An advantage of this operation is, the restoring-movements of the units and tens indicator respectively occur at different times and can be used to operate a recorder or register. To avoid the necessity of a separate device for restoring the dollar-indicator, inasmuch as the greater number of sales in many establishments are less than $1.00, the dollar-indicator is restored when a purchase-key of either of the unit or tens series is operated for the next sale. A spring 275 retracts the dollar-indicator to normal position (Figs. 22 and 23). A spring 337, retracts the tens-indicator and its connected parts, and a spring 337′ retracts the unit-indicator (Figs. 21 and 22).

The restoring-device for the unit-indicator, comprises an arm 361 (Figs. 3, 7 and 22) secured to the latch-shaft 100[b], a link 362 and an arm 363 which is secured to a rock-shaft 364. (Figs. 22 and 23). Said shaft is journaled in a supporting bar 365, and extends upwardly where it is journaled in a bar 366, (Fig. 24) and provided with a vertically extending off-set 367, which is connected by a link 368 to dog 327 of the ratchet-wheel 329

BEST AVAILABLE COPY which retains the unit indicator-disks in assigned position. When latch-shaft 100[b] is operated by a purchase-key, as hereinbefore described, arm 363 will operate link 362, arm 363, rock-shaft 364 and link 368 to withdraw dog 327 laterally from engagement with said ratchet-wheel, and then the unit indicators will be restored to normal position by spring 337′. By means of the restoring-device, the retaining dog for the unit-indicator wheels will be released at the commencement of each operation and during the initial movement of a key.

The restoring-device for the tens-indicator (Figs. 4, 7, 22 and 23), comprises an arm 369, secured to latch-shaft 100[a], a link 370, an arm 371 secured to a vertical rock shaft 372, having an off-set portion 373 at its upper end (Figs. 23 and 24) and a link 374 connected to said off-set and to dog 346. Such device operates said dog to release the indicator-disks T and T′. By means of said connection during the initial movement of one of the keys of series J, dog 346 will be shifted to release ratchet wheel 347, so the tens-indicator will be restored to normal position by spring 337. Such restoration is effected every time a purchase-key of series J is operated.

The retainer dogs 327 and 346, (Figs. 23 and 24[a]), whereby the units and tens-indicators are respectively held in operated position, determined by the indicator-controllers 282 and 300, are each pivoted at 328 in manner to permit vertical swing of the dogs, so the ratchet-wheels can be rotated and lateral play to release the ratchet-wheels for restoration of the indicators. A spring 330, presses dog 327 in engagement with ratchet-wheel 329 and yieldingly holds said dog against lateral shift. To operate dog 327 to release ratchet-wheel 329, said dog is moved laterally against the force of spring 330. The "0" tooth or notch 329′ of said ratchet-wheel is of greater depth than the other teeth, so when the dog is operated to cause restoration of the indicator-disks T, T′, the dog cannot pass into engagement with said ratchet until said disks arrive at the "0" position. Retainer-dog 346 has pivot 328 of like construction, is spring-held in like manner by a spring 348, and the "0" notch 346′ is of greater depth than the other teeth, so said dog, after operation to release the indicator-disks S, S′ cannot re-engage the ratchet until said disks arrive at normal position. The lateral movement of the retainer-dogs is limited by stops 348′ and the hubs of the ratchet-wheels limit the vertical play of the dogs so the dogs will readily pass into the "0" notches.

The mechanism for restoring the dollar-indicator R comprises (Figs. 21, 22 23 and 24) a lever 380 which is pivotally sustained at 381 and has an arm or terminal 382, adapted to engage retaining-dog 272, whereby the indicator is held in operative position, a connection whereby said lever is shifted into operative position, a latch 390 whereby the lever is held in operative position, and a releasing-shaft $r$ journaled in the frame and yieldingly held in normal position by a spring $r'$ and a stop $r^2$. The connection for setting lever 380 in operative position, is operated by the indicator-operating-handle O, and consists of a drum 387, secured to shaft 321, a cable 386 and a spring 388 connected to said lever. When the operating handle O is operated, lever 380 will be moved into position to be held by latch 390. The dollar-indicator is shifted into operative position when keys I are operated and is there held by dog 272. The restoring-lever is not operative until the indicator-operating-handle O has been operated, and then, but not before, operation of one of the purchase-keys (units, tens, or dollars) will release lever 380 to restore the dollar indicator; and so on commencement of another sale, the dollar-indicator will be restored. The releasing-shaft is operated to restore the dollar-indicator, when a key of the unit-series is operated by an arm 359 (Figs. 23 and 24) secured on said shaft and arranged to be shifted by off-set 367 of the restoring-shaft for units-indicator; in response to a tens-key, by an arm 393, secured to the releasing-shaft $r$, and adapted to be shifted by off-set 373 of the restoring-shaft for the tens-indicator; and when a key of series I is operated by an arm (Fig. 22) 379, adapted to engage an arm 377 on shaft $r$ and secured to a rock-shaft 375, which is journaled in bearings 376 and is provided at its lower end with an arm 378 (Fig. 22) which is engaged by the end of rack-bar 257 (Fig. 5) which operates the dollar-indicator. Pivot 272′ of dog 272 is adapted to permit lateral play necessary for advance of the ratchet-wheel 271 and vertical play for the restoring-operation of the dollar-indicator. A spring 392 is arranged to hold dog 272 into engagement with ratchet-wheel 271 and to opposite either lateral or vertical movement of the dog. Said dog is provided with an arm 383 (Figs. 23 and 24) to the end of which is pivoted a member 384, and with a stop 385 which limits relative downward play of member 384 with respect to said arm. Arm 382 of lever 380, lifts dog-member 384 without operating the dog, when the lever is lifted into operative position, and when the lever is released from latch 390, the lever-arm will swing dog 272 downwardly about its pivot 272′ and free ratchet-wheel 271 and indicator R for restoration by spring 275.

The actuator-latches 97, which hold the delivery-devices in operative position, are operated to release said devices when a dis-

BEST AVAILABLE COPY charge-key is operated. The indicator-restoring-mechanisms which are connected to the latch-shaft, are prevented from restoring the indicator by a locking-bar 394, (Fig. 22) which is slidably mounted upon a frame-bar 365 and is connected to universal-bar 207 whereby the actuator-latches are operated by an arm 395 and a spring 396 (Figs. 7 and 22). A spring 397 tends to hold the locking-bar in normal position. Indicator-restoring-shafts 364 and 372 are respectively provided with arms 398 and 399. Locking-bar 394 is arranged at the front of shafts 364 and 372 and to slide in front of arms 398 and 399. The locking-bar is cut away as at 400 opposite arms 398 and 399 so the arms are free to be shifted when the locking-bar is in normal position. When, however, one of the discharge-keys is operated, arm 395 and spring 396 will first shift the locking-bar to prevent arms 395 and 399 from turning and consequently said bar prevents restoration of the indicators when one of the discharge-keys is operated. In order that the latch-shafts 100[a] and 100[b] can be operated by the discharge-keys when the indicator-restoring-shafts 372 and 364 are locked by bar 394, links 370 and 362 are respectively yieldingly connected to arms 371 and 363, by springs 370′ and 362′.

*The register.*

A registering mechanism (Fig. 25) is provided which totalizes the amounts of the sales and is operated by the purchase-keys. The register comprises a series of counter-wheels 500, 501, 502, 503, 504, and 505, each of which is separately mounted to revolve upon a shaft 506 extending across the machine and journaled in side-frames 41. For the purpose of avoiding the use of means for storing the power to advance the counter-wheels, the unit-wheel 500 and the tens-wheel 501 are respectively operated upon the return stroke of the indicator-operating-rods 312 and 332. That is, these rods remain in operative position until the purchase-keys are operated for a succeeding sale, and being independently operated by the keys of different series, which are successively operated, it is possible to operate the counter-wheels without interfering with their operation to transfer from units to tens, etc.

The mechanism for advancing the unit-wheel comprises a rack-bar 507 (Fig. 23), secured to travel vertically with indicator-operating-rod 312 of the units-indicator. The teeth of said rack-bar intermesh with a pinion 508, journaled upon a shaft 509, which is mounted in bearings 510, conveniently secured to the supporting-frame of the machine. Pinion 508 operates another pinion 511 which is connected to pinion 508 by a one-way connection consisting of a ratchet-wheel 512 secured to pinion 511 and a spring-pressed pawl 513, pivotally secured to the other pinion 508. Pinion 511 meshes with a pinion 514, secured to a sleeve 515, mounted on counter-shaft 506 and secured to the unit-counter-wheel 500.

The mechanism for operating the tens-counter-wheel 501, comprises a rack-bar 516 (Fig. 23) rigidly secured to indicator-operating-rod 332, which engages a pinion 517, mounted to rotate upon a shaft 509. Said pinion is provided with a spring-pressed pawl 518 adapted to engage ratchet-wheel 519, secured to a pinion 520, which is journaled on shaft 509. Said pawl and ratchet serve as a one-way connection between said pinions, whereby pinion 517 will not operate pinion 520 on the downstroke of bar 516. During retraction of rack 516, pawl 518 will engage ratchet-wheel 519 and correspondingly rotate pinion 520. Said pinion meshes with gear-teeth 521, secured to counter-wheel 501 and advances said counter-wheel during retraction of bar 516.

The mechanism for operating the counter for the dollar registration comprises an arm 522, (Fig. 22) rigidly secured to shaft 261 and shifted thereby when either key of series I is operated. Said arm has a flexible connection, consisting of a cable 523 guided around sheaves 524 and 525, (Fig. 22) thence to a rack-bar 526, which is mounted in manner free to slide in the framework of the machine. The teeth of said rack-bar engage a pinion 527, which is mounted to revolve on a fixed stud 528 and is connected by a pawl 530 and a ratchet 529 to a pinion 531, also mounted to revolve on stud 528. Said connection operates pinion 531 during the downward movement of rack-bar 526, which occurs during the depression of a key of the series I. During retraction of said bar, by a spring 526′ ratchet-wheel 529 will not operate pawl 530 and will not rotate pinion 531. Pinion 531 meshes with a pinion 531′, which operates gear teeth 532 of counter-wheel 502. Thus it will be seen that the operating-racks for the units, tens and hundreds are each separately connected to the corresponding counter-wheels and are operated independently of each other. The one-way connections of each gear-train provide mechanism for advancing without retracting the counters and whereby independent operation of each of the counter-wheels, independently of the operating-bars when one counter operates the next.

To prevent overthrow, resilient detents 534 are extended to engage the teeth of the gear-wheels of each of the counters.

The carrying-means between the counters consists of a pawl 535, (Fig. 25) carried at the end of an arm 536 which is pivotally sustained at 537 to the hub of each of the counter-wheels. Each carrying-pawl is

BEST AVAILABLE COPY pressed normally against the counter-wheel to which it is secured by a spring 538. For intermittently advancing a counter one step for each revolution of the counter, next in the series, a shifter 539 is provided for each carrying-pawl. Each shifter is secured to a cross-bar 540 and has its end formed with a cam surface 541 which will shift pawl 535 into engagement with the gear-wheel of the next counter-wheel against the force of spring 538, and will be retracted to disengage the pawl from said gear-wheel, during a one-step advance of the counter to which the pawl is connected. Thereby the pawls are always normally disengaged so the counters can be independently operated by their respective operating mechanisms.

The register operating-mechanism for dollars is advanced when a key of the corresponding denomination is depressed. Advance of the unit-counter-wheels occurs during the next operation of the machine when a purchase-key of the unit-series is operated and the advance of the counter for the tens occurs during the next operation of the machine when a key for the corresponding denomination is depressed. Therefore, the counters are operated at different times so advance of one counter by another is not interfered with.

The register is controlled by the purchase-keys and the register-operating-mechanism is set into operative position when handle O is operated to set the units and tens-indicators. When the purchase-keys are operated for the succeeding sale, the counter for units and tens are operated. The operating-mechanism for the register is such that a simple recording-device can be employed because the operations to advance the several counters of the register in accordance with the several series of purchase-keys, occur respectively at different times. Inasmuch as the register, like the units and tens-indicators, is not set into operative position until the handle O is operated, correction of a sale at the key can be made without interfering with the proper operation of the register to add only the correct sales.

*Discharge-key lock.*

Crank O operates indicator-disks S, S′ and T, T′ to display figures corresponding to those on the keys which have been depressed. A lock (Figs. 21 and 22) is provided which prevents operation of the discharge-keys and the delivery of change until indication of the amount of the purchase has been effected. Said lock (Figs. 21, 21ᵃ, and 22) comprises an arm 401, secured to one of the universal releasing-bars 207, a bolt 402 connected to the lower end of arm 401 and having one of its ends guided in bearing 352. Said bolt is held normally against longitudinal movement by a sector 403 which is yieldingly connected, by a spring 404 to an arm 405 which is secured to shaft 350. A stop 406 secured to sector 403 engages arm 405 to normally position the sector 403 in the path of bolt 402. Said sector is loosely mounted on shaft 350 and yieldingly connected thereto, so handle O which operates said shaft can be restored to normal position independently of the sector. A latch 420, holds the sector in shifted position after operation of handle O, is located in the path of bolt 402 and is shifted into position so the sector will be again held thereby, by bolt 402.

Operation of the discharge-key-lock will be as follows: When the parts are in normal position, bolt 402 will be held against longitudinal movement in one direction by sector 403, latch 420 will be pressed against the face of the sector and the discharge-keys will be secured against operation. When handle O is operated, the units and tens-indicators will be set to indicate and the register operating-mechanism will be set into operative position. Operation of handle O will turn sector 403 until latch 420 holds the sector in shifted position. The discharge-keys will then be released so they can be operated. When one of the discharge-keys is operated, bolt 402 will shift latch 420 so the face of sector 403 can pass into normal position as soon as bolt 402 is withdrawn, which occurs when the discharge-key passes to normal position. This locking-mechanism, by preventing operation of the discharge-keys until the handle O is operated, insures the operation of the indicator and registering mechanism. Said mechanism also serves as a full-stroke device for the indicator and register operating-mechanism. Stops 419 (Fig. 5) secured to gear 353 limit the play of handle O.

In Fig. 26, is illustrated a construction which permits the coin-holders of the several delivery-devices to be removed so the coin can be withdrawn when it is desired to remove the deposit from the machine. In this construction, each of the holder-tubes 421 is held in a socket 422, formed in the delivery-device frame, and is provided with a slotted bottom 423, having an opening at the rear through which the coins are discharged by the ejectors. The open upper ends of the tubes are flanged as at 424, and said flanges rest in pockets formed in plate 54 of the machine-frame. The several coin-receivers are integrally formed or secured together by a plate 425 which is removably connected to the machine-frame by a hook 426 and a lock 427. When the money deposited is to be removed, plate 425 is unlocked, then said plate and the coin-receivers can be removed. Thereupon the coin-tubes 421 can be removed and replaced into the machine when desired.

The invention is not to be understood as

BEST AVAILABLE COPY restricted to the construction illustrated and described, since this can be modified without departing from the spirit of the invention.

The several features of the invention may be severally adopted to advantage without adoption in entirety. Furthermore, it is obvious that the mechanism for making change can be employed to advantage without being associated with an indicator or register or both, and if desired, the conjoint controlling-mechanism for the indicators and registers may be used for either of said devices without the other. So also, while the machine is designed for handling dollar-coins and of lesser denominations, it will be understood that by the addition of mechanism similar to those described, the machine, can, if desired, be made to handle money of higher denominations.

Having thus described the invention what I claim as new and desire to obtain by Letters Patent is:

1. In a mechanical cashier, the combination with money delivery devices, key actuated controlling means for said devices, and means independent of the coins and operable after said controlling means has been operated, for rendering said delivery devices ineffective when the same are operated.

2. In a mechanical cashier, the combination of money-delivery-devices, purchase-keys, key actuated controlling-means selectively rendering the delivery-devices operative and means independent of the coin for controlling discharge of change by the delivery devices rendered operative by a purchase-key, after operation of said key.

3. In a mechanical cashier, the combination of, money-delivery-devices, purchase-keys, key-actuated controlling-means for selectively rendering the delivery-devices operative to deliver change, and a plurality of keys for differentially controlling delivery of change by the delivery-devices after operation of a purchase-key.

4. In a mechanical cashier, the combination of, purchase-keys, money-delivery-devices, selectively actuated by said keys into operative position, and a plurality of keys for differentially controlling delivery of the change by the delivery-devices which have been rendered operative by a purchase-key.

5. In a mechanical cashier, the combination of, purchase-keys, money-delivery-devices, key-shifted actuators for said devices, and means for varying the discharge of change by the delivery-devices after operation of the actuators by a key.

6. In a mechanical cashier, the combination of, purchase-keys, money-delivery-devices, shifting-means for said devices, selectively operated by the keys, means holding the delivery-devices in operative position when the keys are operated and a plurality of keys for differentially controlling the delivery of change by the delivery-devices.

7. In a mechanical cashier, the combination of, purchase-keys, money-delivery-devices, key-shifted means for selectively operating the devices in one direction, springs for reversely operating the delivery-devices, means for holding the devices in operative position, and a plurality of keys for differentially controlling delivery of change by the delivery-devices.

8. In a mechanical cashier, the combination with money delivery devices, purchase keys, key actuated controlling means for said delivery devices, means operable after said controlling means has been operated for rendering said delivery devices ineffective when the same are operated, and means independent of the coin for actuating the delivery devices to discharge money.

9. In a mechanical cashier, the combination with money holders, purchase keys, money delivery devices, key actuated controlling means for said delivery devices, means for rendering said delivery devices ineffective when the same are operated, and means for rendering said delivery devices change when the means for rendering said delivery devices ineffective is operated.

10. In a mechanical cashier, the combination of, money-delivery-devices, purchase-keys, key-controlled shifting-means for said devices, means for holding said delivery devices when shifted a discharge-key, and releasing-means for the ejectors, operated by the discharge-key which will cause the change to be delivered by the ejectors.

11. In a mechanical cashier, the combination of, money-delivery-devices, purchase-keys, means for selectively setting the delivery-devices in operative position to deliver money, releasing-means for the delivery-devices and a discharge-key controlling the operation of the devices to deliver change.

12. In a mechanical cashier, the combination of, purchase-keys, spring-actuated money-delivery-devices controlled by said keys, a discharge-key and releasing-means for the devices operated by the discharge key.

13. In a mechanical cashier, the combination of, purchase-keys, key-shifted money-delivery-devices spring actuated to deliver money, and a discharge-key controlling the delivery of change by the devices.

14. In a machine of the character described, the combination of, purchase-keys, key-controlled money-delivery-devices spring actuated to deliver money and a plurality of discharge-keys.

15. In a mechanical cashier, the combination of, purchase-keys, key-operated money-delivery-devices selectively controlled by said keys and a plurality of discharge-keys

BEST AVAILABLE COPY which will differentially operate the devices actuated by the purchase-keys to deliver the change.

16. In a mechanical cashier, the combination of, purchase-keys, key-shifted money-delivery-devices spring actuated to deliver money, and a plurality of discharge-keys controlling the delivery of change by the devices.

17. In a mechanical cashier, the combination with money delivery devices, purchase keys, key actuated controlling means for said delivery devices, a plurality of keys for differentially rendering certain of said delivery devices ineffective when the same are operated, and means for operating said delivery devices to deliver change when the keys for rendering said delivery devices ineffective are operated.

18. In a mechanical cashier, the combination of, purchase-keys, money-delivery-devices, key-actuated means for selectively rendering the delivery-devices operative to deliver change and a plurality of keys, each controlling the operation of the delivery-devices to discharge money and differentially controlling delivery of change by the delivery-devices after the operation of a purchase key.

19. In a mechanical cashier, the combination of, purchase-keys, money-delivery-devices, key-shifted actuators for said devices and a plurality of keys each controlling the operation of the delivery-devices to discharge money and for differentially controlling the devices to deliver change.

20. In a mechanical cashier, the combination of, purchase-keys, money-ejectors, key-controlled shifting-means for said ejectors, means for retracting the ejectors to deliver money and a plurality of discharge-keys, which when operated will effect delivery of the change and means for differentially controlling the operation of the ejectors by the purchase keys.

21. In a mechanical cashier, the combination of, money-holders, purchase-keys, ejectors, key-controlled shifting-means for said ejectors, a plurality of discharge-keys, releasing-means for the ejectors operated by the discharge-keys and means operated by said keys for differentially controlling the delivery of change by the ejectors.

22. In a mechanical cashier, the combination of, purchase-keys, money-delivery-devices, controlling-means for said devices selectively actuated by the purchase-keys and operated by one of said keys after another key has operated the controlling-means, and so the delivery-devices will discharge change for the key last operated, and differentially operative means for varying the delivery of change.

23. In a mechanical cashier, the combination of, purchase-keys, money-delivery-devices, controlling-means for said devices selectively actuated by the purchase-keys and operated by one of said keys after another key has operated the controlling-means and so the delivery-devices will discharge change for the key last operated, and a plurality of keys for differentially controlling the delivery of change by the delivery-devices.

24. In a mechanical cashier, the combination of, purchase-keys, money-delivery-devices, controlling-means for said devices selectively actuated by the purchase-keys and operated by one of said keys after another key has operated the controlling-means and so the delivery-devices will discharge change for the key last operated, and a plurality of discharge-keys, each, causing operation of the delivery-devices and differential delivery of change.

25. In a mechanical cashier, the combination of, money-delivery-devices, purchase-keys, controlling-means for said devices controlled by the purchase-keys, means which will reset the controlling-means to correspond to one key when said key is operated after the controlling-means has been operated by another key, and a plurality of discharge-keys for causing differential operation of the delivery-device to deliver the change.

26. In a mechanical cashier, the combination of, purchase-keys, money-delivery-devices selectively controlled by said keys, key-locks for holding said keys in operated position and lock-releasing-means operated by the purchase-keys.

27. In a mechanical cashier, the combination of, purchase-keys, money-delivery-devices selectively controlled by said keys, key-locking-means for holding said keys in operated position and lock-releasing-means operated by the keys to release a previously operated key held by the locking-means.

28. In a mechanical cashier, the combination of, purchase-keys, money-delivery-devices selectively controlled by said keys, key-locks for holding said keys in operated position and lock-releasing-means operated by the purchase-keys, and discharge-controlling-means for operating said devices after the keys have been operated.

29. In a mechanical cashier, the combination of, purchase-keys, money-delivery-devices, selectively controlled by said keys, key-locks for holding said keys in operated position and lock-releasing-means operated by the purchase-keys to release a previously operated key and a discharge-key for causing actuation of the delivery-devices to deliver change.

30. In a mechanical cashier, the combination of, purchase-keys, money-delivery-devices selectively controlled by said keys, key-locks for holding said keys in operated position and lock-releasing-means operated by

BEST AVAILABLE COPY the purchase-keys, to release a previously operated key and differentially operative means for controlling delivery of change.

31. In a mechanical cashier, the combination of, purchase-keys, money-delivery-devices controlled by said keys, key-locks holding the keys in operated position and lock-releasing means operated by the purchase-keys to release a previously operated key, and a plurality of discharge-keys for differentially controlling the delivery of change.

32. In a mechanical cashier, the combination of, money-delivery-devices, a series of purchase-keys controlling the operation of said devices, locking-means for holding the keys in operated position, lock-releasing means operated by the keys, and discharge controlling-means, also releasing the purchase-keys.

33. In a mechanical cashier, the combination of, money-delivery-devices, a series of purchase-keys controlling the operation of said devices, locking-means for holding the keys in operated position, key-releasing means operated by the keys and a plurality of discharge-keys each releasing the purchase-keys and for differentially controlling the delivery of discharge.

34. In a mechanical cashier, the combination of, purchase-keys, money-delivery-devices, shifted by said keys, locking-means for holding said keys in operated position, and lock-releasing means operated by the purchase-keys.

35. In a mechanical cashier, the combination of, money-delivery-devices, purchase keys, key-actuated controlling-means for said devices, locking-means for holding said keys in operated position discharge-controlling-means, and lock-releasing-means operated by the purchase-keys and by the discharge controlling-means.

36. In a mechanical cashier, the combination of, money-delivery-devices, purchase-keys, key-actuated controlling-means for said devices, locking-means for holding said keys in operated position, a discharge-key, and lock-releasing-means operated by the purchase-keys and also by the discharge-key.

37. In a mechanical cashier, the combination of, money-delivery-devices, purchase-keys, key-actuated controlling-means for said devices, locking-means for holding said keys in operated position, a plurality of discharge-keys and lock-releasing-means operated by the purchase-keys and also by each of the discharge-keys.

38. In a mechanical cashier, the combination of, purchase-keys, money-delivery-devices spring actuated to deliver money controlled by the purchase-keys, locking means for holding said keys in operated position and lock-releasing-means operated by the purchase-keys.

39. In a mechanical cashier, the combination of, purchase-keys, money-delivery-devices spring actuated to deliver money controlled by the purchase-keys, locking-means for holding said keys in operated position, lock-releasing-means operated by the purchase-keys, and a discharge-key for controlling the actuation of the delivery-devices.

40. In a mechanical cashier, the combination of, purchase-keys, money-delivery-devices spring actuated to deliver money controlled by the purchase-keys, locking-means for holding said keys in operative position, lock-releasing-means operated by the purchase-keys, and a plurality of keys for differentially controlling the actuation of the delivery-devices.

41. In a mechanical cashier, the combination of, purchase-keys, money-delivery-devices spring actuated to deliver money, controlled by the purchase-keys, locking-means for holding said keys in operated position and lock-releasing-means operated by the purchase-keys.

42. In a mechanical cashier, the combination of, purchase-keys, money-delivery-devices spring actuated to deliver money controlled by the purchase-keys, locking-means for holding said keys in operated position, lock-releasing-means operated by the purchase-keys, and a discharge-key for controlling the actuation of the delivery-devices.

43. In a mechanical cashier, the combination of, purchase-keys, money-delivery-devices spring actuated to deliver money, controlled by the purchase-keys, locking-means for holding said keys in operated position, lock-releasing-means operated by the purchase-keys, and a plurality of keys for differentially controlling the actuation of the delivery-devices.

44. In a mechanical cashier, the combination of, purchase-keys, money-delivery-devices, controlling-means for said devices controlled by the purchase-keys, locking-means for holding the keys in operated position and mechanism which will reset the controlling-means operated by a previously operated key and release said key, when another key is operated.

45. In a mechanical cashier, the combination of, purchase-keys, money-delivery-devices, controlling-means for said devices controlled by the purchase-keys, locking-means for holding the keys in operated position, mechanism which will reset the controlling-means operated by a previously operated key, and release said key when another key is operated, and a discharge-key controlling the operation of the delivery-devices to deliver change.

46. In a mechanical cashier, the combination of, money-delivery-devices, purchase-

BEST AVAILABLE COPY keys, controlling-means for said devices controlled by the purchase-keys, key-locking-means for holding the keys in operated position, discharge-controlling-means for the change, mechanism which will reset the controlling-means and release an operated key when another key is operated, and means operated by the discharge-controlling-means which will also return the delivery-device controlling-means and the keys to normal position.

47. In a mechanical cashier, the combination of, money-delivery-devices, purchase-keys, controlling-means for said devices operated by the purchase-keys, key-locking-means for holding the keys in operated position, a plurality of differentially operating discharge-keys for the change, mechanism which will reset the controlling-means and release an operated purchase key when another purchase key is operated, and means operated by the discharge-controlling-keys which will also restore the delivery-device controlling-means and the keys to normal position.

48. In a mechanical cashier, the combination of, money-delivery-devices, purchase-keys, controlling-means for said devices actuated by said keys, mechanism whereby the controlling-means will be first restored to normal position and again operated to correspond to a purchase-key when said key is operated after the controlling-means has been actuated by a previously operated key, and a plurality of discharge-keys differentially controlling the discharge of change by the delivery-devices.

49. In a mechanical cashier, the combination of, money-delivery-devices, purchase-keys, controlling-means for said devices actuated by said keys, holding-means whereby the keys will be held in operated position and mechanism whereby the holding-means will be released and the controlling-means will be restored into opposition for the commencement of another operation when one purchase-key is operated while another key is held in operated position.

50. In a mechanical cashier, the combination of, money-delivery-devices, purchase-keys, controlling-means for said devices actuated by said keys, holding-means whereby the keys will be held in operated position, mechanism whereby the holding-means will be released and the controlling-means will be restored into position for the commencement of another operation when one purchase-key is operated while another key is held in operated position, and a discharge-key for causing the operation of the delivery-devices to deliver change.

51. In a mechanical cashier, the combination of, money-delivery-devices, purchase-keys, controlling-means for said devices actuated by said keys, holding-means whereby the keys will be held in operated position, mechanism whereby the holding-means will be released and the controlling-means will be restored into position for the commencement of another operation when one purchase-key is operated while another key is held in operated position, and a plurality of discharge controlling-keys for differentially controlling the delivery of change.

52. In a mechanical cashier, the combination of, money-delivery-devices, purchase-keys, controlling-means for said devices actuated by said keys, holding-means whereby the keys will be held in operated position, mechanism whereby the holding-means will be released and the controlling-means will be restored into position for the commencement of another operation when one purchase-key is operated while another key is held in operated position, and discharge-controlling-means for the change, also operating said mechanism.

53. In a mechanical cashier, the combination of, money-delivery-devices, purchase-keys, controlling-means for said devices, actuated by said keys, holding-means whereby the keys will be held in operated position, mechanism whereby the holding-means will be released and the controlling-means will be restored into position, for the commencement of another operation when one purchase-key is operated while another key is held in operated position, and a plurality of keys for differentially controlling the delivery of change and also operating said mechanism.

54. In a mechanical cashier, the combination of, purchase-keys, money-delivery-devices, controlled by said keys, comprising ejectors and valves for controlling the delivery of money by the ejectors and means whereby the valves can be operated.

55. In a mechanical cashier, the combination of, purchase-keys, money-delivery-devices controlled by said keys, comprising ejectors and valves for controlling the delivery of money by the ejectors and means whereby the valves can be differentially operated to vary the discharge of money by the ejectors.

56. In a mechanical cashier, the combination of, purchase-keys, money-delivery-devices controlled by said keys, comprising ejectors and valves for controlling the delivery of money by the ejectors, a series of keys and differentially operating means operated by the keys and operating the valves to control the discharge of money by the ejectors.

57. In a mechanical cashier, the combination of, purchase-keys, money-delivery-devices, controlled by said keys, comprising ejectors and normally closed valves for controlling the delivery of money by the ejectors and means whereby the valves can be

BEST AVAILABLE COPY operated to permit discharge of money by the ejectors.

58. In a mechanical cashier, the combination of, purchase-keys, money-delivery-devices controlled by said keys, comprising ejectors and normally closed valves for controlling the delivery of money by the ejectors and means whereby the valves can be differentially operated to control the discharge of money by the ejectors.

59. In a mechanical cashier, the combination of, purchase-keys, money-delivery-devices controlled by said keys, comprising ejectors and normally closed valves for controlling the delivery of money by the ejectors, a series of discharge keys and differentially operating means operated by the discharge-keys for operating the valves to control the discharge of money by the ejectors.

60. In a mechanical cashier, the combination of, purchase-keys, money-delivery-devices controlled by said keys, and comprising an ejector and a valve, and change-discharge controlling-means whereby the valves will be operated to cause the ejector or ejectors operated to deliver the change.

61. In a mechanical cashier, the combination of, purchase-keys, money-delivery-devices controlled by said keys, and comprising an ejector and a valve, change-discharge controlling-means whereby the valves will be differentially operated to permit the delivery-devices to deliver change.

62. In a mechanical cashier, the combination of, purchase-keys, money-delivery-devices controlled by said keys, and comprising an ejector and a valve normally positioned to prevent delivery of money and change-discharge controlling-means whereby the valves will be operated to permit delivery of money by the ejectors.

63. In a mechanical cashier, the combination of, purchase-keys, money-delivery-devices controlled by said keys, and comprising an ejector and a valve normally positioned to prevent delivery of money and change-discharge controlling-means whereby the valves will be differentially operated.

64. In a mechanical cashier, the combination of, purchase-keys, money-delivery-devices controlled by said keys, and comprising an ejector and a normally closed valve and change-discharge controlling-means operating the valves to render the ejectors operative when the change is to be delivered thereby.

65. In a mechanical cashier, the combination of, purchase-keys, money-delivery-devices comprising key-shifted ejectors and valves for controlling the delivery of money by the ejectors and valve operating-means.

66. In a mechanical cashier, the combination of, purchase-keys, money-delivery-devices comprising key-shifted ejectors and valves for controlling the delivery of money by the ejectors and means for differentially operating the valves to control the delivery of change by the ejectors.

67. In a mechanical cashier, the combination of, purchase-keys, money-delivery-devices controlled by said keys, holding-means for said devices, said devices comprising spring-actuated ejectors and valves, operating-means for the valves and releasing-means which, when operated, will cause the actuation of the ejectors, and delivery of money from the valves which have been operated.

68. In a mechanical cashier, the combination of, purchase-keys, money-delivery-devices controlled by said keys, holding-means for said devices, said devices comprising spring-actuated ejectors and normally closed valves, operating-means for the valves and releasing-means which, when operated will cause the actuation of the ejectors, and delivery of money from the valves which have been operated.

69. In a mechanical cashier, the combination of, purchase-keys, money-delivery-devices selectively controlled by said keys and comprising money-holders, ejectors, and valves, said holders having openings therein for exposing the money for engagement by the ejectors, said valves covering the openings to control the delivery of money and operating-means for the valves.

70. In a mechanical cashier, the combination of, purchase-keys, money-delivery-devices selectively controlled by said keys and comprising money-holders, ejectors, and valves, said holders having openings therein for exposing the money for engagement by the ejectors, said valves covering the openings to control the delivery of money and a discharge-key for operating the valves.

71. In a mechanical cashier, the combination of, purchase-keys, money-delivery-devices selectively controlled by said keys and comprising money-holders, ejectors, and valves, said holders having openings therein for exposing the money for engagement by the ejectors, said valves covering the openings to control the delivery of money and means for differentially operating the valves.

72. In a mechanical cashier, the combination of, purchase-keys, money-delivery-devices selectively controlled by said keys and comprising money-holders, ejectors, and valves, said holders having openings therein for exposing the money for engagement by the ejectors, said valves covering the openings to control the delivery of money and a series of discharge-keys for differentially operating the valves.

73. In a mechanical cashier, the combination of, purchase-keys, money-delivery-devices controlled by said keys and comprising money-holders, spring actuated ejectors, and

BEST AVAILABLE COPY valves, said holders having openings therein for exposing the money for engagement by the ejectors, said valves covering the openings to control the delivery of money by the ejectors and operating-means for the valves.

74. In a mechanical cashier, the combination of, purchase-keys, money-delivery-devices controlled by said keys and comprising money-holders, spring-actuated ejectors, and valves, said holders having openings therein for exposing the money for engagement by the ejectors, said valves covering the openings to control the delivery of money by the ejectors and means for differentially operating the valves.

75. In a mechanical cashier, the combination of, purchase-keys, money-delivery-devices, controlled by said keys and comprising money-holders, spring-actuated ejectors, and valves, said holders having openings therein for exposing the money for engagement by the ejectors, said valves covering the openings to control the delivery of money by the ejectors and a series of discharge-keys for differentially operating the valves.

76. In a mechanical cashier, the combination of, purchase-keys, money-delivery-devices comprising money-holders, ejectors, and valves, said holders having openings therein for exposing the money for engagement by the ejectors, said ejectors being spring-pressed into position to engage the money, said valves covering the openings to control the delivery of money by the ejectors and operating-means for the valves.

77. In a mechanical cashier, the combination of, purchase-keys, money-delivery-devices comprising money-holders, ejectors, and valves, said holders having openings therein for exposing the money for engagement by the ejectors, said ejectors being spring-pressed into position to engage the money, said valves covering the openings to control the delivery of money by the ejectors and means for differentially operating the valves.

78. In a mechanical cashier, the combination of, purchase-keys, money-delivery-devices controlled by said keys and comprising stationary money-holders having bottom-openings therein, ejectors arranged to discharge money from the holders, and valves covering the openings to control the delivery of money, said ejectors being spring-pressed into position to engage the money, actuating-means for the ejectors and operating-means for the valves.

79. In a mechanical cashier, the combination of, purchase-keys, money-delivery-devices controlled by said keys and comprising stationary money-holders having bottom-openings therein, ejectors arranged to discharge money from the holders, and valves covering the openings to control the delivery of money, said ejectors being spring-pressed into position to engage the money, actuating-means for the ejectors, and means for differentially controlling the operation of the valves.

80. In a mechanical cashier, the combination of, purchase-keys, money-delivery-devices controlled by said keys and comprising stationary money-holders having bottom-openings therein, ejectors arranged to discharge money from the holders, and valves covering the openings to control the delivery of money, said ejectors being spring-pressed into position to engage the money, actuating-means for the ejectors and a series of discharge-keys for differentially operating the valves.

81. In a mechanical cashier, the combination with a plurality of purchase-keys, of an ejector set in two directions by said keys.

82. In a mechanical cashier, the combination with a series of keys, of an ejector set thereby, and means for elevating the ejector to co-act with a plurality of coins.

83. In a mechanical cashier, the combination with a series of keys and an ejecting device, of means for setting said ejector by said keys, and means for adjusting the ejector to eject a plurality of coins.

84. In a mechanical cashier, the combination of, purchase-keys, money-delivery-devices selectively controlled by said keys, one or more of said devices being adjustable to effect single or multiple delivery and a series of discharge-keys for differentially operating the devices to deliver change.

85. In a mechanical cashier, the combination with a series of keys and ejecting devices, of means for setting the ejectors by said keys, and means for differentially adjusting the ejectors to eject a plurality of coins.

86. In a mechanical cashier, the combination with a plurality of purchase-keys, of an ejector set in two different directions by said keys, and mechanism for differentially controlling the ejecting devices to deliver change.

87. In a mechanical cashier, the combination of purchase-keys, money-delivery-devices selectively controlled by said keys, mechanism for adjusting one or more of the devices for multiple delivery, a series of discharge-keys, mechanism for differentially controlling the operation of the devices to deliver change, and mechanism for differentially controlling the ejecting devices to deliver change.

88. In a mechanical cashier, the combination with a series of keys and an ejecting device, of means for setting said ejector by said keys, means for adjusting the ejector

BEST AVAILABLE COPY to eject a plurality of coins, and mechanism for differentially controlling the ejecting devices to deliver change.

89. In a mechanical cashier, the combination of, purchase-keys, money-delivery-devices selectively controlled by said keys, mechanism for adjusting one or more of the devices for multiple delivery, a series of discharge-keys, and mechanism for differentially controlling the operation of the devices to deliver change.

90. In a mechanical cashier, the combination with a series of keys and ejecting devices, of means for setting the ejectors by said keys, means for differentially adjusting the ejectors to eject a plurality of coins, and mechanism for differentially controlling the ejecting devices to deliver change.

91. In a mechanical cashier, the combination of, purchase-keys, money-delivery-devices controlled by said keys, one or more of said devices being adjustable for multiple delivery, mechanism for setting the devices for multiple delivery, holding-means, and means operating the devices to deliver change when the holding-means is released.

92. In a mechanical cashier, the combination of, purchase-keys, money-delivery-devices, controlled by said keys, one or more of said devices being adjustable for multiple delivery, mechanism for setting the devices for multiple delivery, holding-means for the adjustable device or devices, means operating the devices to deliver change when the holding-means is released and means for differentially controlling the operation of the delivery-devices to deliver change.

93. In a mechanical cashier, the combination of, purchase-keys, money-delivery-devices controlled by said keys, one or more of said devices being adjustable for multiple delivery, mechanism operated by the keys for setting the devices for multiple delivery, holding-means and means operating the devices to deliver change when the holding-means is released.

94. In a mechanical cashier, the combination of, purchase-keys, money-delivery-devices controlled by said keys, one or more of said devices being adjustable for multiple delivery, mechanism operated by the keys, for setting the devices for multiple delivery, holding-means, means operating the devices to deliver change when the holding-means is released and means for differentially controlling the operation of the delivery-devices to deliver change.

95. In a mechanical cashier, the combination of, purchase-keys, spring-actuated money-delivery-devices controlled by said keys, one or more of said devices being adjustable for single or multiple delivery and means for controlling the actuation of said devices.

96. In a mechanical cashier, the combination of, purchase-keys, spring-actuated money-delivery-devices controlled by said keys, one or more of said devices being adjustable for single or multiple delivery and means for differentially controlling the operation of said devices to deliver change.

97. In a mechanical cashier, the combination of, purchase-keys, spring-actuated money-delivery-devices controlled by said keys, one or more of said devices being adjustable for single or multiple delivery, and a discharge-key which, when operated will cause the change to be delivered.

98. In a mechanical cashier, the combination of, purchase-keys, spring-actuated money-delivery-devices controlled by said keys, one or more of said devices being adjustable for single or multiple delivery and a plurality of discharge-keys for differentially controlling the delivery of change by said devices.

99. In a mechanical cashier, the combination of, purchase-keys, spring-actuated devices controlled by said keys, one or more of said devices being adjustable to effect single or multiple delivery, valves for controlling the delivery of change by the devices, means operating the valves, and operating-means for said devices.

100. In a money delivery device, the combination with a coin holder, a sliding ejector for same, a sleeve supporting said ejector, means for differentially adjusting said sleeve and said ejector, a stop for said coins moved with said sleeve, means for adjusting said sleeve, and stop, and means for actuating said ejector.

101. In a money-delivery-device, the combination of, a coin holder, an adjustably sustained ejector, normally positioned to deliver a single coin, an adjustable stop opposing removal of contiguous coin, means for adjusting the stop and the ejector for variation of delivery of coin, and means for operating the ejector.

102. In a money delivery device, the combination with a coin holder, of an adjustable coin ejector therefor yieldingly held in position to engage the coin, a sleeve supporting said ejector to permit longitudinal movement of said ejector, a coin stop supported with and movable with said sleeve, means for raising said sleeve and stop to vary the coins ejected, and means for operating said ejector after the same has been positioned.

103. In a money-delivery-device, the combination of, a holder, an adjustably sustained ejector yieldingly held in position to engage the coin, an adjustable stop opposing removal of contiguous coins, means for adjusting the stop and the ejector for variation of the coin delivered, means for op-

BEST AVAILABLE COPY erating the ejector, and a valve for controlling engagement of the coin by the ejector.

104. In a mechanical cashier, the combination of, purchase-keys, a money-delivery-device comprising an ejector adjustable for single or multiple delivery, an adjusting-lever for the ejector and means operated by the keys for differentially operating said lever.

105. In a mechanical cashier, the combination of, purchase-keys, a money-delivery-device, comprising an ejector adjustable for single or multiple delivery, an adjusting-lever for the ejector, means operated by the keys for differentially adjusting said lever and a dogging-device for holding the ejector in adjusted position.

106. In a mechanical cashier, the combination of, purchase-keys, a money-delivery-device, comprising an ejector adjustable for single or multiple delivery, an adjusting-lever for the ejector, means operated by the keys for differentially adjusting said lever, a dogging-device for holding the ejector in adjusted position and releasing-means for the dogging-device.

107. In a mechanical cashier, the combination of, purchase-keys, a money-delivery-device, comprising an ejector adjustable for single or multiple delivery, an adjusting-lever for the ejector, a dogging-device for holding the ejector in adjusted position and means operated by the keys for resetting the ejector to correspond to one key when said key is operated while the ejector is in adjusted position.

108. In a mechanical cashier, the combination of, purchase-keys, a money-delivery-device comprising an ejector adjustable for single or multiple delivery, an adjusting-lever for the ejector, a spring for actuating the ejector, means operated by the keys for setting the ejector in operated position and means for releasing the ejector for actuation by said spring.

109. In a mechanical cashier, the combination of, purchase-keys, a money-delivery-device adjustable for single or multiple delivery, comprising an ejector, means operated by the keys for adjusting said ejectors, said means comprising a lost-motion connection and a dogging-device for holding the ejector in adjusted position.

110. In a mechanical cashier, the combination of, purchase-keys, a money-delivery-device adjustable for single or multiple delivery, comprising an ejector, means operated by the keys for adjusting said ejector, said means comprising a lost-motion connection and a spring, and a dogging-device for holding the ejector in adjusted position.

111. In a mechanical cashier, the combination of, purchase-keys, a money-delivery-device adjustable for single or multiple delivery, comprising an ejector, means operated by the keys for adjusting said lever, said means comprising a lost-motion connection, a dogging-device for holding the ejector in adjusted position, and releasing-means for the dogging-device controlled by the keys.

112. In a mechanical cashier, the combination of, purchase-keys, a money-delivery-device adjustable for single or multiple delivery, comprising an ejector, means operated by the keys for adjusting said lever, said means comprising a lost-motion connection and a spring, a dogging-device for holding the ejector in adjusted position, and releasing-means for the dogging-device controlled by the keys.

113. In a money-delivery-device, the combination of, a holder, an adjustably sustained ejector, purchase-keys, an adjusting-device for the ejector comprising a cam-lever, shifted by one of the keys, and controlling-means for the ejector also operated by said keys.

114. In a money-delivery-device, the combination of, a holder, an adjustably sustained ejector, purchase-keys, controlling the operation of the ejector, an adjusting-device for the ejector comprising a cam-lever shifted by one of the keys, actuating-means for the ejector, and means for restoring the cam-lever to normal position when the actuator is operated to eject a coin.

115. In a money-delivery-device, the combination of a holder, an adjustably sustained ejector, purchase-keys, controlling the operation of the ejector, an adjusting-device for the ejector comprising a cam-lever, shifted by one of the keys, a spring for actuating the ejector to discharge coin, and means for restoring the cam-lever to normal position when the actuator is operated to discharge a coin.

116. In a money-delivery-device, the combination of, a holder, an adjustable sustained ejector, purchase-keys, ejector-shifters operated by said keys, holding-means for the ejectors, an adjusting-device for the ejector comprising a cam-lever, shifted by one of the keys, a spring for actuating the ejector to discharge coin, and means for restoring the cam-lever to normal position when the actuator is operated to discharge a coin.

117. In a money-delivery-device, the combination of, a holder, an adjustably sustained ejector, normally held in position to eject a single coin, purchase-keys, an adjusting-device for the ejector comprising a cam-lever, shifted by one of the keys, and controlling-means for the ejector also operated by said keys.

118. In a money-delivery-device, the combination of, a holder, an adjustably sustained ejector, normally held in position to eject a single coin, purchase-keys controlling the

BEST AVAILABLE COPY operation of the ejector, an adjusting-device for the ejector comprising a cam-lever, shifted by one of the keys, and actuating-means for the ejector and means restoring the cam-lever to normal position when the actuator is operated to eject a coin.

119. In a mechanical cashier, the combination of, purchase-keys, a money-delivery-device comprising an ejector adjustable for single or multiple delivery, an adjusting-lever for the ejector and means operated by the keys for differentially operating said lever, said means comprising adjustable abutments.

120. In a mechanical cashier, the combination of, purchase-keys, a money-delivery-device comprising an ejector adjustable for single or multiple delivery, an adjusting-lever for the ejector, means operated by the keys for differentially operating said lever, said means comprising adjustable abutments, a dogging-device for holding the ejector in adjusted position and releasing-means for the dogging-device controlled by the keys.

121. In a money-delivery-device, the combination of, a coin-holder, an ejector, a spring for actuating the ejector, keys selectively controlling the operation of the ejector, a latch for holding the ejector in operated position and releasing-means for controlling the operation of the ejector by the spring.

122. In a money-delivery-device, the combination of, a coin-holder, a slidable ejector, keys selectively controlling the operation of the ejector, a latch for holding the ejector in one of its positions, releasing-means for controlling the operation of the ejector and means for operating the ejector.

123. In a money-delivery-device, the combination of, a coin-holder, an ejector yieldingly held in position to engage a coin in the holder, keys selectively controlling the operation of the ejector, a latch for holding the ejector in operative position, releasing-means for controlling the operation of the ejector and operating-means for the ejector.

124. In a money-delivery-device, the combination of, a coin-holder, an ejector, yieldingly held to engage the coin, a spring for actuating the ejector to deliver coin, keys for selectively controlling the operation of the ejector, a latch for holding the ejector in operative position and releasing-means for controlling the operation of the ejector.

125. In a money-delivery-device, the combination of, a coin-holder, an ejector, a valve closing the holder to prevent engagement of the coin by the ejector, said ejector being yieldingly held to engage the coin, keys selectively controlling the operation of the ejector, operating-means for the ejector, and means for operating the valves to control delivery of coin by the ejector.

126. A money-delivery-device comprising the combination of a coin-holder, an ejector, a valve closing the holder to prevent engagement of the coin by the ejector, a latch for holding the ejector in operative position, releasing-means for controlling the operation of the ejector, means for operating the ejector and means for operating the valve to control the delivery of the coin by the ejector.

127. A money-delivery-device comprising the combination, of, a holder, an ejector, a valve closing the holder, a spring for actuating the ejector, said ejector being yieldingly held into position to engage a coin, keys selectively controlling the operation of the ejector, a latch for holding the ejector in operative position, releasing-means for controlling the operation of the ejector by the actuating spring, and means for operating the valve.

128. In a money-delivery-device, the combination of, a holder, having a rest with which the lowermost coin engages, an opening through which the coin can be discharged, an ejector, a yielding detent engaging the coin adjacent said opening, and operating means for the ejector.

129. In a money-delivery-device, the combination of, a holder having a rest with which the lowermost coin engages, an opening through which the coin can be discharged, an ejector, a spring engaging the coin adjacent said opening, and operating-means for the ejector.

130. In a mechanical cashier, the combination of, purchase-keys, money-delivery-devices controlled by the keys and for coins of different denominations and a plurality of run-ways into which the coins are respectively discharged and leading to a common discharge point, said run-ways being respectively graduated to deliver the coins discharged from the different devices at the delivery point at substantially the same time.

131. In a mechanical cashier, the combination of, purchase-keys, money-delivery-devices controlled by the keys, and comprising holders in which the coin is held, a run-way in which the coin is held on its edge and means directing the coin to roll on its edge into the run-way when the same is discharged from the holder.

132. In a mechanical cashier, the combination of, purchase-keys, money-delivery-devices controlled by the keys and for coins of different denominations, mechanism for operating the devices to discharge coins from the delivery-devices, a plurality of coin run-ways into which the coins are respectively discharged and leading to a common discharge point said run-ways being formed to direct a coin so it will roll on its edge and respectively graduated to deliver the coins discharged from the devices at the

ST AVAILABLE COP delivery point at substantially the same time and means for directing the coins into the respective run-ways.

133. In a mechanical cashier, the combination of, purchase-keys, and money-delivery-devices, comprising one or more levers each having a pair of oppositely disposed pivots whereby one of the keys will swing said lever about one of its pivots and, another key will differentially swing the lever about the other pivot.

134. In a mechanical cashier, the combination of, purchase-keys, and money-delivery-devices comprising one or more levers actuated by said keys, and a pair of oppositely disposed seats for said lever whereby the lever can be pivotally operated about either of said seats.

135. In a mechanical cashier, the combination of, purchase-keys, and money-delivery-devices comprising one or more levers actuated by said keys, a pair of oppositely disposed seats for said lever whereby the lever can be pivotally operated about either of said seats, and a spring for holding said lever normally in connected relation with each of said seats.

136. In a mechanical cashier, the combination of, purchase-keys, and money-delivery-devices comprising one or more levers having a pair of oppositely disposed pivots and whereby one of the keys will swing said lever about one of its pivots and another key will differentially swing the lever about the other pivot, and a guide for each end of the lever.

137. In a mechanical cashier, the combination of, purchase-keys, money-delivery-devices and mechanism for shifting the delivery-devices, comprising a plurality of levers, selectively shifted by the purchase-keys and each having a pair of oppositely disposed pivots whereby one key will swing the lever about one of said pivots and another key will shift the lever about the other pivot.

138. In a mechanical cashier, the combination of, purchase-keys, money-delivery-devices, mechanism for shifting the delivery-devices, comprising a plurality of levers, selectively shifted by the purchase-keys, and each having a pair of oppositely disposed pivots whereby one key will swing the lever about one of said pivots and another key will shift the lever about the other pivot, means for holding the delivery-devices in operative position and means for operating the delivery-devices to deliver the change when the holding-means is released 139. In a mechanical cashier, the combination of, purchase-keys, spring-actuated money-delivery-devices, mechanism for shifting the delivery-devices comprising plurality of levers, selectively shifted by purchase-keys and having a pair of oppositely disposed pivots whereby one key will swing the lever about one of said pivots and another key will shift the lever about the other pivots, means for holding the delivery-devices in operative position and means for operating the delivery-devices to deliver the change when the holding-means is released.

140. In a mechanical cashier, the combination of, purchase-keys, money-delivery-devices selectively controlled by said keys, mechanism selectively controlling the operation of said devices to deliver change and means for effecting delivery of a coin necessary to make proper change when the delivery-devices controlled by the keys will not cause operation of one of the delivery devices necessary to deliver the change in proper amount.

141. In a mechanical cashier, the combination of, purchase-keys, money-delivery-devices selectively controlled by said keys, mechanism selectively controlling the operation of said devices to deliver change, and means operated by said controlling-mechanism for effecting delivery of a coin necessary to make proper change when the delivery-devices controlled by the keys will not cause the operation of one of the devices necessary to deliver the change in proper amount.

142. In a mechanical cashier, the combination of, purchase-keys, money-delivery-devices selectively rendered operative to deliver change by said keys, mechanism for controlling the operation of said devices to deliver change, and means for independently operating a delivery-device not rendered operative by the keys when such is necessary to deliver correct change.

143. In a mechanical cashier, the combination of, purchase-keys, money-delivery-devices selectively rendered operative to deliver change by said keys, mechanism for controlling the operation of said devices to deliver change and means operated by said controlling mechanism, for independently operating a delivery-device not rendered operative by the keys when such is necessary to deliver correct change.

144. In a mechanical cashier, the combination of, purchase-keys, money-delivery-devices selectively shifted into operative position by said keys, holding-means for said devices, springs for actuating said devices to deliver change, mechanism controlling the operation of the devices to deliver change and means for operating a delivery-device not shifted by the keys when another coin is necessary to make the correct change.

145. In a mechanical cashier, the combination of, purchase-keys, money-delivery-devices selectively controlled by said keys, discharge-controlling mechanism comprising a plurality of keys for controlling the

...T AVAILABLE COPY delivery of change by said devices and means operated by one of the keys of the controlling-mechanism for effecting delivery of a coin by a delivery-device not affected by the purchase-keys when a coin from said device is necessary to make the correct change.

146. In a mechanical cashier, the combination of, purchase-keys, money-delivery-devices selectively rendered operative by said keys, mechanism, comprising a plurality of discharge-keys for controlling the delivery of change by said devices, means operated by one of said discharge-keys, for rendering a delivery-device operative which has not been rendered operative by the keys when a coin from said device is necessary to make correct change.

147. In a mechanical cashier, the combination of, purchase-keys, money-delivery-devices controlled by said keys, valves for controlling the operation of said devices to discharge money, mechanism comprising keys for controlling the operation of said valves and means operated by said mechanism for operating one of the delivery-devices to deliver a coin when necessary to make correct change.

148. In a mechanical cashier, the combination of, purchase-keys, money-delivery-devices selectively controlled by said keys, a discharge-key for controlling the delivery of change by said devices and means operated by said discharge-key and whereby one of the delivery-devices will be operated to deliver a coin when necessary to make the proper change.

149. In a mechanical cashier, the combination of, purchase-keys, money-delivery-devices shifted into operative position by said keys to control the operation of said devices, a plurality of discharge-keys and means whereby one of said discharge-keys will operate a delivery-device not rendered operative by the keys.

150. In a mechanical cashier, the combination of, purchase-keys, money-delivery-devices selectively shifted into operative position by said keys to control the operation of said devices, means for holding the devices in operated position a plurality of discharge-keys each operating the holding-means and mechanism operated by one of the discharge-keys for setting into operative position a delivery-device not operated by the purchase-keys when necessary to make change.

151. In a mechanical cashier, the combination of, purchase-keys comprising a series for one denomination, *e. g.*, units, and a series for multiple denominations, money-delivery-devices, controlling-devices for each of said delivery-devices operated by the keys respectively, said controllers being operated independently of each other and discharge-controlling-means controlling the operation of the delivery-devices to deliver change independently of the key-operated-controllers.

152. In a mechanical cashier, the combination of, purchase-keys comprising a series for the coin-units, and a series for multiple denominations, money-delivery-devices, key-actuated controlling-means for said devices, and means for varying the discharge of change by the delivery-devices after the key-actuated controlling-means has been operated by the keys.

153. In a mechanical cashier, the combination of, purchase-keys comprising a series for the coin-units, and a series for multiple denominations, money-delivery-devices, key-actuated controlling-means for said devices, and a discharge-key which, when operated, will release the devices and allow delivery of the change.

154. In a mechanical cashier, the combination of, purchase-keys comprising a series for coin-units, a series for multiple denominations, money-delivery-devices, key-actuated controlling-means for said devices and a plurality of discharge-keys for varying the delivery of change by said devices.

155. In a mechanical cashier, the combination of, purchase-keys, comprising a series for the coin-units, and a series for multiple denominations, money-delivery-devices, controlling-means for said devices selectively actuated by the purchase-keys, and means which will reset the controlling-means for one series to correspond to a key of said series when said key is operated after the controlling-means has been operated by another key of the same series.

156. In a mechanical cashier, the combination of, purchase-keys, comprising a series for the coin-units, and a series for multiple denominations, money-delivery-devices selectively controlled by said keys, key-locks for each series for holding the keys in operated position and lock-releasing-means operated by the purchase-keys of one series to release a previously operated key of the same series.

157. In a mechanical cashier, the combination of, purchase-keys, comprising a series for the coin units, and a series for multiple denominations, money-delivery-devices controlled by the keys, mechanism for controlling the delivery of change by said devices and means operated by said controlling-mechanism for causing the operation of a delivery-device not affected by the keys when such is necessary to make proper change.

158. In a mechanical cashier, the combination of, purchase-keys comprising a series for the coin units, and a series for multiple denominations, money-delivery-devices controlled by the purchase-keys, mechanism for

BEST AVAILABLE COPY controlling the delivery of change by said devices comprising a key and means operated by said key for causing the operation of a delivery-device not affected by the purchase keys.

159. In a mechanical cashier, the combination of, purchase-keys, comprising a series for the coin units, and a series for multiple denominations, money-delivery-devices controlled by the keys, discharge-controlling-mechanism and means operated by said mechanism for causing the operation of a delivery-device not affected by the keys when such is necessary to make proper change.

160. In a mechanical cashier, the combination of, purchase-keys, comprising a series for the coin units, a series for multiple denominations, money-delivery-devices controlled by the keys, a series of discharge-keys operating the delivery-devices to discharge change and means operated by one of said keys for independently operating a delivery-device.

161. In a mechanical cashier, the combination of, purchase-keys, money-delivery-devices, controller-devices, a coin-runway, into which the coins are discharged by said devices, and leading to an exit and a discharge-key, arranged in close proximity to said exit, so the discharge-key can be operated and the coins can be received by one hand of the operator.

162. In a mechanical cashier, the combination of, purchase-keys, money-delivery-devices, controller-devices, a coin-runway, into which the coins are discharged by said devices and leading to an exit and a plurality of discharge-keys arranged in close proximity to said exit, so either of the discharge-keys can be operated, and the coins can be received by one hand of the operator.

163. In a mechanical cashier, the combination with a coin tube, of a socket for holding same, a flange on said tube, a plate over said flange, and a lock for said plate.

164. In a mechanical cashier, the combination of, purchase-keys, money-delivery-devices controlled by said keys, and comprising removable coin-holders, and removable coin-receivers and a lock for securing the receivers in position to prevent removal of the coin-holders.

165. In a machine of the character described, the combination of, purchase-keys, money-delivery-devices controlled by said keys, an indicator, indicator-operating-means, mechanism for controlling the discharge of change by the delivery-devices and a device for controlling the operation of said mechanism, said device being operated by the indicator-operating means to render said mechanism operative.

166. In a machine of the character described, the combination of, purchase-keys, money-delivery-devices controlled by said keys, an indicator, indicator-operating-means, mechanism for differentially operating the discharge of change by the delivery-devices and a device for controlling the operation of said mechanism, said device being operated by the indicator-operating-means to render said mechanism operative.

167. In a machine of the character described, the combination of, purchase-keys, money-delivery-devices controlled by said keys, an indicator, indicator-operating-means, mechanism for controlling the discharge of change by the delivery-devices and a locking-device for controlling the operation of said mechanism, said device being operated by the indicator-operating-means to render said mechanism operative.

168. In a machine of the character described, the combination of, purchase-keys, money-delivery-devices controlled by said keys, an indicator, indicator-operating-means comprising a lever, mechanism for controlling the discharge of change by the delivery-devices and a device for controlling the operation of said mechanism, said device being operated by said lever to render said mechanism operative.

169. In a machine of the character described, the combination of, purchase-keys, money-delivery-devices controlled by said keys, an indicator, indicator-operating-means comprising a lever, mechanism for differentially operating the discharge of change by the delivery-devices and a device for controlling the operation of said mechanism, said device being operated by said lever to render said mechanism operative.

170. In a machine of the character described, the combination of, purchase-keys, money-delivery-devices controlled by said keys, an indicator, indicator-operating-means comprising a lever, mechanism for controlling the discharge of change by the delivery-devices and a locking-device for controlling the operation of said mechanism, said device being operated by said lever to render said mechanism operative.

171. In a machine of the character described, the combination of, purchase-keys, money-delivery-devices controlled by said keys, an indicator, indicator-operating-means, discharge-key for controlling the operation of said devices to deliver change and a device operated by the indicator-operating-means for controlling the operation of the discharge-key.

172. In a machine of the character described, the combination of, purchase-keys, money-delivery-devices controlled by said keys, an indicator, indicator-operating-means, a plurality of discharge-keys for differentially controlling the operation of the delivery-devices to deliver change and a device for controlling the operation of said

EST AVAILABLE COP keys, said device being operated by the indicator-operating-means to render the keys operative.

173. In a machine of the character described, the combination of, purchase-keys, money-delivery-devices controlled by said keys, an indicator, indicator-operating-means, a discharge-key for controlling the operation of said device to deliver change and a locking-device for controlling the operation of the discharge-key, said device being operated by the indicator-operating-means to render the discharge-key operative.

174. In a machine of the character described, the combination of, purchase-keys, money-delivery-devices controlled by said keys, an indicator, indicator-operating-means, a plurality of discharge-keys for differentially controlling the operation of the delivery-devices to deliver change and a locking-device for controlling the operation of said keys, said device being operated by the indicator-operating-means to render the keys operative.

175. In a machine of the character described, the combination of, purchase-keys, money-delivery-devices controlled by said keys, an indicator, indicator-operating-means comprising a lever, mechanism for controlling the discharge of change by the delivery-devices and a locking-device for controlling the operation of said mechanism, said device being operated by the indicator operating-means to render said mechanism operative and shifted into locking position when said mechanism is operated.

176. In a machine of the character described, the combination of, purchase-keys, money-delivery-devices controlled by said keys, an indicator, indicator-operating-means, a discharge-key for controlling the operation of said devices to deliver change and a device operated by the indicator-operating-means for controlling the operation of the discharge-key and shifted into locking position when the discharge-key is operated.

177. In a machine of the character described, the combination of, purchase-keys, money-delivery-devices controlled by said keys, an indicator, indicator-operating-means, a plurality of discharge-keys for differentially controlling the operation of the delivery-devices to deliver change and a device for controlling the operation of said keys, said device being operated by the indicator-operating-means to render the keys operative and shifted into locking position when either of the discharge-keys is operated.

178. In a machine of the character described, the combination of, purchase-keys, money-delivery-devices controlled by said keys, an indicator, an indicator-controller operated by said keys, and indicator-restoring-means controlled by said keys.

179. In a machine of the character described, the combination of, purchase-keys, money-delivery-devices controlled by said keys, an indicator, an indicator-controller operated by said keys, operating-means for the indicator and indicator-restoring-means controlled by said keys.

180. In a machine of the character described, the combination of, purchase-keys, money-delivery-devices controlled by said keys, discharge-controlling-means, an indicator, indicator-operating-mechanism, indicator-restoring-means controlled by the keys, and a device for preventing restoration of the indicator when the discharge-controlling-mechanism is operated.

181. In a machine of the character described, the combination of, purchase-keys, money-delivery-devices controlled by the keys, discharge-controlling-means, mechanism for holding the delivery-devices in operative position, releasing-means for said mechanism operated by the discharge-controlling-means, said releasing-means being also operated by the purchase-keys, an indicator, indicator-operating means, indicator-restoring-means, controlled by the keys and a device for preventing restoration of the indicator when the discharge-controlling-means is operated.

182. In a machine of the character described, the combination of, purchase-keys, comprising a series of keys for the coin-units, and a series for multiple denominations, money-delivery-devices controlled by the keys, an indicator for each series of keys, an indicator-controller for each indicator and indicator-restoring-means for each indicator respectively controlled by the keys of each series.

183. In a machine of the character described, the combination of, purchase-keys, comprising a series of keys for the coin-units, a series for multiple denominations, money-delivery-devices controlled by the keys, an indicator for each series of keys, an indicator-controller for each indicator, operating-means for the indicator and indicator-restoring-means for each indicator separately controlled by the keys of a series.

184. In a machine of the character described, the combination of, purchase-keys, money-delivery-devices controlled by the keys, an indicator, an indicator-controller operated by said keys, indicator-restoring-means and a lock for holding the indicator in normal position.

185. In a machine of the character described, the combination of, purchase-keys, money-delivery-devices controlled by the keys, an indicator, an indicator-controller operated by said keys, indicator-restoring-means controlled by said keys and a lock

BEST AVAILABLE COPY for holding the indicator in normal position.

186. In a machine of the character described, the combination of, purchase-keys, money-delivery-devices, controlled by said keys, an indicator, an indicator-controller operated by said keys, operating-means for the indicator, indicator-restoring-means and a lock for holding the indicator in normal position.

187. In a machine of the character described, the combination of, purchase-keys, money-delivery-devices controlled by said keys, an indicator, an indicator-controller operated by said keys, operating-means for the indicator, indicator-restoring-means controlled by said keys and a lock for holding the indicator in normal position.

188. In a machine of the character described, the combination of, purchase-keys, money-delivery-devices controlled by said keys, an indicator, an indicator-controller operated by said keys, operating-means for the indicator, indicator-restoring-means controlled by said keys and a lock operated by the indicator operating-means for holding the indicator in normal position.

189. In a machine of the character described, the combination of, purchase-keys, money-delivery-devices controlled by said keys, an indicator, an indicator-controller operated by said keys, operating-means for the indicator, comprising a lever, indicator-restoring-means controlled by said keys and a lock operated by the indicator-operating-means for holding the indicator in normal position.

190. In a machine of the character described, the combination of, purchase-keys, money-delivery-devices controlled by said keys, an indicator, an indicator-controller, means for holding the key in operated position and an operative connection between the keys and the controller whereby the controller will be held in operative position when one key is held in operative position and whereby the controller will be reset to correspond to another key when that is operated.

191. In a machine of the character described, the combination of, purchase-keys, money-delivery-devices controlled by said keys, an indicator, an indicator-controller, means for holding the key in operated position, an operative connection between the keys and the controller whereby the controller will be held in operative position when one key is held in operated position and whereby the controller will be reset to correspond to another key when that is operated and indicator-operating-means.

192. In a machine of the character described, the combination of, purchase-keys, money-delivery-devices controlled by said keys, an indicator, an indicator-controller, means for holding the key in operated position, an operative connection between the keys and the controller, whereby the controller will be held in operative position when one key is held in operated position and whereby the controller will be reset to correspond to the key last operated and an indicator-restoring-means controlled by the keys.

193. In a machine of the character described, the combination of, purchase-keys, money-delivery-devices controlled by said keys, an indicator, an indicator-controller, discharge-controlling-means and a device whereby the key and the controller will be restored to normal position when the discharge controlling-means is operated.

194. In a machine of the character described, the combination of, purchase-keys, money-delivery-devices controlled by said keys, an indicator, an indicator-controller, discharge-controlling-means, a device whereby the key and the controller will be restored to normal position when the discharge-controlling-means is operated and indicator-operating-means.

195. In a machine of the character described, the combination of, purchase-keys, money-delivery-devices controlled by said keys, an indicator, an indicator-controller, discharge-controlling-means, a device whereby the key and the controller will be restored to normal position when the discharge-controlling-means is operated and indicator-restoring-means controlled by said keys.

196. In a machine of the character described, the combination of, purchase-keys, comprising a series of keys for the coin-units, and a series for multiple denominations, money-delivery-devices controlled by the keys, an indicator for each series of keys, an indicator-controller for each indicator and an operative connection between each series of keys and its controller whereby the controller will be held in operative position and whereby the controller will be reset to correspond to another key of the same series when that key is operated.

197. In a machine of the character described, the combination of, purchase-keys, money-delivery-devices controlled by said keys, an indicator, an indicator-controller and mechanism for operating said controller, comprising a series of adjustable arms mounted to be differentially shifted by the keys.

198. In a machine of the character described, the combination of, purchase-keys, money-delivery-devices controlled by said keys, an indicator, an indicator-controller, mechanism for operating said controller comprising a series of adjustable arms mounted to be differentially shifted by the keys, and indicator-operating-means.

199. In a machine of the character de-

BEST AVAILABLE COPY scribed, the combination of, purchase-keys, money-delivery-devices controlled by said keys, an indicator, an indicator-controller, mechanism for operating said controller comprising a series of adjustable arms mounted to be differentially shifted by the keys and indicator-restoring-means controlled by the keys.

200. In a machine of the character described, the combination of, purchase-keys, money-delivery-devices controlled by said keys, indicator-restoring-means for the indicator, operating-means for the indicator, releasing-means for controlling the operation of the restoring-means and a device operated by the indicator-operating-means for rendering the releasing-means operative.

201. In a machine of the character described, the combination of, purchase-keys, money-delivery-devices controlled by said keys, indicator-restoring-means for the indicator, controlled by the keys, indicator-operating-means and a device operated by the indicator-operating-means for rendering the releasing-means operative.

202. In a machine of the character described, the combination of, purchase-keys, comprising a series for the coin-units and a series for multiple denominations, money-delivery-devices controlled by said keys, an indicator for each series, indicator-restoring-means for each indicator, and controlled by the keys, indicator-operating-means, one of said restoring-devices being also controlled by the keys of another series and a device operated by the operating-means for rendering said restoring-device operative by a key of either series.

203. In a machine of the character described, the combination of, purchase-keys, money-delivery-devices controlled by said keys, a register, register-operating-means, mechanism for controlling the discharge of change by the delivery-devices and a device for controlling the operation of said mechanism, said device being operated by the register-operating-means to render said mechanism operative.

204. In a machine of the character described, the combination of, purchase-keys, money-delivery-devices controlled by said keys, a register, register-operating-means, mechanism for controlling the discharge of change by the delivery-devices and a locking-device for controlling the operation of said mechanism, said device being operated by the register-operating-means to render said mechanism operative.

205. In a machine of the character described, the combination of, purchase-keys, money-delivery-devices controlled by said keys, a register, register-operating-means, a discharge-key for controlling the operation of said devices to deliver change and a device operated by the register-operating-means for controlling the operation of the discharge-key.

206. In a machine of the character described, the combination of, purchase-keys, money-delivery-devices controlled by said keys, a register, register-operating-means, a plurality of discharge-keys for differentially controlling the operation of the delivery-devices to deliver change and a device for controlling the operation of said keys, said device being operated by the register-operating-means to render the keys operative.

207. In a machine of the character described, the combination of, purchase-keys, money-delivery-devices, controlled by said keys, a register, register-operating-means, a plurality of discharge-keys, for differentially controlling the operation of the delivery-devices to deliver change and a locking-device for controlling the operation of said keys, said device being operated by the register-operating-means to render the keys operative.

208. In a machine of the character described, the combination of, purchase-keys, money-delivery-devices controlled by the keys, discharge-controlling-means, a register, register-advancing-mechanism controlled by the keys and a device for preventing operation of the register when the discharge-controlling-mechanism is operated.

209. In a machine of the character described, the combination of, purchase-keys, money-delivery-devices controlled by the keys, a register, a register-controller operated by said keys, register-actuating-means, operating-means for the register whereby the actuating-means will be set into position to operate the register according to the controller and means controlled by the keys for controlling the operation of the actuating-means to advance the register.

210. In a machine of the character described, the combination of, purchase-keys, money-delivery-devices controlled by the keys, a register, register-advancing-means, register-operating-means, a controller operated by the keys, a spring for actuating the advancing-means to advance the register, a locking-device for holding the advancing-means in operative position and releasing-means operated by the keys.

211. In a machine of the character described, the combination of, purchase-keys, comprising a series of keys for the coin-units and a series for multiple denominations, money-delivery-devices controlled by the keys, a controller for each series of keys, a register, register-advancing-means for each controller, register-operating-means a spring for operating each actuating means to advance the register and a separate controlling-device operated by the keys of each series for controlling the advance of the register by the actuating-means.

BEST AVAILABLE COPY

212. In a machine of the character described, the combination of, purchase-keys, money-delivery-devices controlled by said keys, a register, a register-controller and mechanism for operating said controller, comprising a series of adjustable arms mounted to be differentially shifted by said keys.

213. In a machine of the character described, the combination of, purchase-keys, money-delivery-devices controlled by said keys, an indicator, indicator-operating-means, indicator-restoring-means, a register and means operating the register to count the sale when the indicator-restoring-means is operated.

214. In a machine of the character described, the combination of, purchase-keys, money-delivery-devices controlled by the keys, an indicator for each series of keys, indicator-restoring-means controlled by the keys, a register and register-advancing-means operated by the register-restoring-means and whereby the register will be operated to count the sale when the indicator is restored to normal position.

215. In a machine of the character described, the combination of, purchase-keys, in plural series, money-delivery-devices controlled by said keys, an indicator for each series, restoring-means for each indicator separately controlled by the keys of a series, a register and register-advancing-means and operated by the restoring-means.

216. In a machine of the character described, the combination of, purchase-keys, money-delivery-devices, means for holding the keys in operated position, means whereby an operated key will be restored to normal position when another key is operated, an indicating-device, operating-means for the indicator, and a register.

217. In a mechanical cashier, the combination with ejecting devices, of keys for setting same, means for latching the devices in set position, and means for releasing the latching means.

218. In a mechanical cashier, the combination with ejecting devices, of keys for differentially setting same, and a plurality of discharge controlling means for regulating the movement of the ejecting devices when set.

219. In a mechanical cashier, the combination with ejecting devices, of keys for setting same, and springs for giving said devices their operative stroke.

220. In a mechanical cashier, the combination with ejecting devices, of keys for setting same to operative position, means for latching the ejecting devices when set, and springs for giving the ejecting devices their operative stroke when the latching means is released.

221. In a mechanical cashier, the combination with ejecting devices, of keys for setting same to operative position, springs for giving the devices their operative stroke, and discharge-controlling means for regulating the ejecting effectiveness of the spring-actuated stroke of the ejecting devices.

222. In a mechanical cashier, the combination with ejecting devices, of means for setting said ejectors in two directions, means for latching the ejectors in any set position, and springs for giving said devices their operative stroke.

223. In a mechanical cashier, the combination with an ejecting device, of keys for setting said ejecting device to position to eject a number of coins dependent on the key depressed, means for latching the ejecting device in any set position, and means for releasing the latch.

224. In a mechanical cashier, the combination with an ejecting device, of keys for setting said device to position to eject a number of coins dependent on the key depressed, means for giving said device its operative stroke, and means for controlling the ejecting effectiveness of the operative stroke of the device.

225. In a mechanical cashier, the combination with a plurality of ejecting devices, of means for setting same to position to eject numbers of coins dependent on the key depressed, means for holding the ejecting devices in any set position to eject a number of coins dependent on the keys depressed, and means for disabling the holding means and for controlling the ejecting effectiveness of the operative stroke of the ejecting devices when the holding means is disabled.

226. In a mechanical cashier, the combination with an ejecting device, of keys for setting same in two directions, means for latching the ejector from movement in one direction, means for latching the key whereby the ejector is held from movement in another direction, and a common device for releasing said latches.

227. In a mechanical cashier, the combination with an ejecting device, of means for setting said device horizontally to operative position, means for moving said device vertically to determine the number of coins ejected, two latches for preventing reverse movement of the ejecting device in either direction, and means for releasing the latches.

228. In a mechanical cashier, the combination with ejecting devices, of keys for controlling the movement of same, coin tubes having openings which the ejecting devices are adapted to enter, and means for normally preventing access of the ejecting devices to the coins.

229. In a mechanical cashier, the combination with ejecting devices, and keys for

BEST AVAILABLE COPY differentially controlling same, of coin tubes having entrances for the ejecting devices, and mechanism normally preventing admittance of the ejecting devices at the tube entrances.

230. In a mechanical cashier, the combination with ejecting devices, of means for setting same to operative position, means for adjusting said devices to deliver a number of coins desired, coin holders having openings for the admission of said ejecting devices, and means normally preventing movement of the ejecting devices through the said openings.

231. In a mechanical cashier, the combination with a plurality of ejecting devices, of keys for controlling same, coin holders having openings for the admission of said ejecting devices, means normally preventing access of the ejecting devices to the coins through the openings, and keys for disabling the said preventing means.

232. In a mechanical cashier, the combination with ejecting devices, of keys for setting same to operative position, means for latching the devices in set position, coin holders having openings for the ejecting devices, means for normally preventing entrance of the ejecting devices through said openings, and means for disabling the preventing means and releasing the latching means.

233. In a mechanical cashier, the combination with ejecting devices, of keys for setting same, coin holders having openings through which the ejecting devices are adapted to pass, means normally preventing the ejecting devices passing through said openings, and a plurality of keys for differentially disabling the preventing means.

234. In a mechanical cashier, the combination with ejecting devices, of means controlling the setting of same, means normally preventing an effective stroke of the ejecting devices when set, and means for differentially disabling the said preventing means.

235. In a mechanical cashier, the combination with ejecting devices, of keys controlling same, means preventing an effective ejecting stroke of the devices, and keys for displacing the preventing means to allow an effective stroke of the ejectors.

236. In a mechanical cashier, the combination with a series of keys, and a series of ejecting devices, of controlling means for said devices positioned by said keys, a second series of keys, and means controlled by said second series of keys for rendering certain of said ejecting devices ineffective when the same are operated.

237. In a mechanical cashier, the combination with a series of keys and ejector-controlling means set thereby, of means for latching the keys and controlling means when set, and means operated by the depression of a key for releasing the latches for the keys and controlling means.

238. In a mechanical cashier, the combination with a plurality of keys, of means for latching said keys in set position, and means comprising pivoted-tripping pawls carried by the keys, for releasing the latches.

239. In a mechanical cashier, the combination with a series of keys, and ejector-controlling devices set by said keys, of means for latching the keys and controlling devices, and means operated from the keys for releasing the key-latches and resetting the controlling devices to correspond with the depressed key.

240. In a mechanical cashier, the combination with ejecting devices, of purchase keys for differentially setting same to operative position, and means for releasing said ejecting devices and controlling the ejecting effectiveness of the operation thereof.

241. In a mechanical cashier, the combination with money-delivery devices, of purchase keys for setting same to operative position, and means for controlling the ejecting effectiveness of the delivery devices when set.

242. In a mechanical cashier, the combination with coin ejectors, of purchase keys for setting same, and a plurality of keys for differentially regulating the effectiveness of the operation of the ejectors which have been set.

243. In a mechanical cashier, the combination with ejecting devices, of purchase keys determining the setting thereof, means for varying the effectiveness of the operation of the ejecting devices when set, and means for operating the ejectors.

244. In a mechanical cashier, the combination with ejecting devices, of keys controlling same, controlling means for said devices set by the keys, means for latching the keys in set position, and means carried by said keys for releasing the latch of the controlling means.

245. In a mechanical cashier, the combination with a plurality of ejecting devices, of purchase keys, key-actuated controlling means for said devices, and means for differentially controlling the operated movement of the ejecting devices after they have been operated by the purchase keys.

246. In a mechanical cashier, the combination with a series of keys, of a stepped device positioned laterally by said keys, indicators, indicator-operating bars depending over said stepped device, and means for releasing said bars after the device has been set.

247. In a mechanical cashier, the combination with a plurality of keys, each having a rack, of means for compelling a full

EST AVAILABLE COP' stroke of said keys, said means also locking the keys in depressed position, and means operated by the keys for operating said full stroke and locking means to release any depressed key.

248. In an indicating mechanism, the combination with a group of keys and a graduated element differentially positioned by said keys, of an indicator, a driving device for said indicator postioned to be obstructed by said graduated element, a spring connected to return said indicator driving device to normal position, and a latch, controlled by said keys, constructed to hold said indicator in any of its adjusted positions.

249. In a machine of the class described, the combination with a plurality of rotary shafts parallel to each other, of indicators each bearing a series of characters secured to each of said shafts for indicating upon opposite sides of the machine, the indicators upon one side of the machine being larger than those upon the other side so as to overlap each other, a series of openings in one of the overlapping indicators to enable the proper reading of the overlapping indicators, and an operating mechanism for said indicators.

250. In a cash indicating machine, the combination with a plurality of duplex indicating elements, a portion of each element being larger than the rest so as to indicate properly upon opposite sides of the machine, and an operating mechanism for said elements.

251. In a cash indicating machine, the combination with a plurality of rotary shafts parallel to each other, of indicators each bearing a series of characters secured to said shafts for indicating upon opposite sides of the machine, the indicators upon one side of the machine being larger than those upon the other side so that the characters may be read properly upon both sides of the machine.

252. In a cash indicating machine, the combination with a plurality of rotary shafts parallel to each other of indicators each bearing a series of characters secured to said shafts for indicating upon opposite sides of the machine, the indicators upon one side of the machine being larger than those upon the other side so that the characters may be read properly upon both sides of the machine, pinions secured to said shafts, and rack bars for rotating said pinions.

253. In a cash indicating machine, the combination with a differentially movable indicator bearing a plurality of characters, of a series of keys corresponding to the characters upon the indicator, a graduated element controlled by the keys for controlling the movement of said indicator, an operating shaft having a constant excursion upon each operation of the machine, and a flexible connection between said shaft and said indicator.

254. In a cash register, the combination with a differentially movable indicator bearing a plurality of characters, of a series of keys corresponding to the characters upon the indicator, a graduated plate actuated by the keys for controlling the movement of the indicator, an operating shaft having a constant excursion upon each operation of the machine, a flexible connection between the shaft and the indicator, a lock for said indicator, and means actuated by the operating shaft for releasing said lock.

255. In a cash indicating machine, the combination with a plurality of indicators for indicating dollars, dimes and cents, of a plurality of corresponding banks of keys for controlling the movement of said indicators, means for holding said indicators in any position to which they may be moved, and means controlled by each bank of keys for displacing the holding means and holding it displaced until the indicator has returned to normal position.

256. In a cash indicating machine, the combination with an indicator bearing a plurality of characters, of operating means therefor, a series of depressible keys for controlling the movement of said indicator, devices for holding the indicator in any position to which it may be moved, means for latching any key of the series in a depressed position, and means for releasing the depressed key and the indicator upon the operation of any other key in the series.

257. In a cash indicating machine, the combination with an indicator bearing a plurality of characters, of operating means therefor, a series of depressible keys for controlling the movement of the indicator, devices for holding the indicator in any position to which it may be moved, means for latching any key of the series in a depressed position, means for releasing the depressed key and the indicator upon the operation of any other key in the series, and means for releasing the depressed key without releasing the indicator.

258. In a cash indicating machine, the combination with an indicator bearing a plurality of characters, of operating means therefor, a series of depressible keys for controlling the movement of the indicator, devices for holding the indicator in any position to which it may be moved, means for latching any key of the series in a depressed position, means for releasing the depressed key and the indicator upon the operation of any other key in the series, means for releasing the depressed key without releasing

BEST AVAILABLE COPY the indicator, and means for preventing the operation of the last mentioned key releasing means until the operating means for the indicator has been operated.

259. In a cash registering and indicating machine, the combination with a plurality of indicators, of actuating racks therefor, an operating mechanism, flexible connections between the racks and said mechanism, a plurality of banks of keys corresponding to the indicators, graduated plates controlled by said keys, the said plates in turn controlling the actuating racks for the indicators, a registering mechanism, and racks connected to the indicator actuating racks for operating said registering mechanism.

260. In a machine of the class described, the combination with a group of keys and a graduated element differentially positioned by said keys, of an indicator, a driving device for said indicator positioned to be obstructed by said graduated element, a spring connected to return said indicator to normal position, a second spring having connections to move said indicator from normal position, means for giving said second spring greater tension than said first spring, and a latch controlled by said keys, and constructed to hold said indicator in any of its adjusted positions.

261. In a machine of the class described, the combination with an indicator, and a group of keys, with connections from said keys for controlling the differential setting of said indicator, of a ratchet disk having a deep notch and movable with said indicator, a pawl positioned to engage the teeth of said ratchet disk, devices constructed to move said pawl out of the plane of said ratchet disk, and a spring positioned to cause said pawl to engage the deep notch in said ratchet disk.

262. In a machine of the class described, the combination with a group of keys and an indicator controlled by said keys, of a spring connected to restore said indicator to normal position, separate detents for the group of keys and the indicator, connections whereby the key detent releases the indicator detent, a release key, devices actuated by said release key to control said key detent, with connections from said release key to prevent release of said indicator detent.

263. In a machine of the class described, the combination with a group of keys, and an indicator controlled by said keys, of means to restore said indicator to normal position, a detent for said indicator, a plate actuated by said keys and constructed to retain an actuated key in actuated position, connections from said key actuated plate to release said indicator detent, a release lever, devices controlled by said release lever and constructed to release said key actuated plate, and means, actuated by said plate releasing devices, to prevent actuation of said indicator detent releasing connections.

264. In a machine of the class described, the combination with two groups of keys, and indicators one for and controlled by each key group, a detent for each indicator, a plate actuated by each key group and having connections to release the detent for the corresponding indicator, and hand operated means for operating both said key actuated plates at once whereby to release both of said indicator elements.

265. In a machine of the class described, the combination with a plurality of depressible keys, of means for retaining said keys in depressed positions, an indicator differentially adjusted under the control of said keys, mechanism for latching the indicator in adjusted position, and means carried by the keys for operating the retaining means for said keys and the latching mechanism for the indicator.

266. In a machine of the class described, the combination with a plurality of depressible keys, of means for retaining said keys in depressed positions, an indicator differentially adjusted under the control of said keys, mechanism for latching the indicator in adjusted position, means carried by the keys for operating the retaining means for said keys and the latching mechanism for the indicator, and a manipulative device for operating the retaining means, without disturbing the latching mechanism for the indicator.

267. In a machine of the class described, the combination with a plurality of depressible keys, of means for retaining said keys in depressed positions, an indicator differentially adjusted under the control of said keys, mechanism for latching the indicator in adjusted position, means carried by the keys for operating the retaining means for said keys and through the retaining means operating the latching mechanism for the indicator, a manipulative device for operating the key retaining means, and mechanism controlled by said manipulative device for preventing the operation of the indicator latching mechanism when the key retaining means is operated by the manipulative device.

268. In a machine of the class described, the combination with a plurality of keys, of a graduated element differentially adjusted thereby, registering and indicating mechanisms, an actuator for said mechanisms, and an operating mechanism having an invariable movement for imparting to the actuator an extent of movement depending upon the adjustment of the graduated element.

269. In a machine of the class described,

BEST AVAILABLE COPY the combination with a series of keys, of a graduated element differentially adjusted thereby, registering and indicating mechanisms, a differentially movable member having racks for actuating said registering and indicating mechanisms, and an operating mechanism having an invariable movement for imparting to the movable member an extent of movement depending upon the adjustment of the graduated element whereby the registering and indicating mechanisms are actuated correspondingly by the racks carried by said movable member.

In testimony whereof I affix my signature in the presence of two witnesses.

EDMUND S. CHURCH.

Witnesses:
LE ROY F. MAURER,
L. V. LYNCH.

---

Corrections in Letters Patent Reissue No. 13,629.

It is hereby certified that in Letters Patent Reissue No. 13,629, granted October 21, 1913, upon the application of Edmund S. Church, of Chicago, Illinois, for an improvement in "Mechanical Cashiers," errors appear in the printed specification requiring correction as follows: Page 14, line 114, for the word "opposite" read *oppose;* page 17, line 91, for the word "rendering" read *operating;* same page and line, strike out the word "delivery"; same page and line, after the word "devices" insert the words *to deliver;* page 19, line 28, for the word "discharge" read *change;* page 20, line 45, for the word "opposition" read *position;* and that the said Letters Patent should be read with these corrections therein that the same may conform to the record of the case in the Patent Office.

Signed and sealed this 25th day of November, A. D., 1913.

[SEAL.]

J. T. NEWTON,

*Acting Commissioner of Patents.*

BEST AVAILABLE COPY the combination with a series of keys, of a graduated element differentially adjusted thereby, registering and indicating mechanisms, a differentially movable member having racks for actuating said registering and indicating mechanisms, and an operating mechanism having an invariable movement for imparting to the movable member an extent of movement depending upon the adjustment of the graduated element whereby the registering and indicating mechanisms are actuated correspondingly by the racks carried by said movable member.

In testimony whereof I affix my signature in the presence of two witnesses.

EDMUND S. CHURCH.

Witnesses:
LE ROY F. MAURER,
L. V. LYNCH.

---

Corrections in Letters Patent Reissue No. 13,629.

It is hereby certified that in Letters Patent Reissue No. 13,629, granted October 21, 1913, upon the application of Edmund S. Church, of Chicago, Illinois, for an improvement in "Mechanical Cashiers," errors appear in the printed specification requiring correction as follows: Page 14, line 114, for the word "opposite" read *oppose;* page 17, line 91, for the word "rendering" read *operating;* same page and line, strike out the word "delivery"; same page and line, after the word "devices" insert the words *to deliver;* page 19, line 28, for the word "discharge" read *change;* page 20, line 45, for the word "opposition" read *position;* and that the said Letters Patent should be read with these corrections therein that the same may conform to the record of the case in the Patent Office.

Signed and sealed this 25th day of November, A. D., 1913.

[SEAL.]

J. T. NEWTON,

*Acting Commissioner of Patents.*